US012602375B2

(12) United States Patent
Crabtree et al.

(10) Patent No.: US 12,602,375 B2
(45) Date of Patent: Apr. 14, 2026

(54) COMPOSITE SYMBOLIC AND NON-SYMBOLIC ARTIFICIAL INTELLIGENCE SYSTEM FOR ADVANCED REASONING AND SEMANTIC SEARCH

(71) Applicant: QOMPLX LLC, Reston, VA (US)

(72) Inventors: Jason Crabtree, Vienna, VA (US); Richard Kelley, Woodbridge, VA (US); Jason Hopper, Halifax (CA); David Park, Fairfax, VA (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/783,404

(22) Filed: Jul. 24, 2024

(65) Prior Publication Data

US 2024/0386015 A1     Nov. 21, 2024

Related U.S. Application Data

(63) Continuation-in-part of application No. 18/668,137, filed on May 18, 2024, which is a continuation-in-part
(Continued)

(51) Int. Cl.
*G06F 16/24*          (2019.01)
*G06F 16/245*         (2019.01)
(Continued)

(52) U.S. Cl.
CPC .......... *G06F 16/245* (2019.01); *G06F 16/248* (2019.01); *G06F 16/9024* (2019.01); *G06F 40/30* (2020.01); *G06N 5/04* (2013.01)

(58) Field of Classification Search
CPC ... G06F 16/245; G06F 16/248; G06F 16/9024
See application file for complete search history.

(56) References Cited

U.S. PATENT DOCUMENTS 10,726,204 B2     7/2020   Crudele et al.
11,443,213 B2 *   9/2022   Karanam .............. G06F 16/367
(Continued)

*Primary Examiner* — Loc Tran
(74) *Attorney, Agent, or Firm* — NK Patent Law

(57)          ABSTRACT

A semantic search system integrates with an AI platform to provide advanced search capabilities by leveraging automatically generated ontologies and knowledge graphs. The system employs natural language processing, machine learning, and large language models to create, update, and align ontologies from diverse data sources. It supports context-aware query interpretation, personalized results, and complex reasoning by incorporating user context, feedback, and domain knowledge. The system optimizes search performance and efficiency through indexing techniques, distributed computing, and continuous learning. With a modular architecture and scalable infrastructure, the semantic search system enables users to retrieve relevant, meaningful, and context-specific information from vast amounts of structured and unstructured data. The integration of the semantic search system with the AI platform's components, such as knowledge graphs and model blending, enhances the platform's overall reasoning, decision-making, and problem-solving capabilities, empowering users with intelligent and intuitive search experiences across various domains and applications.

48 Claims, 45 Drawing Sheets

Related U.S. Application Data of application No. 18/656,612, filed on May 7, 2024, application No. 18/783,404 is a continuation-in-part of application No. 18/191,876, filed on Mar. 29, 2023, which is a continuation of application No. 17/084,263, filed on Oct. 29, 2020, now Pat. No. 11,687,527, which is a continuation-in-part of application No. 16/864,133, filed on Apr. 30, 2020, now Pat. No. 11,494,665, which is a continuation-in-part of application No. 15/847,443, filed on Dec. 19, 2017, now abandoned, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, which is a continuation-in-part of application No. 15/489,716, filed on Apr. 17, 2017, now abandoned, which is a continuation-in-part of application No. 15/409,510, filed on Jan. 18, 2017, now abandoned, which is a continuation-in-part of application No. 15/379,899, filed on Dec. 15, 2016, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, said application No. 15/790,327 is a continuation-in-part of application No. 15/141,752, filed on Apr. 28, 2016, now Pat. No. 10,860,962, said application No. 15/166,158 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, said application No. 15/616,427 is a continuation-in-part of application No. 14/925,974, filed on Oct. 28, 2015, now abandoned, said application No. 15/141,752 is a continuation-in-part of application No. 14/925,974, filed on Oct. 28, 2015, now abandoned.

(60) Provisional application No. 63/551,328, filed on Feb. 8, 2024, provisional application No. 62/568,298, filed on Oct. 4, 2017, provisional application No. 62/568,291, filed on Oct. 4, 2017.

(51) Int. Cl.

| | |
|---|---|
| *G06F 16/248* | (2019.01) |
| *G06F 16/901* | (2019.01) |
| *G06F 40/30* | (2020.01) |
| *G06N 5/04* | (2023.01) |

(56) References Cited

U.S. PATENT DOCUMENTS

| | | | | |
|---|---|---|---|---|
| 11,645,526 | B2 | 5/2023 | Yu et al. | |
| 11,651,605 | B1 | 5/2023 | Horesh | |
| 2020/0073879 | A1* | 3/2020 | Grabau | G06N 3/042 |
| 2021/0027175 | A1* | 1/2021 | Jenson | G06N 5/022 |
| 2022/0269858 | A1 | 8/2022 | Sen et al. | |

* cited by examiner

Marketplace Computing
800

Expert Registration
810

Market Management
820

Scored Data Management
830

Algorithm Management
840

1100

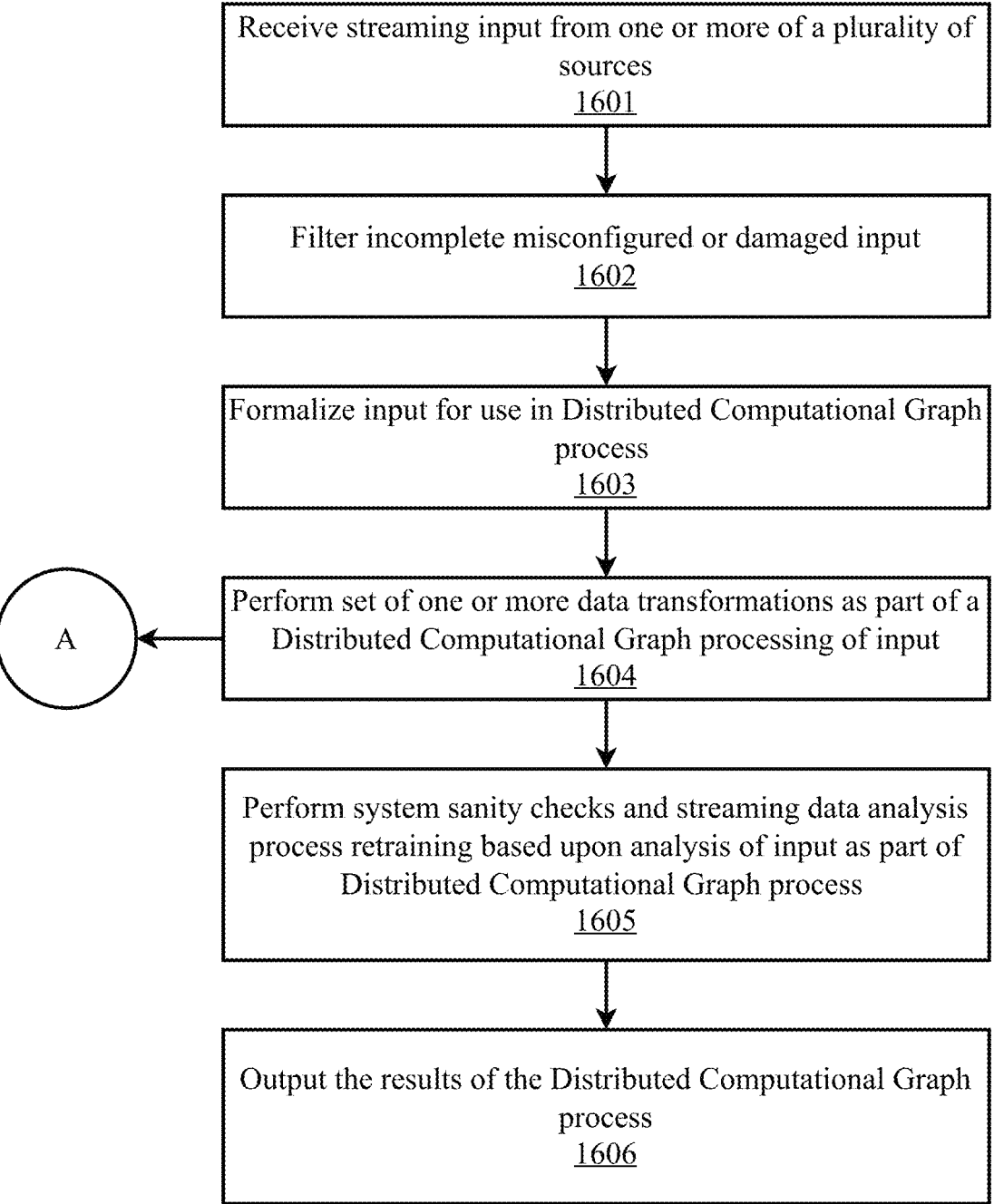

Receive streaming input from one or more of a plurality of sources
1601

Filter incomplete misconfigured or damaged input
1602

Formalize input for use in Distributed Computational Graph process
1603

A

Perform set of one or more data transformations as part of a Distributed Computational Graph processing of input
1604

Perform system sanity checks and streaming data analysis process retraining based upon analysis of input as part of Distributed Computational Graph process
1605

Output the results of the Distributed Computational Graph process
1606

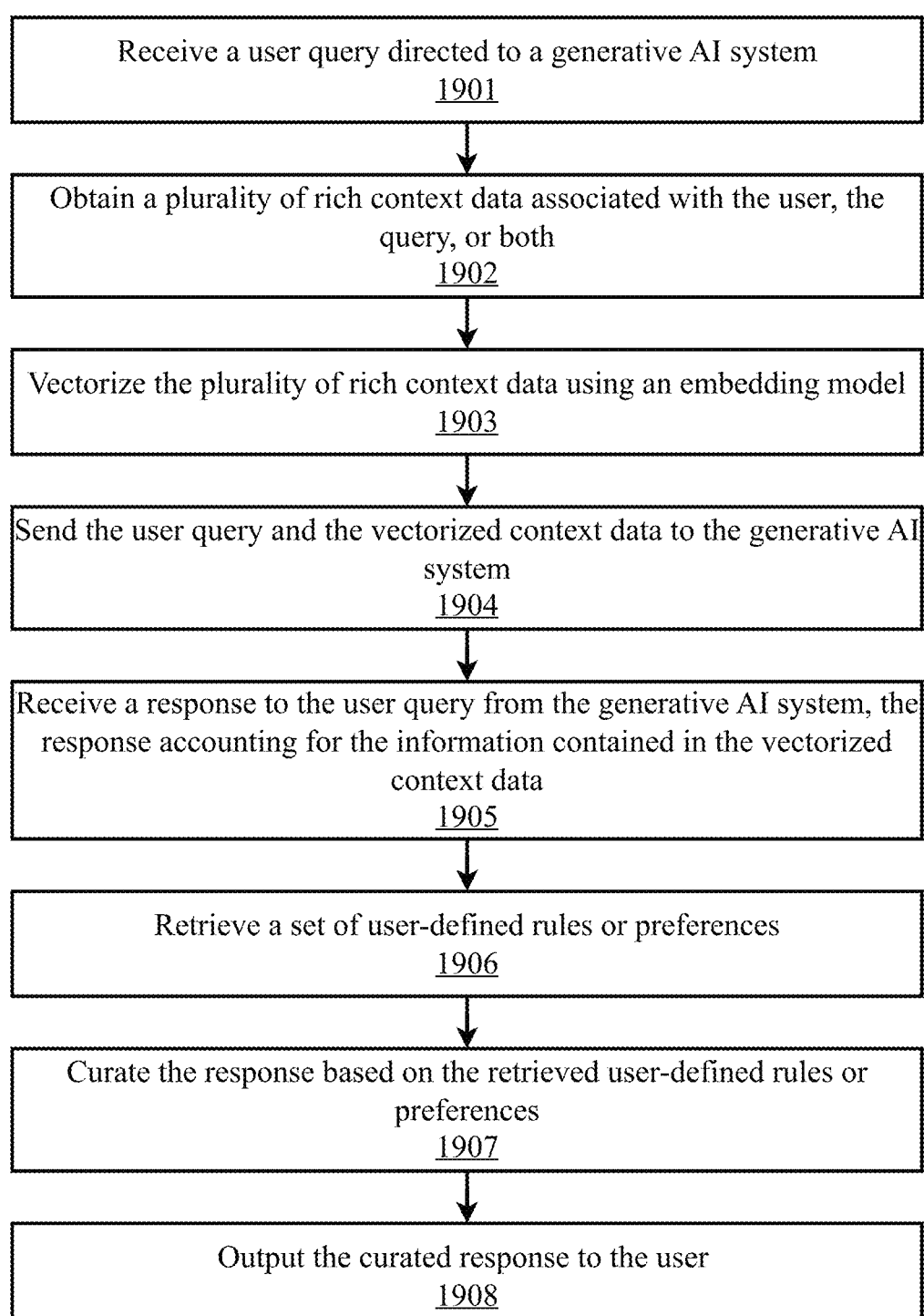

Receive a user query directed to a generative AI system
1901

Obtain a plurality of rich context data associated with the user, the query, or both
1902

Vectorize the plurality of rich context data using an embedding model
1903

Send the user query and the vectorized context data to the generative AI system
1904

Receive a response to the user query from the generative AI system, the response accounting for the information contained in the vectorized context data
1905

Retrieve a set of user-defined rules or preferences
1906

Curate the response based on the retrieved user-defined rules or preferences
1907

Output the curated response to the user
1908

FIG. 19

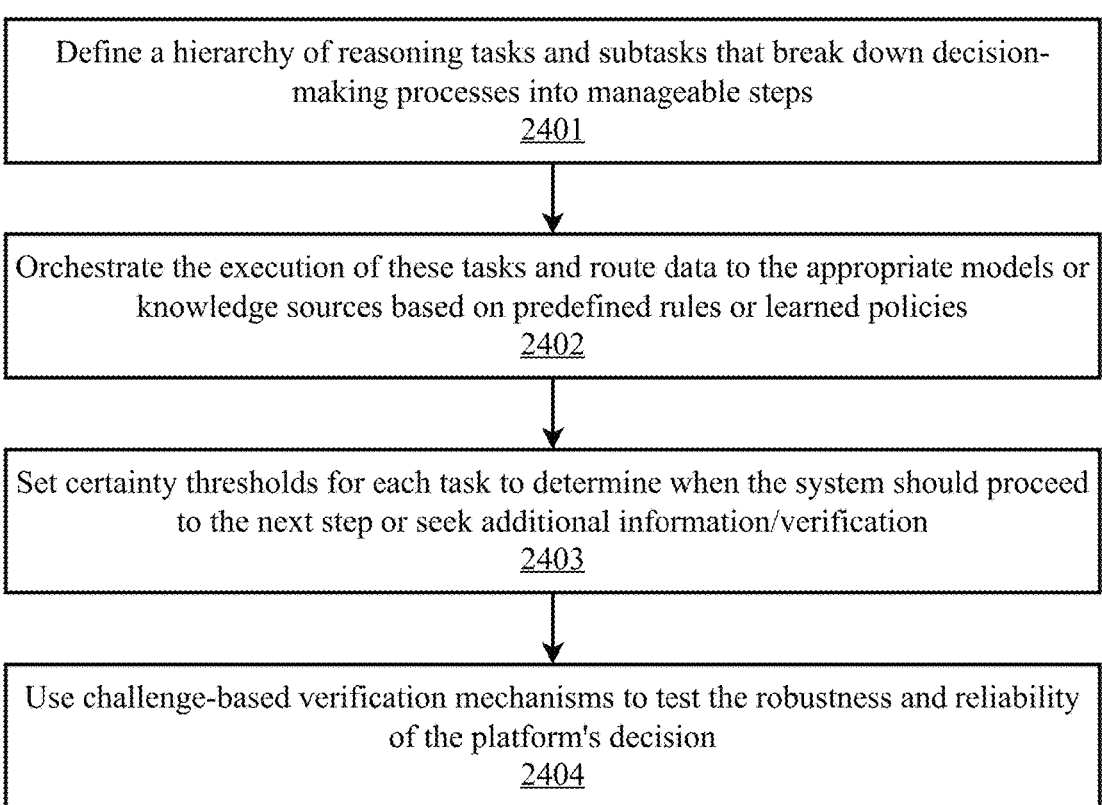

Define a hierarchy of reasoning tasks and subtasks that break down decision-making processes into manageable steps
2401

Orchestrate the execution of these tasks and route data to the appropriate models or knowledge sources based on predefined rules or learned policies
2402

Set certainty thresholds for each task to determine when the system should proceed to the next step or seek additional information/verification
2403

Use challenge-based verification mechanisms to test the robustness and reliability of the platform's decision
2404

Query a knowledge graph to retrieve symbolic information comprising relevant facts, entities, and relationships based on input data and the current reasoning context
2501

Use the retrieved knowledge to refine vector embeddings generated by neural network models, incorporating symbolic information into the distributed representations
2502

Implement techniques to effectively combine the embeddings with the knowledge graph data
2503

Figure 26:
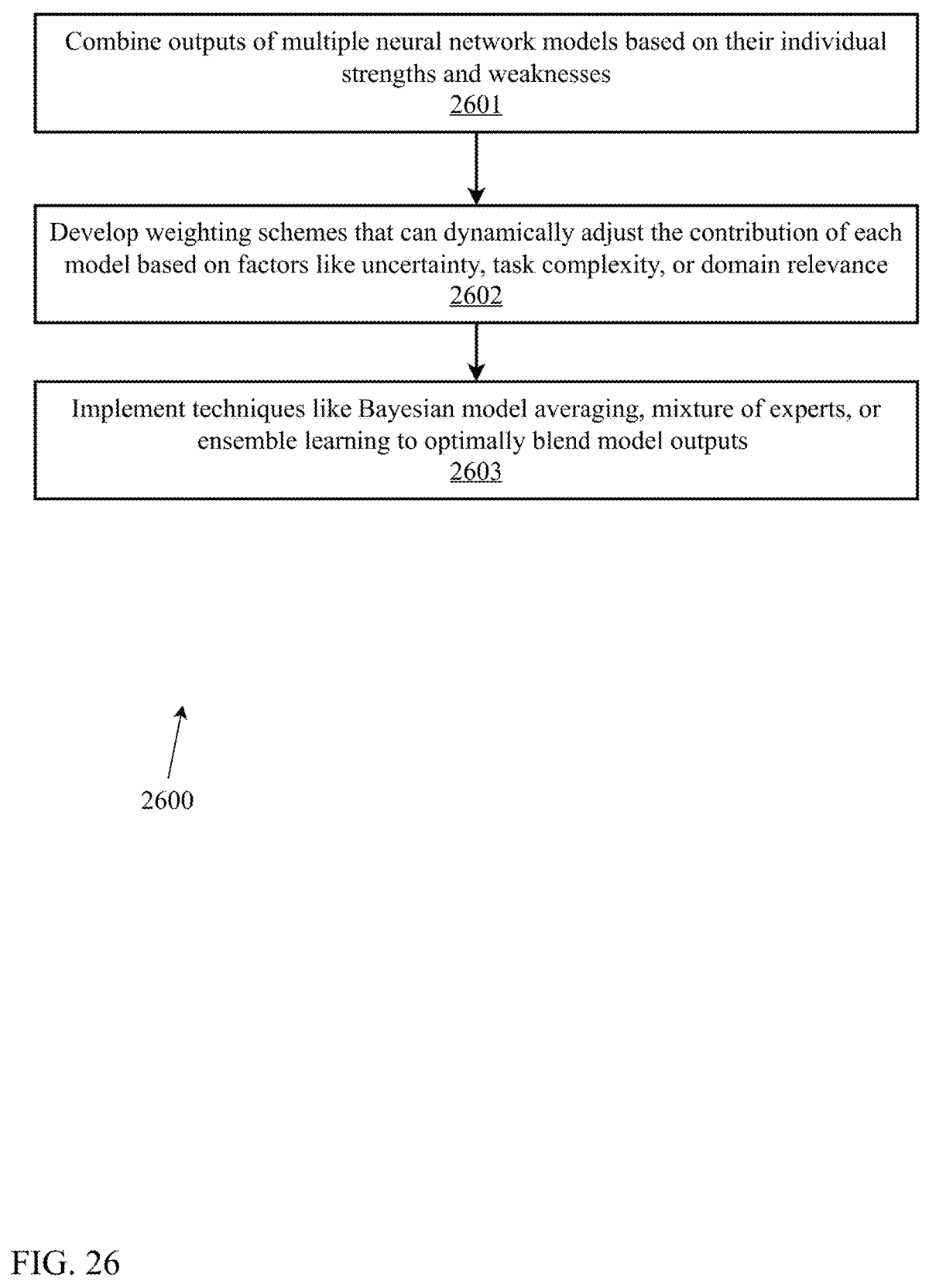

Combine outputs of multiple neural network models based on their individual strengths and weaknesses
2601

Develop weighting schemes that can dynamically adjust the contribution of each model based on factors like uncertainty, task complexity, or domain relevance
2602

Implement techniques like Bayesian model averaging, mixture of experts, or ensemble learning to optimally blend model outputs
2603

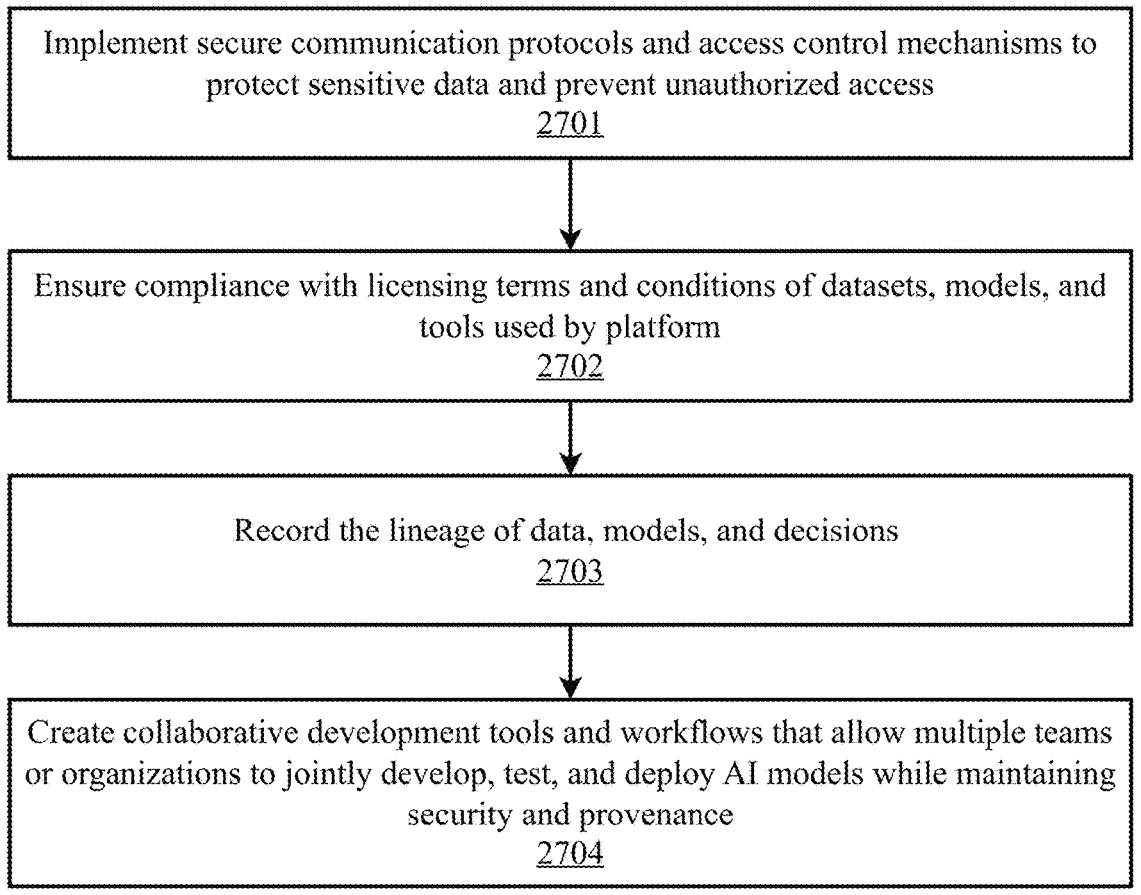

Implement secure communication protocols and access control mechanisms to protect sensitive data and prevent unauthorized access
2701

Ensure compliance with licensing terms and conditions of datasets, models, and tools used by platform
2702

Record the lineage of data, models, and decisions
2703

Create collaborative development tools and workflows that allow multiple teams or organizations to jointly develop, test, and deploy AI models while maintaining security and provenance
2704

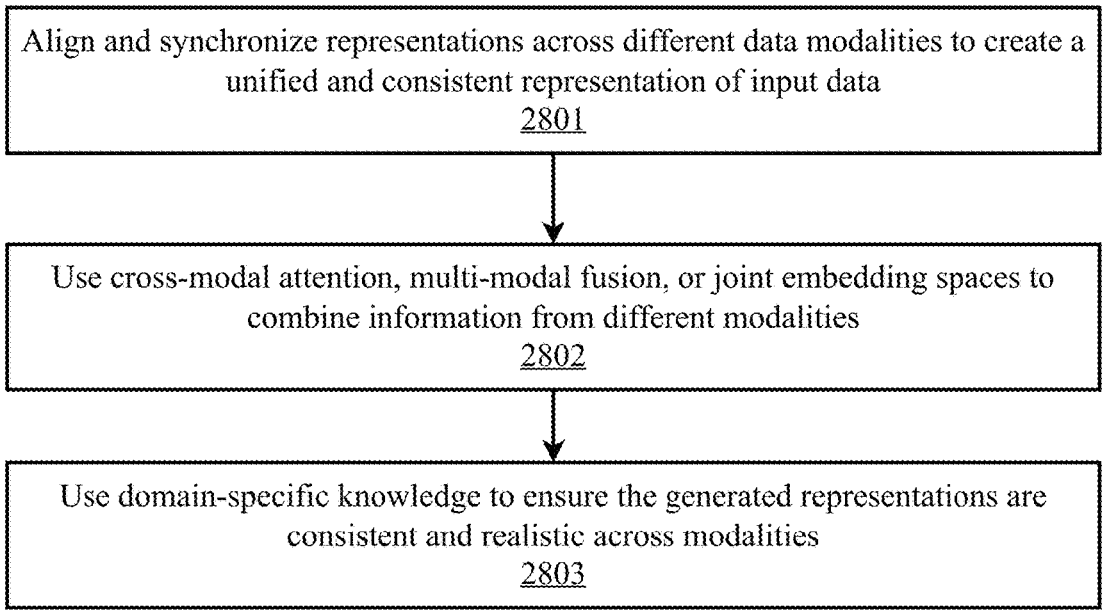

Align and synchronize representations across different data modalities to create a unified and consistent representation of input data
2801

Use cross-modal attention, multi-modal fusion, or joint embedding spaces to combine information from different modalities
2802

Use domain-specific knowledge to ensure the generated representations are consistent and realistic across modalities
2803

Implement a hyperparameter optimization framework to search for the best combination of model architectures, training settings, and embedding techniques
2901

Use information-theoretic measure to guide the optimization process and select the hyperparameters that maximize the information content and generalization ability of learned representations
2902

2900

Analyze learned vector embeddings and extract symbolic representations that capture the underlying semantic structure
3001

Use clustering, dimensionality reduction, or rule mining to distill the embeddings into interpretable symbolic forms
3002

Use ontology alignment and linking methods to map the extracted symbolic representations to existing concepts and relationships in the knowledge graph
3003

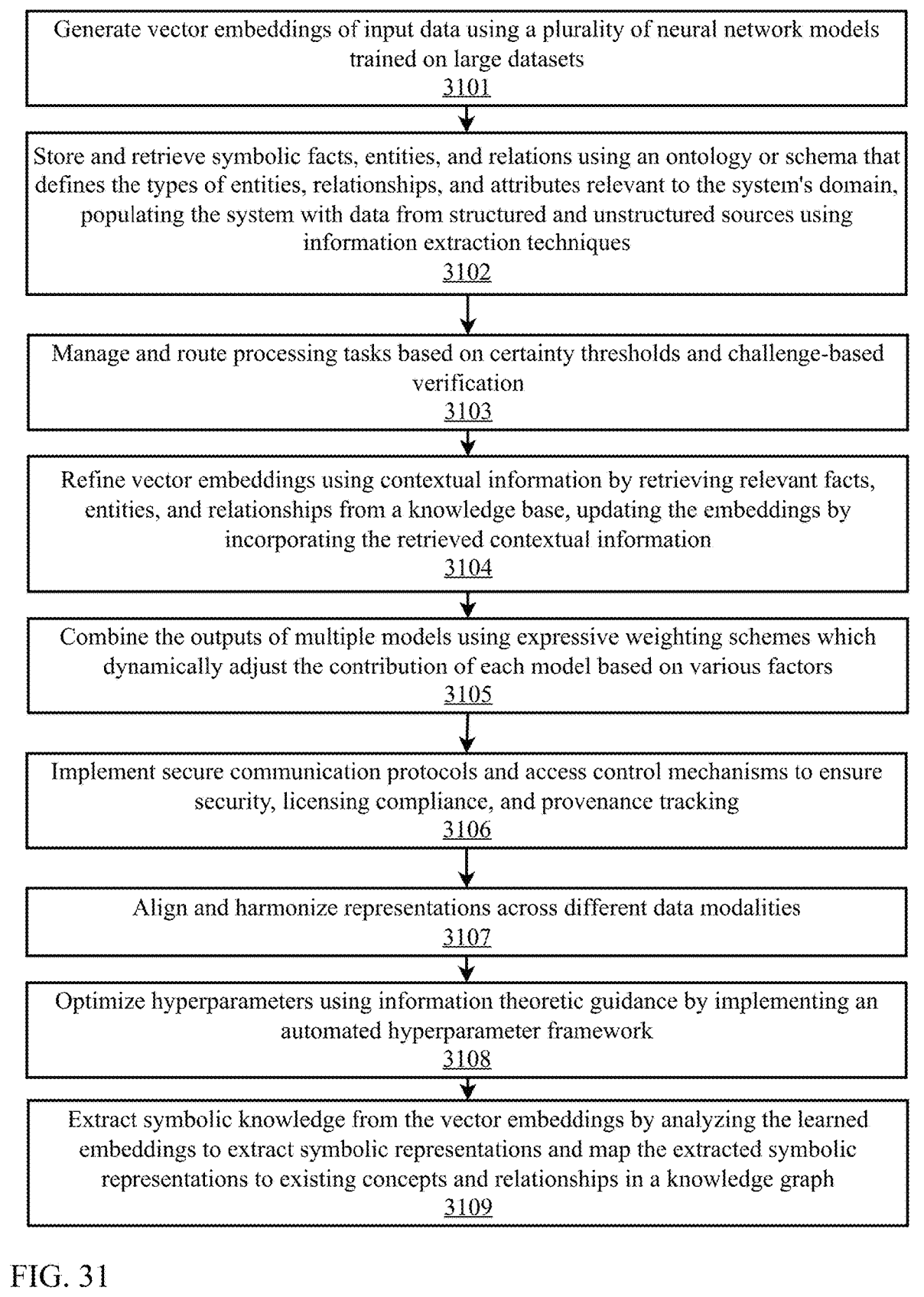

Generate vector embeddings of input data using a plurality of neural network models trained on large datasets
3101

Store and retrieve symbolic facts, entities, and relations using an ontology or schema that defines the types of entities, relationships, and attributes relevant to the system's domain, populating the system with data from structured and unstructured sources using information extraction techniques
3102

Manage and route processing tasks based on certainty thresholds and challenge-based verification
3103

Refine vector embeddings using contextual information by retrieving relevant facts, entities, and relationships from a knowledge base, updating the embeddings by incorporating the retrieved contextual information
3104

Combine the outputs of multiple models using expressive weighting schemes which dynamically adjust the contribution of each model based on various factors
3105

Implement secure communication protocols and access control mechanisms to ensure security, licensing compliance, and provenance tracking
3106

Align and harmonize representations across different data modalities
3107

Optimize hyperparameters using information theoretic guidance by implementing an automated hyperparameter framework
3108

Extract symbolic knowledge from the vector embeddings by analyzing the learned embeddings to extract symbolic representations and map the extracted symbolic representations to existing concepts and relationships in a knowledge graph
3109

FIG. 31

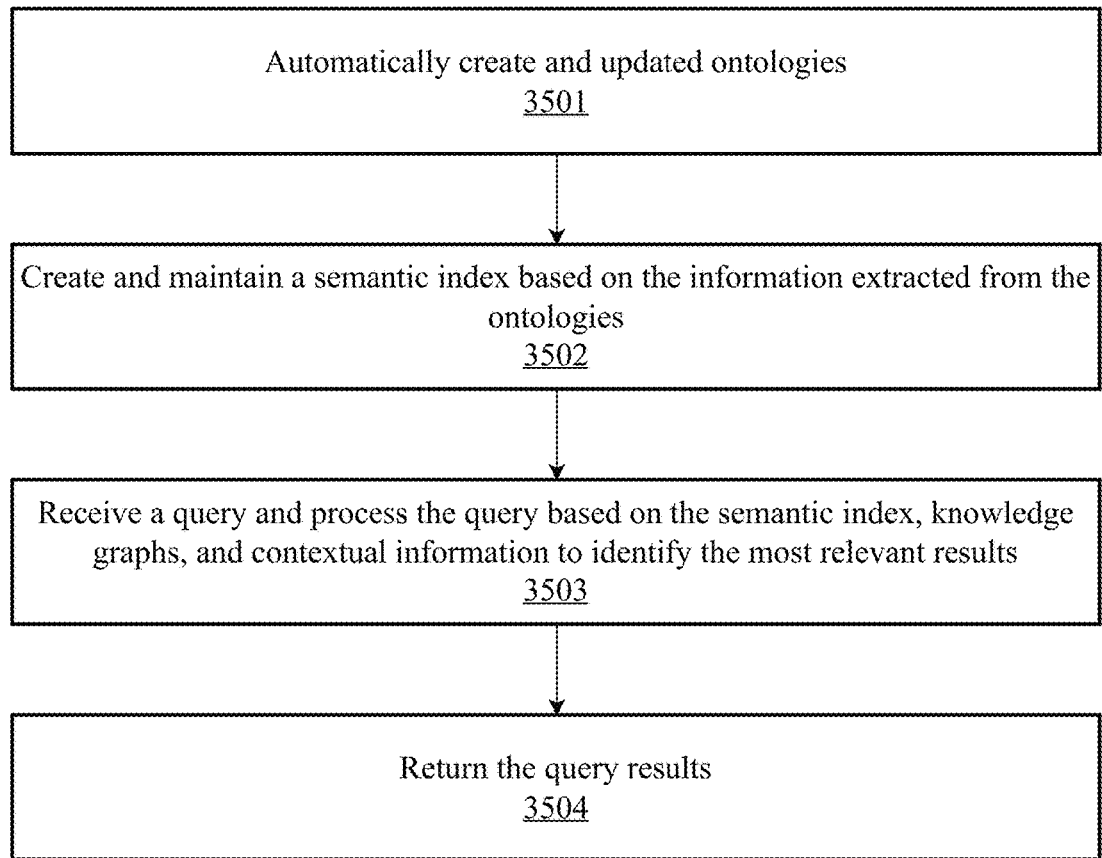
Automatically create and updated ontologies
3501
Create and maintain a semantic index based on the information extracted from the ontologies
3502
Receive a query and process the query based on the semantic index, knowledge graphs, and contextual information to identify the most relevant results
3503
Return the query results
3504
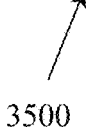
3500
FIG. 35

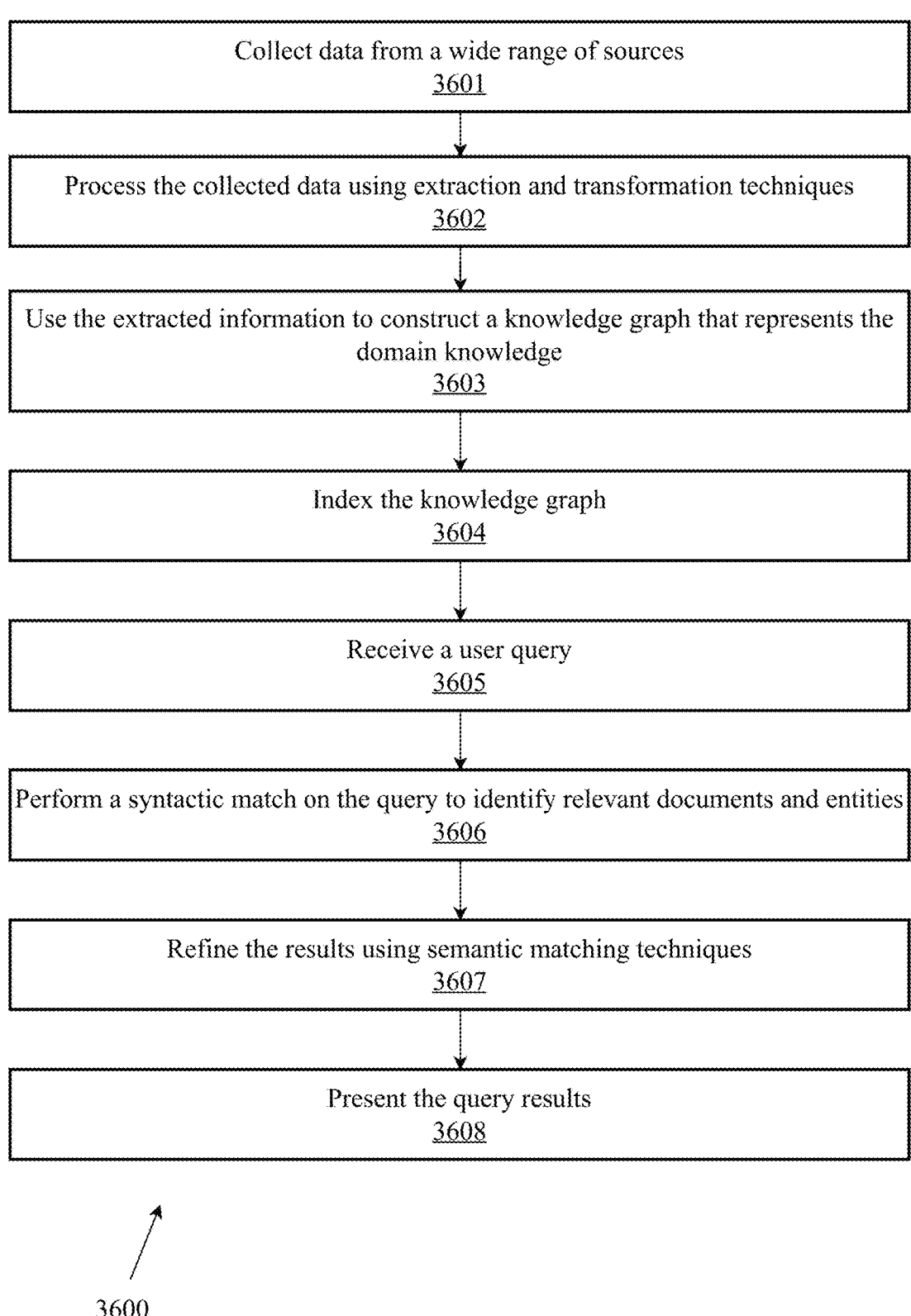

Collect data from a wide range of sources
3601

Process the collected data using extraction and transformation techniques
3602

Use the extracted information to construct a knowledge graph that represents the domain knowledge
3603

Index the knowledge graph
3604

Receive a user query
3605

Perform a syntactic match on the query to identify relevant documents and entities
3606

Refine the results using semantic matching techniques
3607

Present the query results
3608

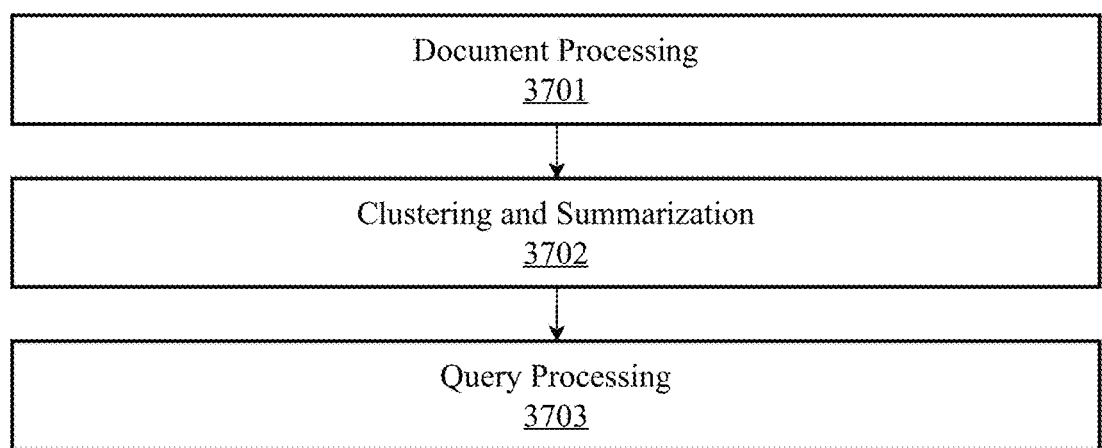
Document Processing
3701
Clustering and Summarization
3702
Query Processing
3703
3700
FIG. 37

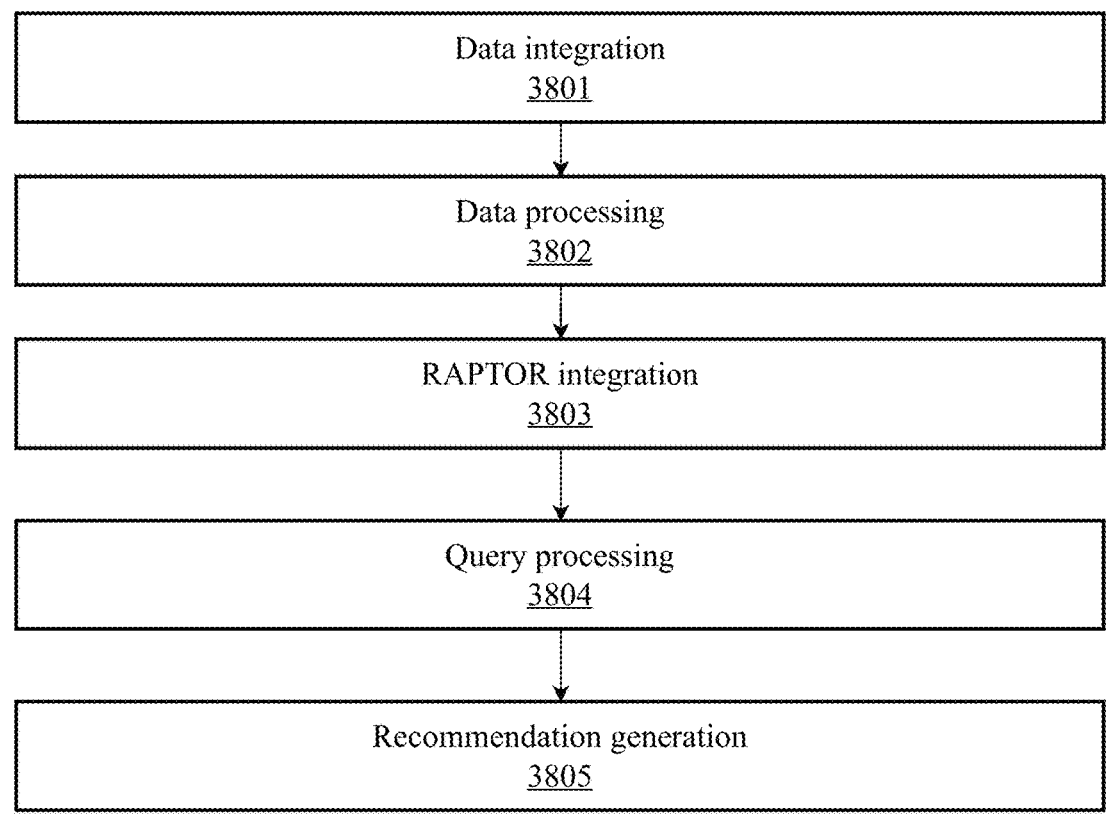
3800
FIG. 38

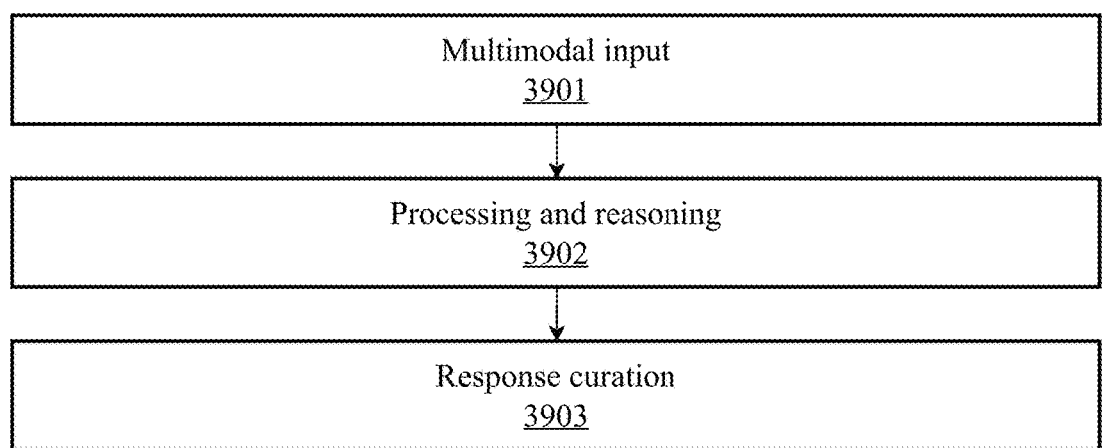
Multimodal input
3901
Processing and reasoning
3902
Response curation
3903
3900
FIG. 39

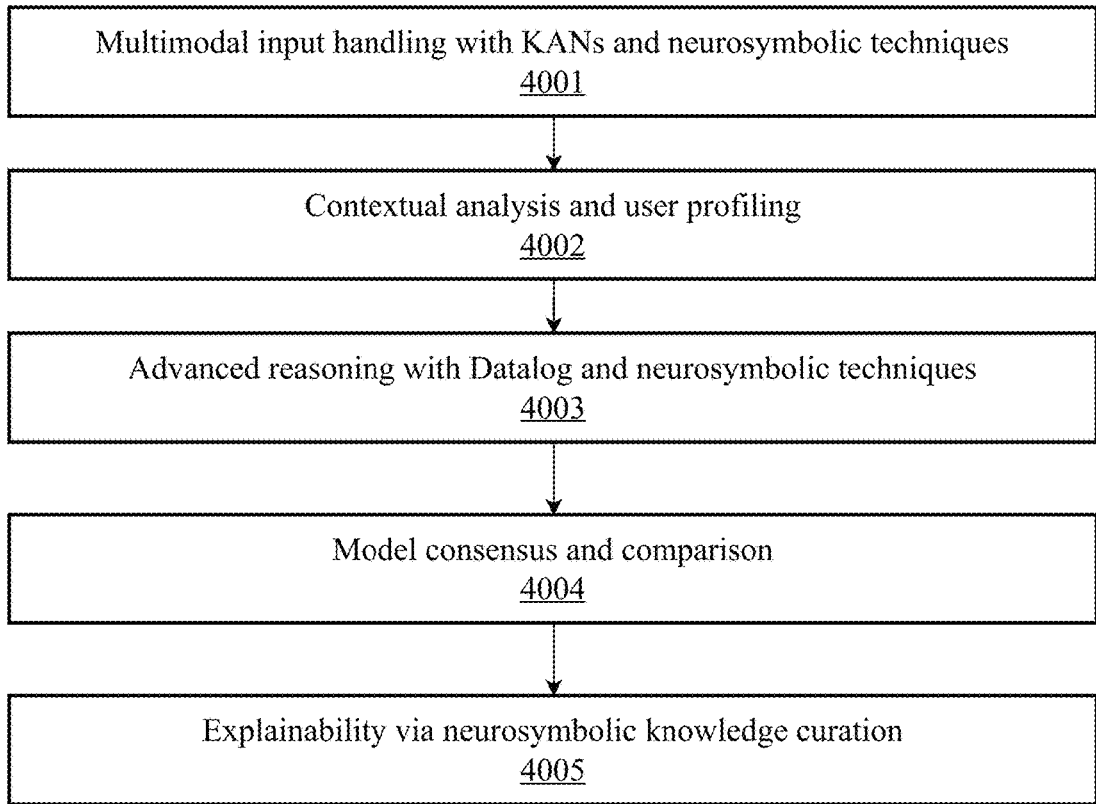
Multimodal input handling with KANs and neurosymbolic techniques
4001
Contextual analysis and user profiling
4002
Advanced reasoning with Datalog and neurosymbolic techniques
4003
Model consensus and comparison
4004
Explainability via neurosymbolic knowledge curation
4005
4000
FIG. 40

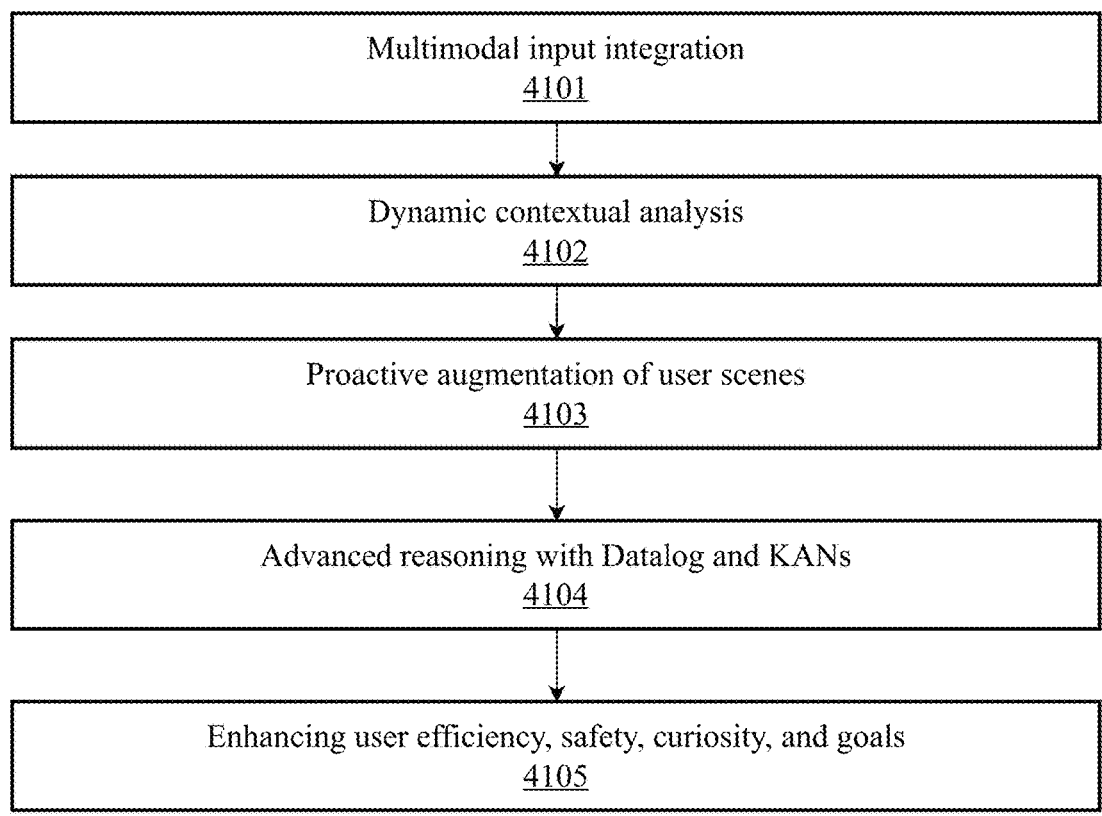
Multimodal input integration
4101
Dynamic contextual analysis
4102
Proactive augmentation of user scenes
4103
Advanced reasoning with Datalog and KANs
4104
Enhancing user efficiency, safety, curiosity, and goals
4105
4100
FIG. 41

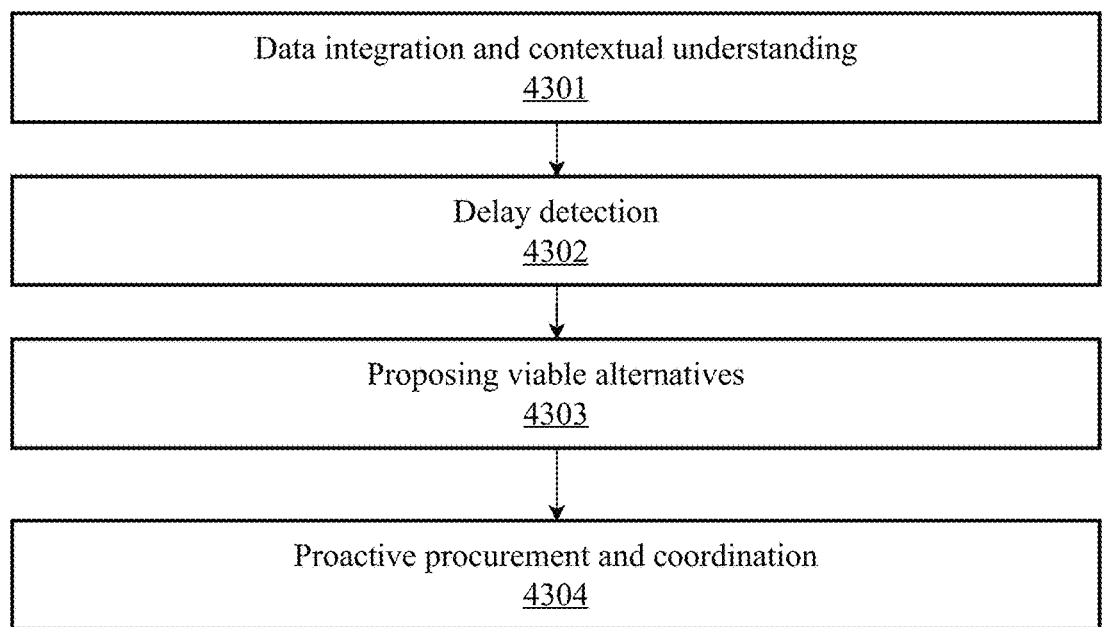
Data integration and contextual understanding
4301
Delay detection
4302
Proposing viable alternatives
4303
Proactive procurement and coordination
4304
4300
FIG. 43

Building design and permitting
4401

Construction planning and management
4402

On-site construction management
4403

4400

COMPOSITE SYMBOLIC AND NON-SYMBOLIC ARTIFICIAL INTELLIGENCE SYSTEM FOR ADVANCED REASONING AND SEMANTIC SEARCH

CROSS-REFERENCE TO RELATED APPLICATIONS

Priority is claimed in the application data sheet to the following patents or patent applications, each of which is expressly incorporated herein by reference in its entirety:
Ser. No. 18/668,137
Ser. No. 18/656,612
63/551,328
Ser. No. 18/191,876
Ser. No. 17/084,263
Ser. No. 16/864,133
Ser. No. 15/847,443
Ser. No. 15/790,457
Ser. No. 15/790,327
62/568,291
Ser. No. 15/616,427
Ser. No. 14/925,974
Ser. No. 15/141,752
Ser. No. 15/091,563
Ser. No. 14/986,536
62/568,298
Ser. No. 15/489,716
Ser. No. 15/409,510
Ser. No. 15/379,899
Ser. No. 15/376,657
Ser. No. 15/237,625
Ser. No. 15/206,195
Ser. No. 15/186,453
Ser. No. 15/166,158

BACKGROUND OF THE INVENTION

Field of the Art

The present invention is in the field of large-scale distributed computing, and more particularly to programmatically or declaratively constructed distributed graph-based computing platforms for artificial intelligence based search, knowledge curation, decision-making, and automation systems including those employing simulations, machine learning models, and artificial intelligence (AI) applications including large language models, generative AI, and associated AI-related services across or amongst heterogeneous cloud, large scale automation and control systems, managed data center, edge devices, and wearable/mobile devices.

Discussion of the State of the Art

Current artificial intelligence (AI) systems, including large language models (LLMs) and generative AI (GenAI), have limitations in their capabilities stemming from their foundational architecture and lack integration of symbolic knowledge and reasoning. Connectivist systems can produce incredible results, if sometimes inconsistent or nonsensical, but don't actually understand the information they model per se. There is a need for AI architectures that can bridge the gap between symbolic and non-symbolic representations to enable more advanced, contextual reasoning based on an understanding and domain expertise for assurable quality and consistency, while considering critical factors like security, traceability, and collaborative model development.

What is needed is a composite artificial intelligence platform that seamlessly integrates symbolic and non-symbolic approaches for advanced reasoning capabilities in AI systems, enabling them to achieve deeper understanding, contextual decision-making, and enhanced performance across diverse applications.

SUMMARY OF THE INVENTION

Accordingly, the inventor has conceived and reduced to practice, a contextual semantic search and reasoning system which integrates with an AI platform to provide advanced search capabilities by leveraging automatically generated ontologies and knowledge graphs and RAGs and knowledge graph RAGs. The system employs natural language processing, machine learning, and artificial intelligence models (e.g., large language models, diffusion models, variational autoencoders) to create, update, and align or harmonize ontologies from diverse data sources as well as maintain and select specialized narrowly tailored models, knowledge corpora, RAGs, and expert feedback for specialized queries or recommendations when prudent. It supports multimodal context-aware query interpretation, personalized results, and complex reasoning by incorporating user context, feedback, and domain knowledge. The system optimizes search and reasoning performance and efficiency through indexing techniques, distributed computing, and continuous learning which can occur in localized or global fashion. With a modular architecture and scalable infrastructure, the semantic search system goes beyond just semantic vector search and enables users to retrieve relevant, meaningful, and context-specific information from vast amounts of structured and unstructured data and knowledge corpora. When integrated with provenance aware model marketplace and registry functions, it also supports identification of additional modeling and simulation and representation tools and algorithms appropriate to subject matter of interest. The integration of the semantic search system with the AI platform's components, such as knowledge graphs, RAG, knowledge graph RAG, model blending or model and authoritative knowledge consensus checks, enhances the platform's overall reasoning, decision-making, and problem-solving capabilities, empowering users with intelligent and intuitive search experiences across various domains and applications with a higher degree of assurance and ultimate utility.

According to a preferred embodiment, a computing system for semantic search employing an advanced reasoning platform, the computing system comprising: one or more hardware processors configured for: automatically creating and updating ontologies by analyzing structured and unstructured data from multiple sources using natural language processing and machine learning or artificial intelligence techniques; reading, creating, and maintaining a vector semantic index of content elements linked to core symbolic concepts and relationships defined in the ontologies; processing user queries and returning relevant results by leveraging the vector semantic indices, knowledge graphs, and contextual information; storing and managing knowledge corpora that integrates information from ontologies, semantic indices, and external sources; utilizing user context and preferences to guide semantic search and enable context-aware query interpretation and result personalization; orchestrating semantic search and reasoning workflows by integrating ontology extraction, indexing, search, knowledge graph, and context processing components; and optimizing performance and efficiency of the semantic search system based on workload characteristics and service-level objectives.

According to another preferred embodiment, a computer-implemented method executed on an advanced reasoning platform for semantic search, the computer-implemented method comprising: automatically creating and updating ontologies by analyzing structured and unstructured data from multiple sources using natural language processing and machine learning or artificial intelligence techniques; reading, creating, and maintaining a vector semantic index of content elements linked to core symbolic concepts and relationships defined in the ontologies; processing user queries and returning relevant results by leveraging the vector semantic indices, knowledge graphs, and contextual information; storing and managing knowledge corpora that integrates information from ontologies, semantic indices, and external sources; utilizing user context and preferences to guide semantic search and enable context-aware query interpretation and result personalization; orchestrating semantic search and reasoning workflows by integrating ontology extraction, indexing, search, knowledge graph, and context processing components; and optimizing performance and efficiency of the semantic search system based on workload characteristics and service-level objectives.

According to another preferred embodiment, a system for semantic search employing an advanced reasoning platform, comprising one or more computers with executable instructions that, when executed, cause the system to: automatically create and update ontologies by analyzing structured and unstructured data from multiple sources using natural language processing and machine learning or artificial intelligence techniques; read, create, and maintain a vector semantic index of content elements linked to core symbolic concepts and relationships defined in the ontologies; process user queries and returning relevant results by leveraging the vector semantic indices, knowledge graphs, and contextual information; store and manage knowledge corpora that integrates information from ontologies, semantic indices, and external sources; utilize user context and preferences to guide semantic search and enable context-aware query interpretation and result personalization; orchestrate semantic search and reasoning workflows by integrating ontology extraction, indexing, search, knowledge graph, and context processing components; and optimize performance and efficiency of the semantic search system based on workload characteristics and service-level objectives.

According to another preferred embodiment, non-transitory, computer-readable storage media having computer-executable instructions embodied thereon that, when executed by one or more processors of a computing system employing an advanced reasoning platform for semantic search, cause the computing system to: read, create, and maintain a vector semantic index of content elements linked to core symbolic concepts and relationships defined in the ontologies; process user queries and returning relevant results by leveraging the vector semantic indices, knowledge graphs, and contextual information; store and manage knowledge corpora that integrates information from ontologies, semantic indices, and external sources; utilize user context and preferences to guide semantic search and enable context-aware query interpretation and result personalization; orchestrate semantic search and reasoning workflows by integrating ontology extraction, indexing, search, knowledge graph, and context processing components; and optimize performance and efficiency of the semantic search system based on workload characteristics and service-level objectives.

According to an aspect of an embodiment, the ontologies include both domain-specific and upper ontologies.

According to an aspect of an embodiment, the data analyzed to read, create and update or evolve the ontologies includes temporal and spatial representations to aid the system in representing changes in language or concepts via versioned ontologies which collectively support more accurate and precise information representation, retrieval and reasoning.

According to an aspect of an embodiment, the semantic index enables efficient semantic search and retrieval of information.

According to an aspect of an embodiment, the knowledge graph supports curated symbolic representation of information which supports more complex reasoning and inference tasks.

According to an aspect of an embodiment, the system leverages cloud and edge computing resources through a hierarchical and distributed architecture.

According to an aspect of an embodiment, the orchestration of semantic search and reasoning workflows is performed using a directed computational graph system which supports declaration of transport, storage and compute tasks across cloud, intermediate, edge, and wearable, mobile, or Internet-of-Things devices.

According to an aspect of an embodiment, the system continuously improves the relevance, accuracy, and performance of contextual semantic search results using machine learning and artificial intelligence techniques via ongoing model and knowledge corpora curation and index improvement.

According to an aspect of an embodiment, the machine learning or artificial intelligence techniques include one or more of: one-shot learning, multi-shot learning, federated learning, reinforcement learning, adversarial learning, online learning, and transfer learning.

According to an aspect of an embodiment, the system includes a natural language interface for users to interact with the semantic search system using natural language queries, dialogues, and commands via voice, video, recording, braille, or writing.

According to an aspect of an embodiment, performance optimization techniques include one or more of: caching, concurrency, parallelization, compression, resource allocation, resource locality, response fidelity, model selection, response validation, search depth, search breadth, declared time available, and declared cost limited.

According to an aspect of an embodiment, the system further comprises a multimodal interface configured to allow language, image, video, sound, smell, environmental characteristics, or other resources available to a user interface for users to interact with the semantic search and access information or gain recommendations or initiate actions.

BRIEF DESCRIPTION OF THE DRAWING FIGURES

FIG. 16 is a process flow diagram of a method for predictive analysis of very large data sets using the distributed computational graph.

FIG. 19 is a flow diagram illustrating an exemplary method for providing experience curation with using rich contextual data, according to an aspect of an embodiment.

FIG. 24 is a flow diagram illustrating an exemplary method for routing processing based on certainty threshold and/or challenge-based verification, according to an embodiment.

FIG. 25 is a flow diagram illustrating an exemplary method for retrieving relevant contextual data from a knowledge graph database and enriching vector embeddings with the contextual data, according to an embodiment.

FIG. 26 is a flow diagram illustrating an exemplary method for applying expressive weighting schemes to model combinations, according to an embodiment.

FIG. 27 is a flow diagram illustrating an exemplary method for using feedback loops considering security, licensing, provenance, and collaborative development, according to an embodiment.

FIG. 28 is a flow diagram illustrating an exemplary method for multi-modal alignment for consistent representations across data types, according to an embodiment.

FIG. 30 is a flow diagram illustrating an exemplary method for linking embeddings to knowledge graphs, according to an embodiment.

FIG. 31 is a flow diagram illustrating an exemplary method for advanced reasoning using a composite artificial intelligence platform, according to an embodiment.

FIG. 35 is a flow diagram illustrating an exemplary method for providing semantic search capabilities using an AI platform for advanced reasoning, according to an aspect.

FIG. 36 is a flow diagram illustrating another exemplary method for providing semantic search capabilities using an AI platform for advanced reasoning, according to an aspect.

FIG. 37 is a flow diagram illustrating an exemplary method for implementing a RAPTOR model to support semantic query/search actions, according to an aspect.

FIG. 38 is a flow diagram illustrating an exemplary method for integrating multimodal data into semantic search and recommendations, according to an aspect.

FIG. 39 is a flow diagram illustrating an exemplary method for using Datalog concepts in a streaming fixed point semantics search, according to an aspect.

FIG. 40 is a flow diagram illustrating an exemplary method for integrating KANs, neurosymbolic techniques, and enhanced AI for explainability and user goal understanding, according to an aspect.

FIG. 41 is a flow diagram illustrating an exemplary method for enhancing user context understanding and proactive augmentation with scene graph generation integrations, according to an aspect.

FIG. 43 is a flow diagram illustrating an exemplary method for identifying delays and proposing alternatives using a neurosymbolic approach, according to an aspect.

DETAILED DESCRIPTION OF THE INVENTION

Figure 1:
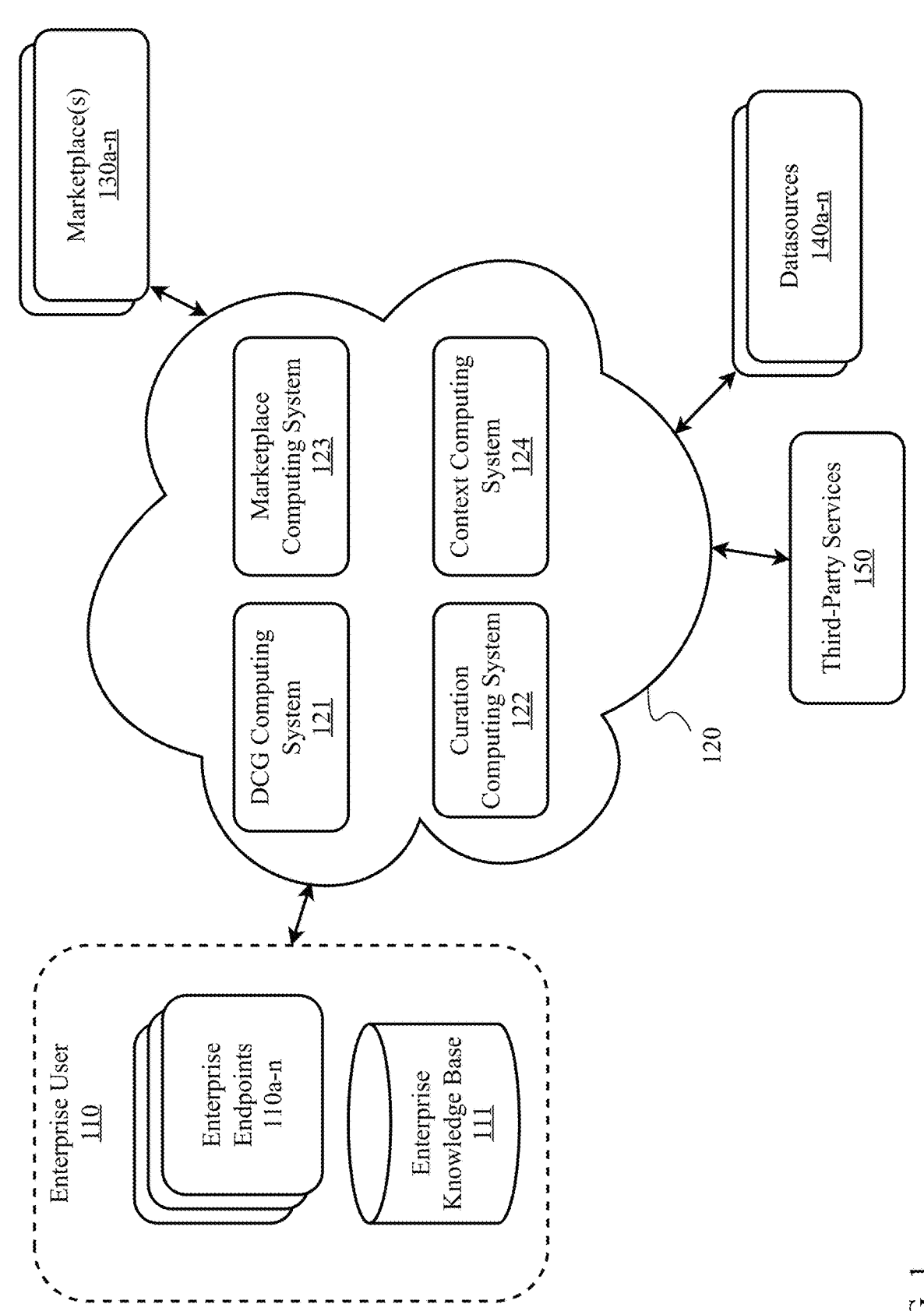
FIG. 1 is a block diagram illustrating an exemplary system architecture for a distributed generative artificial intelligence reasoning and action platform, according to an embodiment.

The inventor has conceived, and reduced to practice, a semantic search and recommendation system which integrates with an AI platform to provide advanced search capabilities by leveraging automatically generated ontologies and knowledge graphs. The system employs natural language processing, machine learning, and artificial intelligence techniques (e.g., large language models) to create, update, and align and evolve ontologies and curate ontological data from diverse data sources while also creating vector semantic indices and traditional database indices. It supports context-aware multimodal query interpretation and enhancement, personalized results, and complex reasoning by incorporating user context, feedback, and domain knowledge with both connectionist and symbolic modeling capabilities. The neurosymbolic system optimizes search performance and efficiency through indexing techniques, distributed computing, and continuous learning and knowledge corporate curation. With a modular architecture and scalable infrastructure, the semantic search system enables users to retrieve relevant, meaningful, and context-specific information from vast amounts of structured and unstructured data and existing or developed knowledge corpora. The integration of the semantic search system with the AI platform's components, such as knowledge graphs and model blending or consensus or checks against authoritative symbolic knowledge bases for specific elements (e.g., checking recommended prescriptions for known dangerous drug interactions in a formal database), enhances the platform's overall reasoning, decision-making, and problem-solving capabilities, empowering users with intelligent and intuitive search experiences across various domains and applications with superior assurance of appropriateness and utility when compared to current search responses from generative AI tools.

The composite AI platform comprises a set of neural network models that generate vector embeddings representing input data elements. The embeddings are stored in databases (or in block storage like AWS S3 or Ceph). Additional indices linking vectorized data element representations to ontology elements are created and iteratively refined using contextual information from comparisons between ontological data from knowledge graphs containing facts, entities, and relations using at least vector similarity comparison as part of a comparative objective function for relevance. This iterative refinement process allows the system to continuously learn and improve the accuracy and relevance of its links between vector semantic representations and ontological representations of data and to add to and curate multiple structured and even symbolic representations of data elements into effective knowledge corpora for specialized and broad-based search, reasoning and model training or utilization. The typical knowledge graph comprises nodes representing entities, concepts, and relationships, and edges representing the connections between them. The nodes are categorized into different types, such as classes, instances, and properties, based on their semantic roles. The edges are labeled with the specific relationships they represent, such as 'is-a', 'part-of', or 'has-property'. This structured representation allows for efficient traversal and reasoning over the property graph. The system employs various reasoning and inference techniques, such as logical reasoning, rule-based inference, and graph pattern matching, to derive new knowledge and insights from the knowledge graph. For example, the system may use first-order logic to infer new facts based on existing relationships, or apply graph algorithms like shortest path or centrality measures to identify important entities and connections. Each of the nodes may also contain property information linking it to vectorized representation of its constituent data elements. Nodes and subgraphs may also be linked to supporting source content from which such elements were derived and may also reflect metadata about the provenance of the analysis (e.g., the model and its associated training data and author and history and license terms) which classified such elements or element properties into the symbolic knowledge base.

Combined with models, logic (e.g., Datalog) the knowledge graph enables complex reasoning tasks such as entity disambiguation, question answering, and recommendation. For instance, when a user searches for 'apple', the system can disambiguate between the fruit and the technology company by analyzing the context and relationships in the knowledge graph and in the vector semantics index. In simple cases, one of those techniques may be enough, in complex cases the combined value of the approaches is superior. Similarly, the system can answer complex questions like 'What are the top companies in the renewable energy sector?' by traversing the relevant nodes and edges. By integrating information from ontologies, semantic indices, and external sources, the knowledge graph with complementary vector semantic enhancements provides a comprehensive and interconnected view of the domain. This rich context facilitates more accurate and nuanced reasoning and inference. For example, combining company data from financial databases with industry ontologies (e.g., FIBO) enables the system to infer market trends and competitors.

Contextual information, such as user preferences, search history, device from which a query or recommendation is being sought, recent history of environmental conditions and movement (e.g., just ran through the rain), and location (historical, present and planned—such as from an upcoming calendar invite), plays a role in guiding the reasoning and inference process the system can employ to maximize search or recommendation relevance with minimal user interaction requirements. The system leverages this context to personalize and refine the results, ensuring their relevance to the user's specific needs and intentions and to aid the user in switching between multiple devices such as a watch, smart glasses, a VR/AR headset, a laptop or a tablet with a task or workflow based continuity model. For instance, a user's past searches, application use and state, and system interactions can inform the composite computing system about their interests, current tasks of interest and expertise level, allowing it to adapt the reasoning strategies and provide more targeted insights relevant to their current context and time available. Suggested content and interface presentation to a user who is switching between a laptop and a VisionPro on their couch or at their desk late at night and is methodically researching and citing sources in a paper deserves very substantively different treatment than the harried commuter who is late for work and sprinted from the subway station to a nearby awning and is desperately searching for coffee with a minimal line on their way to their office.

Model orchestration is handled through a hierarchical process definition that allows efficient routing of processing tasks to at least one specialized model(s) and to declare different assurance levels based on certainty thresholds and authoritative knowledge or challenge-based verification. This can be linked to time (e.g., how fast can the recommendation be fielded), cost (what will it cost me monetarily or in trade such as in personal data), or risk (the difference between which medicines might cause a fatal drug interaction or is it faster to take the backroad or the highway home). This ensures that the most suitable model or gaggle of models is selected for each task (or subtask), optimizing performance and accuracy. Models are blended using expressive weighting schemes to combine their strengths and mitigating individual weaknesses. Coordinating models may also identify specific areas of expertise which demand higher levels of assurance or quality (e.g., the drug example) that may be elevated by the provider separately from user intentions or preferences for provider purposes such as brand, legal or liability reasons.

Comprehensive feedback loops integrate considerations of security, licensing, economic factors, energy consumption, data/model provenance and traceability to facilitate collaborative model and knowledge corpus development. Provenance graphing and administrative details captured by the system enable federated ownership of such system components when multiple economic counterparties are collaborating and support accountability even when a monolithic ownership or execution structure is in place.

For generative workflows such as scene or sequence creation, the system maintains overall and element specific consistency by aligning entities, narrative elements, and positions across frames in space and time (or at least in order). Knowledge graph and vector representations or embeddings lookups supplement scene refinement and consistency efficiency. Multi-modal generation harmonizes various senses like sound and smell, while expert models or curated knowledge elements verify specific elements. Since multimodal query ingest and contextualization is akin to classifying scenes in a generative process like a cinematic video generation process, we note that intensive video and audio and sensor data rates are much higher than typical textual input. Often such material is also not perfectly synchronized with the language or text from a user or a description of such content. The velocity and volume of data in such cases requires efficient separation of multimodal elements into focused model elements.

Modality specific modeling classification elements supervised by a Coordinating process element in a distributed computational graph orchestrated processes allows for sequential representation of key elements and candidate classifications (e.g., objects, entities, relationships, positions) of such elements within and across modalities. System may elect into classification processes which are time independent or autoregressive (or both) to enable extraction of specific candidate facts, context, or snippets. Time independent, sequential or autoregressive meanings from such classification processes (usually connectionist) are then compared to vectorized content and knowledge graph content to refine the candidate meanings of the user input or inputs. The resulting output in the form of a structured query, an ontologically compliant expression of a query, or processed multimodal or textual prompt can then be passed to at least one artificial intelligence model (e.g., an LLM or diffusion model or variational autoencoder or kolmogorov arnold networks) or simulation model for analysis by system. In the generative case, comparisons between time independent, sequential and autoregressive scene elements across content within and across modalities allows for more efficient hierarchically recursive generation of content elements and combinations of content elements as building blocks for sensor feature representations (e.g., audio, video, smell, kinematic, accessibility like braille or sign language) of content.

Hyperparameter optimization of intra (e.g., temperature) and inter-model (e.g., blend) factors and settings or temporal considerations (e.g., time independent, sequential, autoregressive, or timelining) or modality integration hierarchies (e.g., audio and video with coordinating combiner versus integrated audio-video generation in single model) explores ideal classification, embedding and generation techniques, training datasets, model architectures and other factors, optionally guided by information theoretic metrics such mutual information gain or rate of information gain.

Symbolic knowledge extraction from raw data elements and vector embeddings enables linkage of the learned representations to structured ontologies, allowing neural and symbolic knowledge to be bridged for reasoning and generative purposes and to link different sources and structures of data as potential evidence for support of specific symbolic representations in the knowledge corpora in support of provenance, uncertainty quantification, evidence scoring or broader confidence evaluation or scoring.

The platform emphasizes the importance of considering various types of semantics, including, but not limited to, symbolic, distributional, compositional distributional, and information-theoretic compositional distributional semantics. This consideration allows the platform to capture and represent meaning at different levels of abstraction and compositionality, enabling a more comprehensive and nuanced understanding of the input data. By explicitly addressing these different types of semantics, the platform can leverage the strengths of each approach and combine them in a unified framework.

Symbolic semantics relies on explicit, structured representations of meaning using symbols and logical expressions. In this approach, the meaning of a concept is defined by its relationships to other concepts in a symbolic knowledge base, often represented using ontologies or logic-based formalisms. It is worth noting that the described denotational semantics provide mathematical descriptions of programming instructions independent of their operational behavior. This means that through techniques, such as extended lambda calculus, that underpin such approaches serve as a mathematical formalism, a metalanguage, for denotational definitions.

Symbolic semantics enables precise and interpretable reasoning, as the meaning is explicitly encoded in the symbols and their relationships. However, symbolic semantics can be brittle and struggle with handling ambiguity, context-dependence, and the open-ended nature of language.

Distributional semantics is based on the idea that the meaning of a word or concept can be inferred from its distribution across a large corpus of text data. This approach represents words as dense vectors (embeddings) in a high-dimensional space, where the proximity between vectors reflects their semantic similarity. Distributional semantics is driven by the statistical co-occurrence patterns of words in the data, capturing the idea that words with similar meanings tend to appear in similar contexts. While distributional semantics can capture rich semantic relationships and handle ambiguity, it lacks the explicit structure and interpretability of symbolic semantics.

Compositional distributional semantics aims to combine the strengths of distributional semantics with the compositionality of language, allowing for the construction of meaning from smaller units. In this approach, the meaning of a phrase or sentence is computed by composing the distributional representations (embeddings) of its constituent words or sub phrases. Compositional distributional semantics enables the generation of embeddings for novel or unseen phrases, based on the compositionality principle that the meaning of a complex expression is determined by the meanings of its parts and their mode of combination. Various compositional models have been proposed, such as additive models, multiplicative models, and neural network-based models (e.g., recursive neural networks, transformers).

Information-theoretic compositional or distributional semantics incorporates principles from information theory to quantify and optimize the information content, transmission, gain or loss in models such as in compositional distributional models. This approach aims to capture key elements such as the mutual information differences between the components of a compositional representation, ensuring that the composed meaning preserves the relevant information from the individual constituents. Information-theoretic measures, such as entropy, mutual information, and cross-entropy, are used to guide the learning and composition process, promoting representations that are informative, compact, and generalizable. By grounding compositional distributional semantics in information theory, this approach seeks to improve the interpretability, robustness, and efficiency of the resulting semantic representations mathematically. This can be furthered by blending such approaches at the information theoretical level and vector embedding representation with a formally curated knowledge graph or spatially or temporally enhanced or linked knowledge graph, noting that the spatial or temporal representations may be relative or absolute (e.g., GPS or a finite element mesh type analysis in the body or an entity for spatial resolution and temporally such as place during the life of a person based on age or absolute against our Gregorian calendar).

The distinction and integration of these different types of semantics are important for the platform's goal of achieving advanced reasoning and understanding in AI systems. By considering symbolic semantics, the invention can leverage the structured and interpretable aspects of meaning representation. Distributional semantics allows for capturing the statistical patterns and relationships in large-scale text data. Compositional distributional semantics enables the construction of meaning from smaller units, while information-theoretic principles guide the optimization of the compositional process.

By combining these different mathematical analysis and knowledge and semantic representation approaches, the platform aims to create a more comprehensive and expressive semantic representation of knowledge, rules, or models that can handle the complexities of language and reasoning across both deterministic and heuristic exploration regimes and across extrapolative and generative modeling techniques to include simulation modeling. The integration of symbolic and distributional semantics, along with compositional and information-theoretic principles, allows for a richer and more robust understanding of the input data, models, simulations, and knowledge representation, leading to improved performance in various ML/AI tasks such as natural language understanding, knowledge representation, inference, and generation across text and other forms of representation or media (e.g., voice, video, sound, print, art, etc.).

According to an embodiment, the systems, platforms, and methods described herein may implement Datalog in symbolic reasoning for AI-enhanced search and knowledge curation. Datalog is a declarative logic programming language that plays an important role in the context of reasoning within AI-enhanced search and knowledge curation. Datalog is a subset of Prolog, specifically designed for database queries. It is characterized by its simplicity and expressiveness, making it well-suited for defining and querying relationships within data. Datalog programs consist of a set of rules and facts that describe relationships and properties of entities. In Datalog, rules define logical relationships between different entities. For example, a rule might state that if "X is a parent of Y" and "Y is a parent of Z," then "X is a grandparent of Z." Facts are basic assertions about relationships or properties. For example, "Alice is a parent of Bob" and "Bob is a parent of Carol." Datalog can deduce new facts from existing ones using defined rules. For example, given the facts and rules mentioned above, Datalog can deduce that "Alice is a grandparent of Carol." Datalog is particularly good at handling transitive relationships. It can easily infer indirect relationships by chaining direct relationships. Users can write complex queries to extract specific information from the knowledge base. For example, querying for all grandparents in the data or finding all individuals connected through a series of relationships. Datalog engines are optimized for executing recursive queries efficiently, making them suitable for reasoning over large datasets and knowledge graphs.

Datalog excels at working with structured data, making it a natural fit for querying knowledge graphs. It can traverse the graph and infer new relationships based on existing nodes and edges. By defining rules in Datalog, it is possible to maintain the consistency of the knowledge base. New data can be validated against these rules to ensure it adheres to the logical structure. While LLMs and Kolmogorov-Arnold Networks (KANs) provide powerful generative and contextual understanding capabilities, integrating Datalog allows for precise logical reasoning. For instance, LLMs can generate potential relationships, which Datalog can then verify and formalize. According to an embodiment, LLMs can dynamically update the knowledge base with new facts and relationships. Datalog can then use these updates to infer additional facts and enrich the knowledge base further.

Datalog provides exact logical reasoning, ensuring that inferred relationships are accurate and reliable. Users can formulate complex queries that involve multiple layers of relationships, which traditional search engines cannot handle efficiently. Datalog's ability to handle structured data and perform semantic searches enhances the representation and retrieval of knowledge. The ability to deduce new information and infer additional relationships adds depth to the knowledge base, making it more comprehensive and valuable.

According to an embodiment, integrating Datalog-like concepts within a streaming fixed point semantics rules engine, expressed as Distributed Computational Graphs (DAGs), enables advanced reasoning on multimodal inputs (e.g., text, sound, imagery, etc.). This setup helps in understanding a user's information needs, goals, and context, thereby improving the identification of relevant information and the curation of targeted responses. For example, the system continuously applies rules to incoming data until no new inferences can be made, reaching a fixed point. In a streaming context, the rules engine updates the fixed point dynamically as new data streams in. DAGs comprising nodes and edges may be used for parallel processing. Nodes represent computational tasks, such as applying a Datalog rule or performing an inference. Edges denote dependencies between tasks, ensuring proper data flow. DAGs allow for distributed and parallel processing across multiple nodes, enhancing scalability and performance. The disclosed invention also enables full directed graphs (i.e. limited cycles) to be expressed for more complex recursive tasks and employs a just-in-time DAG (directed acyclic graph) computation process to ensure no 'halting problem' infinite loops are submitted for execution.

Furthermore, the system can combine text, sound, and imagery into a unified representation using embedding techniques to map different modalities into a common vector space and extract features from each modality (e.g., text embeddings, audio spectrograms, image features). To understand user needs, goals, and context the system can maintain profiles capturing user preferences, past interactions, and context. The system can use NLP or LLMs for text analysis and other techniques for sound and imagery (e.g., $3d$ point clouds) to recognize user locality, environment, time, intent and emotions. The system can infer the user's goals based on multimodal input analysis and contextual data.

The system can perform rule-based inference with Datalog. This may comprise the use of Datalog-like rules to infer new facts and relationships from combined multimodal data. For example:

```
"'datalog
user_needs_recommendation(User, Camera):—user_qu-
    ery(User, "camera"),
detected_emotion(User, excited).
suitable_camera(Camera):—camera_feature(Camera,
    "high_zoom"), camera_feature(Camera, "fast_shut-
    ter").
```

The system may continuously update the fixed point as new data streams in, ensuring up-to-date and relevant inferences. The system can perform response curation that is both personalized and in the appropriate output format. The system can tailor responses based on inferred user needs, goals, and context. Use the enriched knowledge base for targeted recommendations. The system can provide responses in appropriate formats, matching input modalities (e.g., text, audio, images).

According to an embodiment, the system and methods described herein utilize model provenance and symbolic knowledge curation to enhance search and reasoning capabilities compared to purely connectionist approaches. LLMs, such as those used in ChatGPT, are often described as 'black boxes' due to their complex, inscrutable decision-making processes. This lack of transparency can lead to mistrust and unpredictable behavior. Efforts to reverse-engineer these models and understand their decision-making processes are still in their infancy. This complexity makes it difficult to ensure the safety, reliability, and ethical use of AI systems. Tracking the provenance of models—how they are trained, what data they use, and how they evolve—is crucial for accountability. This is especially important when AI systems are used in high-stakes environments like healthcare, legal decision-making, or financial services. Regulations such as the European Union's AI Act require high-risk AI systems to be explainable. Ensuring model provenance helps meet these regulatory requirements and fosters trust among users and stakeholders.

Symbolic AI methods, which involve explicit rules and logical reasoning, provide inherent explainability. They allow users to understand why a particular decision was made, which is essential for trust and accountability. Symbolic representations ensure consistency in decision-making, as they rely on well-defined rules and knowledge bases. Neurosymbolic AI combines the learning capabilities of neural networks with the reasoning capabilities of symbolic AI. This hybrid approach can address the black box problem by providing explainable and consistent reasoning. Curating knowledge using ontologies and knowledge graphs allows for structured and systematic representation of domain-specific information. This enhances the model's ability to reason and provide contextually relevant answers.

Neurosymbolic AI can understand and reason about the user's context, goals, and preferences. This enables more accurate and relevant search results and recommendations. By leveraging symbolic knowledge curation, digital doppelgängers can proactively assist users by anticipating their needs and providing timely suggestions. For example, identifying a delay in the shipment of materials and suggesting alternatives which are economically and aesthetically viable.

As an example, consider a construction scenario. Real-time monitoring identifies a delay in the shipment of real wood siding for a construction project. The system analyzes the impact of the delay on the project timeline and costs using probabilistic models. The system queries a knowledge graph of construction materials to identify viable alternatives that meet LEED standards. Using neurosymbolic reasoning, the system evaluates alternatives based on criteria such as availability, cost, and sustainability. The system automatically initiates procurement of the selected alternative materials through integrated e-commerce systems. Project schedules are dynamically adjusted based on the new procurement timeline.

Providing explanations for AI decisions builds user trust and enables informed decision-making. Understanding how models make decisions helps identify and mitigate biases, ensuring fair and ethical AI usage. In critical applications, such as autonomous driving or healthcare, understanding and explaining AI decisions is paramount for safety and reliability. Ensuring that AI systems operate transparently and ethically is essential for gaining public trust and acceptance. The integration of model provenance and symbolic knowledge curation with neurosymbolic AI significantly enhances the capabilities of digital doppelgängers. This approach provides explainability, accountability, and reliability, addressing the limitations of purely connectionist LLMs. By understanding the internal workings of AI models and curating structured knowledge, we can build AI systems that not only perform complex tasks but do so in a transparent, trustworthy, and ethical manner. This evolution from a grab bag of facts to process-embedded enrichment within workflows exemplifies the future of intelligent and reliable AI assistance.

According to an embodiment, the systems, platforms, and methods described herein can support federation of knowledge across devices and cloud-based systems. The federation of knowledge across devices and the cloud involves the distribution and management of data in a way that balances privacy, performance, and user control. By leveraging existing techniques, foundational models, and local knowledge base approaches, a superior privacy and performance model can be achieved.

According to an embodiment, the system includes or integrates with a multimodal interface allowing language, image, video, sound, smell, environmental characteristics (e.g., temp, humidity, environmental conditions or contaminants), resources available to user (e.g., alone and lost wallet and only have my cell phone) interface for users to interact with the semantic search and access information or gain recommendations or initiate actions.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "explainability" (also referred to as "interpretability") is the concept that a machine learning model and its output can be explained in a way that "makes sense" to a human being at an acceptable level.

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall," "DOB Aug. 13, 1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within a transformation pipeline are represented as a directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships and node types and subgraphs, which may be optionally stored, represented, or acted upon. It is also important to note that the resource topologies available at a given execution time for a given pipeline may be highly dynamic due to changes in available node or edge types or topologies (e.g., different servers, data centers, devices, network links, etc.) being available, and this is even more so when legal, regulatory, privacy and security considerations are included in a DCG pipeline specification or recipe in the DSL. Since the system can have a range of parameters (e.g., authorized to do transformation x at compute locations of a, b, or c) the JIT, JIC, JIP elements can leverage system state information (about both the processing system and the observed system of interest) and planning or modeling modules to compute at least one parameter set (e.g., execution of pipeline may say based on current conditions use compute location b) at execution time. This may also be done at the highest level or delegated to lower-level resources when considering the spectrum from centralized cloud clusters (i.e. higher) to extreme edge (e.g., a wearable, or phone or laptop). The examples given were chosen for illustrative purposes only and represent a small number of the simplest of possibilities. These examples should not be taken to define the possible graphs expected as part of an operation of the invention.

As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "pipeline," as used herein and interchangeably referred to as a "data pipeline" or a "processing pipeline," refers to a set of data streaming activities and batch activities. Streaming and batch activities can be connected indiscriminately within a pipeline and compute, transport or storage (including temporary in-memory persistence such as Kafka topics) may be optionally inferred/suggested by the system or may be expressly defined in the pipeline domain specific language. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, a certain data size or chunk, or optionally an internal (e.g., APM or trace or resource-based trigger) or external trigger (e.g., from another user, pipeline, or exogenous service). The events are held in a queue (e.g., Kafka) or similar until processing. Each batch activity may contain a "source" data context (this may be a streaming context if the upstream activities are streaming), and a "destination" data context (which is passed to the next activity). Streaming activities may sometimes have an optional "destination" streaming data context (optional meaning: caching/persistence of events vs. ephemeral). System also contains a database containing all data pipelines as templates, recipes, or as run at execution time to enable post-hoc reconstruction or re-evaluation with a modified topology of the resources (e.g., compute, transport or storage), transformations, or data involved.

As used herein, a "domain-specific ontology" refers to the meaning of a concept within a particular ontological domain (i.e., a set of reference ideas that establishes context). For example, the word "card" has many different meanings, depending on the ontological domain (context) in which it is used. In the domain of poker, the term "card" would refer to a "playing card" as used in playing the game of poker. In the domain of computer software, the term "card" may refer to the antiquated "punch card" form of information storage. In the domain of computer hardware, the term "card" could refer to a "video card", an "SD card" (a type of memory storage device), or similar pieces of hardware.

As used herein, the term "upper ontology" refers to a model of things that are common across a range of domain-specific ontologies. Existing upper ontologies are typically still limited to a particular field of application (e.g., medicine, scientific information retrieval, business organization, etc.). Importantly, existing ontologies are manually created. Partial or full automation of the ontology creation process is an aspect of this disclosure. Another aspect of this disclosure is automated creation of an upper ontology of sufficient sophistication to allow genuine semantic searching.

Conceptual Architecture

Figure 21:
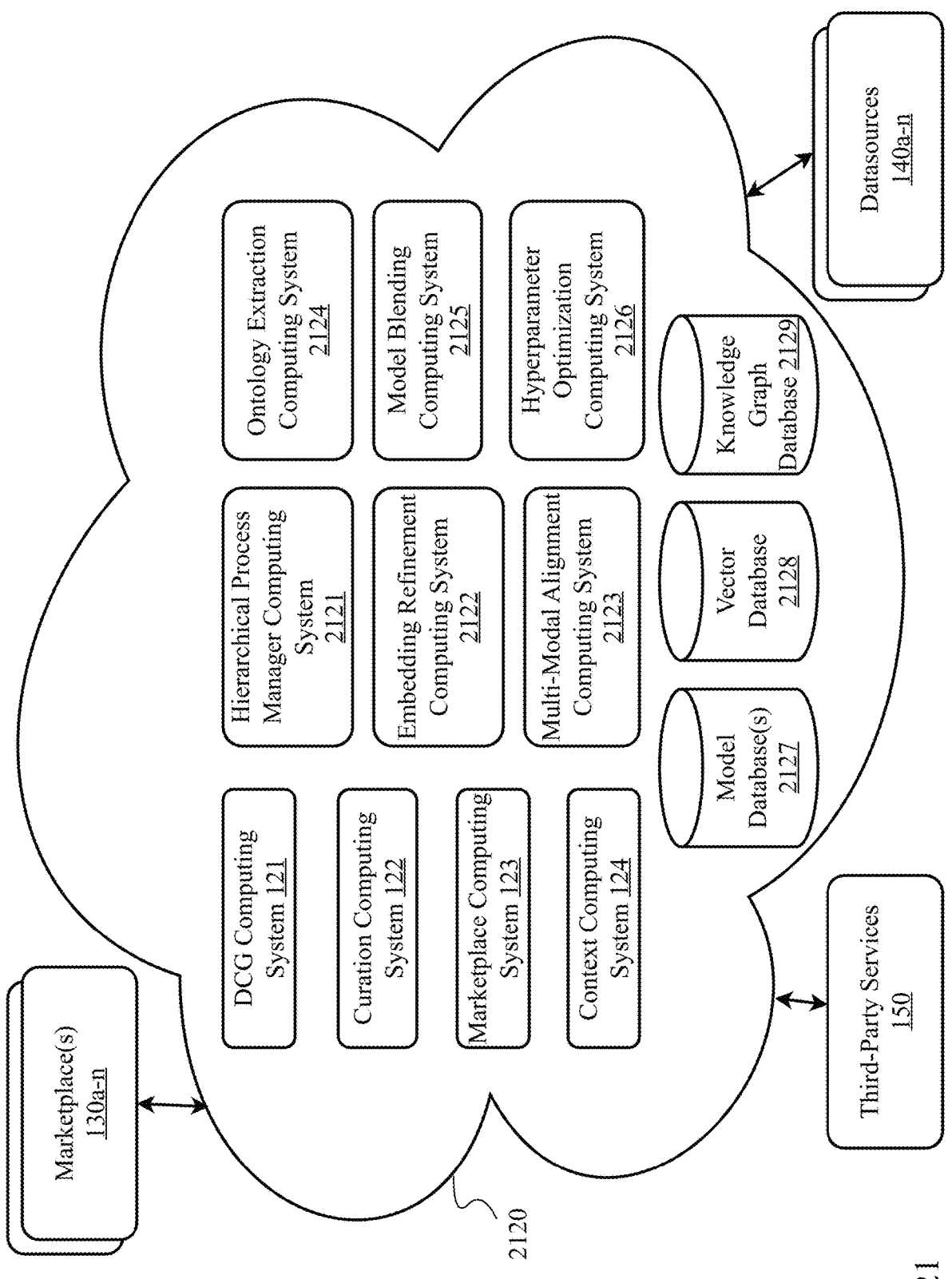
FIG. 21 is a block diagram illustrating an exemplary system architecture for a distributed, composite symbolic and non-symbolic AI platform for advanced reasoning, according to an embodiment.

FIG. 21 is a block diagram illustrating an exemplary system architecture for a distributed, composite symbolic and non-symbolic AI platform for advanced reasoning 2120, according to an embodiment. According to the embodiment, the platform 2120 aims to enable vast automation of modeling/analysis workflows by exploring large potential parameter combinations. Platform 2120 can be configured for extracting and curating knowledge into structured ontologies to complement neuro-symbolic AI capabilities.

Platform 2120 can provide an iterative multi-dimensional optimization and evaluation process to explore the relative performance of the different techniques, datasets, and "fitness of purpose" definitions (e.g., security, licenses, traceability/provenance, etc.) associated with a plurality of AI models.

According to the embodiment, platform 2120 is configured as a cloud-based computing platform comprising various system or sub-system components configured to provide functionality directed to the execution of composite symbolic generative AI reasoning and action. Exemplary platform systems can include a distributed computational graph (DCG) computing system 121, a curation computing system 122, a marketplace computing system 123, and a context computing system 124, a hierarchical process manager computing system 2121, an embedding refinement computing system 2122, a multi-modal alignment computing system 2123, an ontology extraction computing system 2124, a model blending computing system 2125, and a hyperparameter optimization computing system 2126. Platform 2120 may further comprise various databases for storing a plurality of data sets, models 2127, vectors/embeddings 2128, and knowledge graphs 2129. In some embodiments, systems 121-124 and 2121-2126 may each be implemented as standalone software applications or as a services/microservices architecture which can be deployed (via platform 120 or 2120) to perform a specific task or functionality. In such an arrangement, services can communicate with each other over an appropriate network using lightweight protocols such as HTTP, gRPC, or message queues (e.g., AMQP or Kafka). This allows for asynchronous and decoupled communication between services. Services may be scaled independently based on demand, which allows for better resource utilization and improved performance. Services may be deployed using containerization technologies such as Docker or containerized and orchestrated using container orchestration platforms like Kubernetes. This allows for more flexible deployment and management of services.

The composite symbolic AI reasoning and action platform 2120 can enable a more flexible approach to incorporating machine learning (ML) or artificial intelligence (AI) models into the future of the Internet and software applications; all facilitated by a distributed computational graph (DCG) architecture capable of dynamically creating, persisting, retraining, augmenting, selecting, executing, decommissioning, and incorporating trained models with both internal and external data sources and marketplaces for data and algorithms and expertise (e.g., expert or layperson or user feedback or knowledge) at the data, model, knowledge, or process levels.

The platform 2120 emphasizes the importance of considering various types of semantics, including, but not limited to, symbolic, distributional, compositional distributional, and information-theoretic compositional distributional semantics. This consideration allows the platform to capture and represent meaning at different levels of abstraction and compositionality, enabling more comprehensive and nuanced understanding of the input data in its original, intermediate, or curated forms. By explicitly addressing these different types of semantics, the platform 2120 can leverage the strengths of each approach and combine them in a unified framework.

In some cases, the platform may be configured to label non-textual data (e.g., images or scenes) with textual descriptions before computing embeddings. This labeling step converts the non-textual data into a textual representation (or other representations like image or domain similar to Fourier transforms), which can then be processed using language-based techniques that are more well-developed and understood or consistent or otherwise advantageous. By bridging the gap between non-textual and textual data through labeling, the platform can take advantage of the rich semantic information captured by language models and embeddings into text or alternative media or domain formats. After labeling non-textual data (if applicable), the platform computes numerical embedding representations of the input data in a given format. These embeddings capture the semantic properties and relationships of the data in a dense vector format, enabling efficient storage, retrieval, and comparison. The computed embeddings may then be persisted in memory or in a database such as a vector database, which allows for fast and scalable similarity search (e.g., cosine, dot product, Euclidean, etc.) and other vector operations or graph operations or hybrid representations depending on the data type, representation, and elements such as facts, spatial or temporal dynamics of the systems and/or entities of interest. The persisted embeddings serve as input features for downstream ML or AI models, such as neural networks or symbolic reasoning engines, or knowledge bases. By incorporating the embeddings or representations into these versioned models, the platform can leverage the information captured by the embeddings to improve the performance and generalization of the AI system under different operating environments or conditions and assess ongoing fitness for purpose using ongoing pipeline fitness evaluation functions executed on event or periodic basis. The integration of embeddings with downstream models allows for seamless knowledge accumulation and transfer and enables the AI system to make informed curation and event or context-based decisions based on the semantic understanding of observed input data, simulated input data, submitted user actions, submitted event data, ongoing system state information or operational information or simulated versions of potential versions of the aforementioned elements.

According to the embodiment, platform 2120 utilizes a plurality of neural network models that generate vector embeddings representing input data. The plurality of neural network models may be stored in model database 2127. Each of the plurality of neural network models may be associated with a specific type of AI system (e.g., gaming, medical diagnosis, sentiment analysis, LLM, recommendation system, virtual reality, autonomous vehicle, etc.). As such, models and AI systems may be used interchangeably throughout this specification. Platform can use various neural network architectures as previously detailed such as Transformers, Long Short-Term Memory (LSTM), or convolutional neural networks (CNNs) to process different types of input data (text, images, audio, video, 3d or 4-d models, etc.). In some implementations, platform can train these models on large datasets to learn meaningful vector or graph or SQL or NoSQL representations that capture the properties and relationships of the input data-ideally based on semantified representations of the data but also on unstructured, structured, schematized, normalized or partially semantified basis. Platform may leverage techniques like transfer learning, fine-tuning, or multi-task learning to improve the quality and generalizability of the embeddings. For example, a text classification system that uses a BERT model to generate embeddings for input documents, and a CNN model to generate embeddings for images associated with the documents. The embeddings may then be concatenated and fed into a final classification layer.

Embeddings are dense vector representations that capture the semantic meaning and relationships of data points. Vector databases 2128 store and index these embeddings for efficient retrieval and similarity search. Platform 2120 can facilitate iterative refinement which updates the embeddings based on new data or feedback to improve their quality and representational power. For example, a recommendation AI system uses embeddings to represent user preferences and item characteristics. As users interact with the system, their feedback is used to iteratively refine the embeddings, making them more accurate predictors of user interests. The refined embeddings are stored in a vector database for fast retrieval during recommendation generation.

According to the embodiment, a knowledge graph database 2129 is present comprising symbolic facts, entities, and relations. Platform may use an ontology or schema for the knowledge graph that defines the types of entities, relationships, and attributes relevant to the given AI system's domain. Platform populates the knowledge graph with data from structured sources (e.g., databases) and unstructured sources (e.g., text documents) using information extraction techniques like named entity recognition, relation extraction, and/or co-reference resolution. Knowledge graph database 2129 may be implemented as a graph database (e.g., Neo4j, ArangoDB) or a triple store (e.g., Apache Jena) to efficiently store and query the knowledge graph. Knowledge graph database 2129 may comprise a plurality of knowledge graphs, wherein knowledge graphs may be associated with a specific domain. For example, a biomedical knowledge graph that contains entities such as drugs, diseases, and genes, and relationships like "treats", "causes", and "interacts_with". This exemplary knowledge graph is populated from structured databases like DrugBank and UniProt, as well as from unstructured sources like publications.

According to the embodiment, hierarchical process manager computing system 2121 is present and configured to route processing based on certainty thresholds (e.g., certification) and challenge-based verification. Platform may define a hierarchy of reasoning tasks and subtasks that break down the AI system's (e.g., models) decision-making process into manageable steps. Process manager 2121 orchestrates the execution of these tasks and routes data to the appropriate models or knowledge sources based on predefined rules or learned policies. Process manager 2121 or an administrator may set certainty thresholds for each task to determine when the system should proceed to the next step or seek additional information/verification. Process manager 2121 can design and leverage challenge-based verification mechanisms (e.g., adversarial examples, counterfactual reasoning, etc.) to test the robustness and reliability of the AI system's decisions. For example, a fraud detection system that first uses a rule-based model to flag potentially fraudulent transactions based on simple heuristics. If the certainty of the rule-based model is below a threshold, the transaction is routed to a more complex machine learning model for further analysis. The final decision is then verified through a challenge-response mechanism that asks the user to provide additional authentication.

Hierarchical process definitions break down complex reasoning tasks into smaller, more manageable steps. The system may note decomposable workflows which can be independently evaluated and also evaluations which require coordination or contextualization based on ongoing feedback from aggregated data or evaluation results and therefore require intermediate state sharing across resources at the actor, virtual or physical resource level. Specialized routing dynamically selects the most appropriate AI models or knowledge sources for each subtask based on their capabilities and performance. For example, an autonomous vehicle AI system uses a hierarchical process to handle different driving situations. At a top level, the platform decides whether to use models specialized for highway driving, city navigation, or parking. Within each specialization, further routing occurs to handle specific challenges like merging, pedestrian detection, or parallel parking.

Certification involves validating the performance and reliability of AI models through rigorous testing and evaluation. Challenge-based verification sets up specific test cases or benchmarks that models must pass to be considered certified for a given task. Model blending combines the outputs of multiple models using weighted averaging or more sophisticated methods to improve overall performance. For example, a financial forecasting AI system blends the predictions of several certified models, each specializing in different asset classes or market conditions. The blending weights are adjusted based on each model's historical performance and current market challenges.

According to the embodiment, embedding refinement computing system 2122 is present and configured to incorporate data from one or more knowledge graphs. Embedding refinement 2122 may utilize algorithms that can query the knowledge graph to retrieve relevant facts, entities, and relationships based on the input data and the current reasoning context. Retrieved knowledge may be used to refine the vector embeddings generated by the neural networks models, incorporating symbolic information into the distributed representations (embeddings). In some implementations, techniques like attention mechanisms, graph convolutions, and/or knowledge-aware language models to effectively combine the embeddings with the knowledge graph data. For example, consider a recommendation system that generates initial embeddings for users and items based on their interaction history. The platform then queries a knowledge graph of user demographics, item categories, and contextual factors (e.g., time, location) to retrieve relevant information. This information can be used to refine the user and item embeddings through, for example, a graph attention network, incorporating the contextual knowledge into the recommendations.

According to an embodiment, embedding refinement computing system 2122 may be configured to extract symbolic representations from connectivist models (noting the model training process/data/approach and embeddings used) to identify observational links to symbolic principles. This may leverage a sufficiently robust knowledge graph of "facts" and "things" and a separate knowledge corpus for "principles" of interaction (i.e., foundational physics, chemical, energy, etc. . . . concepts). Metadata, which provides additional context or information to data or systems, is increasingly being utilized to enhance the performance of deep learning systems, particularly in applications such as conversational agents. This metadata can take various forms, ranging from simple keywords to extensive logical background theories, and includes structured background knowledge like knowledge bases and knowledge graphs. One area where metadata is proving valuable is in improving zero-shot learning through the use of knowledge graphs. Metadata can also help improve out-of-sample generalizability and ensure safety guarantees in neural control systems. Additionally, structured background knowledge is being leveraged to enhance coherence and consistency in neural sequence models. Similarly, natural language fact statements are being employed as background knowledge for deep-learning-based conversation agents. Although this approach may not be strictly classified as neuro-symbolic since it utilizes natural language rather than structured metadata, it is closely related to other work in this field.

Symbolic representations can be leveraged for inference of additional relationships between and among information. By identifying patterns and regularities in the data, symbolic systems can infer new relationships. For instance, if it is known that "A is a parent of B" and "B is a parent of C," the system can infer that "A is a grandparent of C." Symbolic reasoning can deduce transitive relationships. If "A is related to B" and "B is related to C," the system can infer that "A is related to C." Symbolic representations enhance semantic search by linking related concepts and entities, enriching the search results with inferred connections. Integrating vector databases with symbolic knowledge graphs allows for more robust inference capabilities. The semantic embeddings can suggest potential relationships, which are then validated and structured symbolically.

A Graph Attention Network (GAT) is a type of neural network architecture designed to operate on graph-structured data. It leverages the concept of self-attention to compute the importance of neighboring nodes in a graph, allowing the network to focus on the most relevant information when making predictions or generating representations. The key advantage of GATs is their ability to capture the importance of neighboring nodes based on their feature compatibility, allowing the network to focus on the most relevant information. This attention mechanism enables GATs to effectively handle graph-structured data and learn meaningful representations of nodes and their relationships.

According to the embodiment, model blending computing system 2125 is present and configured to apply expressive weighting schemes to model combinations. Platform may leverage a model blending architecture that can combine the outputs of multiple neural network models based on their individual strengths and weaknesses. Such a system may use weighting schemes that can dynamically adjust the contribution of each model based on factors like uncertainty, task complexity, or domain relevance. Techniques such as Bayesian model averaging, mixture of experts, and/or ensemble learning may be implemented to optimally blend the model outputs. For example, consider a sentiment analysis system that combines the outputs of three models: a Naive Bayes model, an LSTM model, and a BERT model. Model blending 2125 assigns weights to each model based on their confidence scores and the complexity of the input text. The weights are learned through a reinforcement learning approach that optimizes the overall sentiment classification performance.

According to the embodiment, platform 2120 implements feedback loops considering security, licensing, provenance, and collaborative development. Feedback loops allow the AI system to learn and adapt based on real-world performance and user feedback. Security considerations ensure that the AI system is protected against malicious attacks or misuse. For example, implementing secure communication protocols and access controls mechanisms to protect sensitive data and prevent unauthorized access to the AI system. Economic factors optimize the cost-benefit trade-offs of different model configuration and deployment strategies. Licensing takes into account the legal rights and restrictions associated with using certain datasets or model components. Platform 2120 can monitor and ensure compliance with the terms and conditions of licensing of datasets, models, and tools used by platform. Traceability/provenance keeps track of the lineage of data sources, training processes, and model versions used in each output. Model collaboration enables different teams or organizations to jointly develop, test, deploy, and improve AI models while maintaining security and provenance. For example, a healthcare AI system incorporates feedback from doctors and patients to continually refine its diagnosis and treatment recommendations. The system logs each decision's provenance and securely shares performance data with research partners under appropriate licensing terms. As another example, consider a federated learning system for medical image analysis that allows multiple hospitals to collaboratively train a deep learning model without sharing raw patient data. The system uses secure multi-party computation and differential privacy techniques to protect patient privacy. The model's provenance is tracked using a blockchain-based ledger, ensuring transparency and accountability. The system also includes a licensing management component that enforces usage restrictions based on each hospital's data sharing agreements.

According to the embodiment, multi-modal computing system 2123 is present and configured to align and synchronize representations across different data modalities (e.g., text, images, audio, etc.) to create a unified and consistent representation of the input data. Multi-modal system 2123 may implement techniques such as cross-modal attention, multi-modal fusion, and/or joint embedding spaces to effectively combine information from different modalities. Platform can utilize domain-specific knowledge (e.g., physics, psychology) (from knowledge graphs) to ensure the generated representations are consistent and realistic across modalities. For example, consider a virtual assistant that can process user queries in the form of text, speech, and images. The multi-modal system 2123 uses cross-modal attention to align the representations of the different input modalities, creating a unified query representation. For example, if the user asks, "What is the breed of the dog in this picture?", the engine aligns the image embedding with the relevant parts of the text embedding to understand that the query is about identifying the dog breed.

According to the embodiment, hyperparameter optimization computing system 2126 is present and configured to use information theoretic guidance for optimization tasks. System 2126 may implement an automated hyperparameter optimization framework (e.g., Bayesian optimization, evolutionary algorithms, etc.) to search for the best combination of model architectures, training settings, and embedding techniques. System 2126 can use information-theoretic measures (e.g., mutual information, Kullback-Leibler divergence) to guide the optimization process and select hyperparameters that maximize the information content and generalization ability of the learned representations. In some implementations, platform 2120 may develop efficient parallel computing strategies to speed up the hyperparameter search process and explore a larger space of configurations. For example, consider a natural language generation system that uses a variational autoencoder (VAE) to generate diverse and coherent sentences. The hyperparameter optimization system 2126 uses Bayesian optimization to search for the best combination of latent space dimensionality, regularization strength, and decoder architecture. The optimization is guided by an information-theoretic objective that maximizes the mutual information between the latent space and the generated sentences, ensuring that the VAE captures meaningful and interpretable representations.

In some embodiments, hyperparameters may also be defined by expert judgment via experts and made available via a hyperparameter expert judgment marketplace.

Embedding generation techniques convert raw data into dense vector representations. Different techniques (e.g., Word2Vec, GloVe, BERT, etc.) have different strengths and weaknesses. Training data selection and processing impact the quality and generalizability of the learned embeddings. Model type (e.g., perceptron, feedforward, radial basis network, deep feed forward, recurrent, long-short term memory, gated recurrent unit, auto encoder, variational autoencoder, denoising auto encoder, sparse autoencoder, Markov chain, Hopfield network, Boltzmann machine, restricted Boltzmann machine, deep belief network, deep convolutional network, convolutional network, deconvolutional network, deep convolutional inverse graphics network, general adversarial network, liquid state machine, extreme learning machine, echo state network, deep residual network, Kohonen network, support vector machine, neural turing machine etc.) and architecture (e.g., number of hidden layers, hidden units, etc.) influence the embedding learning process. Hyperparameter optimization searches and explorations for the best combination of embedding generation technique, training data, model type, and architecture to maximize the embedding quality and downstream task performance. For example, a sentiment analysis AI system experiments with different embedding generation techniques (Word2Vec, GloVe) and model architectures (long short-term memory, convolutional neural network) and dimensionality reduction techniques (e.g., none vs PCA vs ICA vs information sieve) to find the best combination for the specific domain and language as well as different system states (e.g., based on clustering algorithms for different operational modalities). The platform also tunes hyperparameters such as, for example, embedding dimensionality, context window size, randomness/temperature and learning rate to further improve performance or other measures of efficacy based on a narrow or system-wide or process-wide objective or fitness function.

Information theory provides another exemplary mathematical framework for quantifying and understanding the properties of embeddings, such as their information content or gain when compared to an alternative, compression, and generalization ability. Theoretical analysis may apply information-theoretic concepts and measures to study the effectiveness of different embedding methods and guide their development or data set or model or parameter or encoding/serialization/compression. For example, platform 2120 analyzes the mutual information between word embeddings and their context to quantify the amount of semantic information captured or gained. Platform may then use this analysis to propose a new embedding method that maximizes mutual information while minimizing redundancy, resulting in more informative and compact representations on either a marginal or absolute basis, or both.

According to an embodiment, hyperparameter optimization computing system 2126 can be configured to perform objective scoring and ranking for various embedding and/or semantic representation approaches. Examples of semantic representation approaches can include, but are not limited to, symbolic paradigm, vector space model, count-based language models, neural language models, and compositional distributional approaches. Exemplary embedding processes can include, GPT systems, unsupervised BERT, supervised S-BERT, and Word2Vec. These embedding/semantic representation approaches may utilize linguistic structures such as sequential (L2R and R2L), constituents, and dependency trees. Similarity metrics which can be used to assess such embedding/semantic representation approaches can include, but are not limited to, cosine similarity, dot product, $ICM_\beta$, and Euclidean similarity. The platform can offer a plurality of common datasets on which to evaluate these embedding/semantic representation approaches to perform objective scoring and ranking. The platform can provide an iterative multi-dimensional optimization and evaluation process to explore the relative performance of the different techniques, data sets, and "fitness of purpose" definitions that include all the traditional elements such as, for example, security, licenses, traceability, etc.

According to the embodiment, ontology extraction computing system 2124 is present and configured to link data elements, facts, or embeddings to symbolic knowledge graphs or ontological entities. Connectionist models (e.g., neural networks) learn distributed representations that capture patterns and relationships in data, but these representations are not directly interpretable as symbolic knowledge. Extracting symbolic representations involves techniques like rule extraction, decision tree induction, or clustering to distill the learned knowledge into a symbolic form in terms of both allowed elements in an ontology or instances of such elements. Linking the extracted symbolic representations to existing knowledge graphs (or extending or amending underlying ontologies dynamically based on accumulated data or experiences) enables the integration of the learned knowledge with or without prior domain expertise, facilitating more comprehensive and explainable reasoning for both connectionist and symbolic modeling regimes as well as for simulation based modeling initiatives supporting synthetic data generation for simulation-based and empirical real-world observation and refinement. For example, a medical diagnosis AI system based on a deep neural network learns to classify diseases from patient data. The platform 2120 extracts symbolic rules or representations from data of interest via a model (e.g., a trained network), expressing the learned decision boundaries in terms of interpretable clinical features. These rules are then linked to a medical knowledge graph consisting of both an ontological framework, a corresponding query formalism, and a data set consisting of allowed ontology instances and characteristics, allowing the system to explain both its available reasoning in terms of known disease mechanisms and treatment guidelines. It is important to note that every version of such composite knowledge corpus may be numbered or uniquely identified as an element of a given decision, model training, or other system action for its stated purpose or for administrative or maintenance/system operation functions.

Ontology extraction system 2124 can leverage algorithms that can analyze the learned vector embeddings and extract symbolic representations (e.g., entities, relationships, rules, etc.) that capture the underlying semantic structure. In some implementations, techniques such as, for example, clustering, dimensionality reduction, and/or rule mining may be used to capture the underlying semantic structure. Ontology alignment and linking methods can be used to map the extracted symbolic representations to existing concepts and relationships in the knowledge graph, enabling seamless integration of the learned knowledge with prior domain expertise. For example, consider a legal case analysis system that uses a BERT model to generate embeddings for legal documents. The ontology extraction system can use hierarchical clustering to group the embeddings into semantically related clusters, and then apply association rule mining to discover relationships between the clusters. The extracted ontology is then linked to a legal knowledge graph that contains concepts like laws, precedents, and jurisdictions, enabling the system to reason about legal cases using both the learned embeddings and the symbolic knowledge.

According to an aspect of an embodiment, the data analyzed to read, create and update or evolve the ontologies includes temporal and spatial representations to aid the system in representing changes in language or concepts via versioned ontologies which collectively support more accurate and precise information representation, retrieval and reasoning.

Symbolic knowledge represents facts, rules, and relationships using structured formalisms like ontologies or knowledge graphs. Connectionist models, such as neural networks, learn distributed representations from data with explicit symbolic structure. Retrieval augmented generation (RAGs) enhance language models by incorporating an external knowledge retrieval mechanism. During the generation process, the model queries a knowledge base to retrieve relevant information and condition its outputs on both the input context and the retrieved knowledge. Expressive weightings allow the platform to dynamically adjust the influence of different knowledge sources based on their relevance to the current context. For example, a customer support AI system uses a knowledge graph of product information and troubleshooting procedures (symbolic) alongside a neural language model trained on past support interactions (connectionist). When generating responses to customer inquiries, the system employs RAG to retrieve relevant information from the knowledge graph and the language model to condition the responses on both the customer's input and the retrieved knowledge. The system assigns higher weights to knowledge sources that are more pertinent to the specific inquiry, ensuring accurate and context-appropriate responses. According to one embodiment, the platform 2120 can provide personalized content by using all information on a user such as browsing history, email content, chat history, social network data, etc. (all information big tech companies have access to), this data can also be fed into pre-LLM models to continue to refine and filter relevant data. This yields more accurate query/search results as they relate to the specific user.

According to the embodiment, platform 2120 can implement scene and/or scene graph generation with knowledge graph elements for contextual refinement. Scene generation creates realistic images, videos, or three-dimensional (3D) environments based on textual descriptions or other input data. Knowledge graph elements, such as object properties, relationships, and constraints, can be leveraged to guide the scene generation process to ensure consistency and realism. Contextual refinement adjusts the generated scene based on the specific context and purpose of the AI application. For example, a virtual reality AI system generates immersive scenes for training simulations. The platform can use a knowledge graph of object properties (e.g., materials, size, physics) and relationships (e.g., spatial constraints) to ensure physically plausible layouts. The generated scenes may be refined based on the specific training scenario and user interactions.

In addition to visual and textual data, platform 2120 incorporates other sensory modalities like sound and smell to create more immersive and realistic experiences. Harmonizing multiple senses involves aligning and synchronizing the different modalities to create a coherent and consistent output. For example, a gaming AI system generates realistic soundscapes and ambient scents to match the visual environment. The platform 2120 ensures that the sound of footsteps matches the character's movement and the smell of a forest scene includes the scent of pine trees and damp moss.

Scene graph generation is a computer vision task that involves analyzing an image and generating a structured representation, known as a scene graph, that captures the objects, their attributes, and the relationships between them within the image. A scene graph is a data structure that represents the semantic content of an image in a graphical format. It consists of nodes and edges, where: nodes represent the objects or entities present in the image, such as people, animals, vehicles, or other identifiable items; edges represent the relationships or interactions between the objects, such as "person riding a bike," "cat sitting on a chair," or "car parked next to a building"; and attributes are additional properties associated with the objects, such as color, size, pose, or any other relevant characteristics.

According to an embodiment, the process of scene graph generation typically involves the following steps: object detection: identifying and localizing the objects present in the image using object detection techniques like bounding box regression or segmentation; object classification: assigning class labels to the detected objects based on predefined categories; attribute prediction: determining the attributes associated with each object, such as color, size, or pose; and relationship prediction: inferring the relationships between the detected objects based on their spatial arrangement, context, and semantic understanding.

According to some embodiments, platform 2120 can be leveraged to develop enterprise-specific or domain-specific models, which can be "small models" that are more efficient, accurate, or predictable in specific contexts and prompts. These small models can be integrated into platform 2120 as specialized components that are selected and deployed based on the specific domain or task at hand. Hierarchical process manager 2121 can route the input data to the appropriate small model based on the context, ensuring optimal performance and efficiency.

Furthermore, platform 2120 can provide effective orchestration, selection, and management of small models, particularly in restricted or regulated domains such as medicine, investing, law, insurance, and banking. Platform's model blending system 2125 and feedback loops can be extended to incorporate the orchestration and management of small models, taking into account factors such as data nutrition labels, model labels, and administrative processes. The system can leverage existing system/platforms, and ML ops to facilitate the effective deployment and governance of small models.

In some implementations, the platform can train and deploy hybrid models that combine foundational connectionist models with additional symbolic models, simulations, or datasets and training processes to generate explanations, estimations, and specialized model combinations with different performance characteristics or fitness regimes or envelopes based on their provenance, included data or modeling elements, or even the people or other algorithms or AI agents involved in their creation or execution. The platform can incorporate these hybrid models as part of its model blending and composition capabilities, leveraging the strengths of different models for tasks such as explainability, auditing, and ML ops training/supervision. The ontology extraction system 2124 can help in generating explanations and traces from these hybrid models, enhancing the interpretability and transparency of the system's reasoning process.

The platform addresses the security and intellectual property concerns associated with foundational models, which are considered core IP and may be less likely to be exposed due to their immense cost, time, and sensitivity. The platform can utilize small models as a means of model obfuscation, where the sensitive foundational models are distilled into smaller, more focused models that can be deployed with less risk of information leakage. The platform can also incorporate techniques for model theft detection, such as using vector similarity scoring and hash-based functions to identify potential infringement of small models derived from foundational models.

The platform can leverage the use of ML ops optimization routines for model selection, training, classification, and dynamic deployment based on fitness for purpose. The platform can integrate these optimization techniques to dynamically select and deploy the most suitable small models based on the specific task, context, and performance requirements. The platform can also optimize model hyperparameters, such as temperature and token length, to balance performance, efficiency, and the generation of hallucinations or other undesired outputs.

By integrating the concepts and techniques related to small models, the platform can achieve greater efficiency, specialization, explainability, security, and adaptability. The use of domain-specific small models allows the system to tailor its reasoning and decision-making processes to specific contexts, while the orchestration and management capabilities ensure the effective deployment and governance of these models. The hybrid models and explainability techniques enhance the interpretability and transparency of the platform, enabling users to understand and trust its reasoning process. Simulations and uncertainty quantification routines to isolate the factors influencing deviation between expected and actual observations in empirical and synthetic data sets may be handled by the system, to include via DCG specified processes, to guide ongoing model and simulation training and fitness and selection routines and to guide AI agent and or human decision makers in the evaluation of data, ontology, model, simulation or process level decisions or fitness for a given situation or task. The model obfuscation and theft detection mechanisms may help protect the intellectual property and sensitive information associated with the core foundational models. Overall, the integration of small models into platform 2120 aligns with the broader goals of achieving advanced reasoning, adaptability, explainability, and security in AI systems. By leveraging the strengths of small models and incorporating them into the various components and processes of the system, the platform aims to push the boundaries of AI capabilities while addressing the practical challenges and requirements of real-world applications.

In some implementations, platform 2120 can be configured to provide capabilities directed to automatic error identification and correction, such as those provided by a self-healing neural graph AI. This AI system continuously monitors the operation of the computing device's hardware and software components, identifying anomalies, errors, or suboptimal performance. Upon detecting an issue, the self-healing neural graph AI dynamically reconfigures the system's resources, reroutes data flows, and adapts the computing graph to mitigate the problem and maintain optimal performance. This autonomous error identification and correction mechanism enhances the computing device's reliability, resilience, and ability to operate in demanding or unpredictable environments without the need for manual intervention.

According to an embodiment, platform 2120 may be configured with a distributed interface for reverse content curation with a bot interface for ad networks. To effectively manage and disseminate advertising content dynamically, companies can use a "bot" interface to communicate with ad networks like Google. This interface can query the company's ad bot for the latest information on what to display in advertisements. This approach can be integrated with existing mechanisms like Robots.txt to enhance search engine optimization (SEO) and manage public data for AI training. In this embodiment, platform 2120 may implement one or more ad interface bots that interface with ad networks to provide the latest advertising content and metadata. In an embodiment, the system uses resource description framework (RDF) or web ontology language (OWL) to define core semantics of the advertised products. It may further incorporate aspects to track and manage changes in the advertising content and metadata over time.

An exemplary workflow for ad bot integration may begin when a company updates its advertising content and metadata through its content management system. The ad interface bot interfaces with the company's system to retrieve the latest content and metadata. Ad networks like Google send queries to the company's ad interface bot to fetch the latest advertising information. The ad interface bot processes these queries and provides the requested information, including any semantic definitions and temporal metadata. The system can use RDF or OWL to create open ontologies that define the core semantics of the advertised products. The system can differentiate between "declared" intent by the site owner and "inferred" data from relevant links and data points, updating this over time as necessary. In an embodiment, the system can extend the Robots.txt functionality to include directives for the ad interface bot, and add semantic annotations to the website's content to improve discoverability and relevance in search results. The system may define and manage the data that can be used for training public AI models, ensuring compliance with the company's data policies.

Implementing an ad interface bot may comprise creating an API endpoint for ad networks to query the ad interface bot, and implementing mechanisms for the bot to retrieve the latest content and metadata from the company's content management system. In an embodiment, the system can integrate RDF/OWL processing capabilities to provide semantically enriched data. Some exemplary API interaction pseudocode is provided below:

```python
import requests
# Define the API endpoint
api_endpoint = "https://company.com/ad-interface-bot"
# Ad network queries for the latest advertising content
response = requests.get(api_endpoint, params={"query": "latest_ads"})
# Process the response
if response.status_code == 200:
    ad_content = response.json( )
    print("Latest ad content:", ad_content)
else:
    print("Failed to retrieve ad content")
```

The system may ensure all content and metadata include timestamps to manage their temporal aspects. The system may maintain a historical record of changes in advertising content and metadata for audit and analysis purposes.

As an example use case, consider a scenario for dynamic ad management for an E-commerce company. The e-commerce company updates its product advertisements with new promotions and metadata. The bot retrieves the updated content and semantic definitions, preparing to respond to queries. Google queries the bot to fetch the latest advertisements for display in its ad network. The bot provides the latest content along with semantic metadata defined using RDF/OWL, ensuring the ads are contextually relevant and up-to-date. The system logs all updates with timestamps, allowing the company to track the evolution of its advertising strategy over time.

Implementing a distributed interface with an ad interface bot for reverse content curation can significantly enhance the management and dissemination of advertising content. By integrating semantic web technologies and managing temporal aspects, companies can ensure their advertisements are always current, contextually relevant, and semantically enriched. This approach complements existing SEO mechanisms like Robots.txt, providing a robust framework for dynamic, data-driven advertising and content management. As AI-generated search bots like those from Google increasingly summarize data rather than presenting raw content from websites, it becomes crucial for companies to control and curate how their information is accessed and displayed. This shift necessitates the use of advanced interfaces for content curation, such as the proposed ad interface bot, to ensure accurate, relevant, and timely information dissemination.

As an example workflow, consider a scenario for managing a delay in the shipment of real wood siding. The bot monitors shipment status and detects a delay in real wood siding delivery. The bot analyzes the impact of the delay on the construction project timeline and budget. The bot queries the knowledge graph for LEED-compliant concrete siding alternatives and provides a list of viable alternatives with semantic precision. The system automatically initiates procurement of the selected alternative material and updates the project schedule and informs relevant stakeholders. Ad networks query the ad interface bot for the latest updates. The bot provides accurate, contextually relevant advertising content reflecting the current situation.

According to an embodiment, the implementation of a distributed interface for reverse content curation, combined with advanced AI techniques and semantic web technologies, can play a pivotal role in keeping search providers honest and holding them accountable for the relative weighting and importance of different links or vendors. The system and methods described herein can provide various solutions for distinguishing ads from organic search results. These solutions may comprise: Explicit Marking of Ad wherein the system ensures that all paid advertisements are clearly marked and differentiated from organic search results; transparent metadata wherein the system uses semantic annotations to provide transparent metadata about the nature of the content (e.g., ad vs. organic result); content provenance wherein the system tracks and makes visible the provenance (e.g., using blockchain) of content to ensure its authenticity and relevance; open ontologies wherein the system uses open ontologies in RDF/OWL to define the criteria for content relevance and importance, making the weighting process transparent; detailed result metadata wherein the system provides users with detailed metadata about each search result, including its source, how it was ranked, and why it was selected; feedback mechanisms wherein the system implements feedback mechanisms that allow users to report inaccuracies or biases, promoting accountability; compliance framework wherein the system develops a compliance framework that adheres to regulatory requirements and ethical standards for transparency and fairness; and independent audits wherein the system publishes regular audit reports that detail the performance and fairness of search algorithms, including any adjustments made in response to findings.

As an example workflow for ensuring transparency in search results, consider a user searching for eco-friendly building materials. The user searches for "eco-friendly building materials." The search engine queries the ad interface bot for the latest content from relevant vendors. The ad interface bot retrieves and curates content based on the latest data, ensuring that all information is accurate and up-to-date. Semantic metadata is added to distinguish between ads and organic results. Search results are generated based on a transparent ranking algorithm that uses open ontologies and RDF/OWL definitions. Each result includes detailed metadata about its source, ranking criteria, and whether it is an ad or an organic result. Results are presented to the user with clear markings for ads and organic results. A metadata dashboard provides detailed information about each result, including provenance and ranking criteria. Users can provide feedback on the search results, reporting any inaccuracies or perceived biases. The search engine adjusts its algorithms based on user feedback and conducts regular audits to ensure transparency and fairness.

Figure 22:
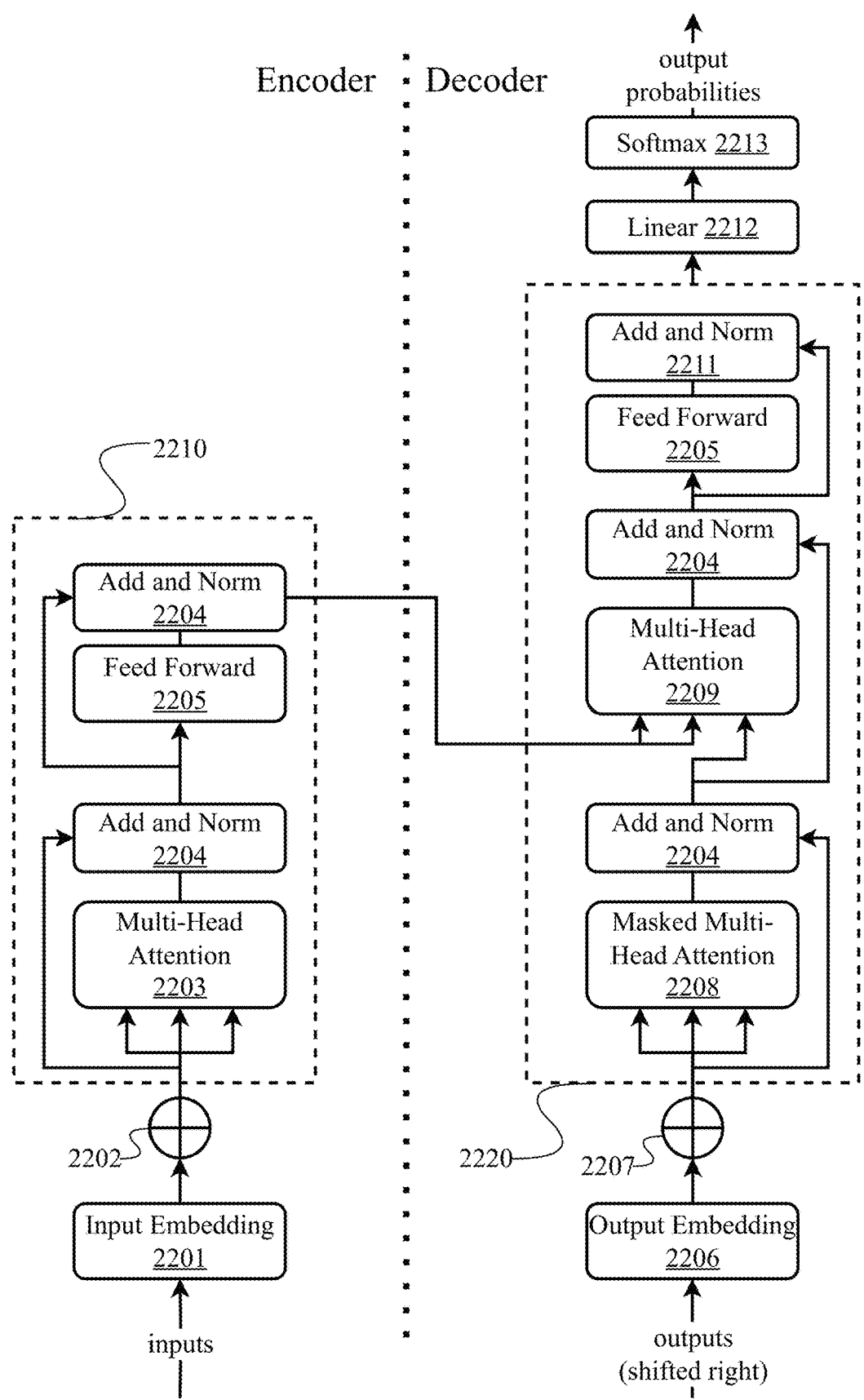
FIG. 22 is a block diagram illustrating an exemplary model architecture of the Transformer, consisting of an Encoder and a Decoder.

FIG. 22 is a block diagram illustrating an exemplary model architecture of the Transformer, consisting of an Encoder (the components on the left side of the illustration) and a Decoder (the components on the right side of the illustration). Transformers form the backbone of large language models. A large language model (LLM) is a type of artificial intelligence algorithm that utilizes deep learning techniques and massively large datasets to understand, summarize, generate and predict new content. The term generative AI is also closely connected to LLMs, which are a type of generative AI that has been specifically architected to help generate text-based content. All language models are first trained on a set of data, and then they make use of various techniques to infer relationships and then generate new content based on the trained data. Language models are commonly used in natural language processing (NLP) applications where a user inputs a query in natural language to generate a result.

An LLM is the evolution of the language model concept in AI that dramatically expands the data used for training and inference. In turn, it provides a massive increase in the capabilities of the AI model. While there isn't a universally accepted figure for how large the data set for training needs to be, an LLM typically has at least one billion or more parameters. Parameters are a machine learning term for the variables present in the model on which it was trained that can be used to infer new content.

Modern LLMs that have emerged within the last decade are based on transformer models, which are neural networks commonly referred to as transformers. With a large number of parameters and the transformer model, LLMs are able to understand and generate accurate responses rapidly, which makes the AI technology broadly applicable across many different domains. Some LLMs are referred to as foundation models, a term coined by the Stanford Institute for Human-Centered Artificial Intelligence in 2021. A foundation model is so large and impactful that it serves as the foundation for further optimizations and specific use cases.

LLMs take a complex approach that involves multiple components. At the foundational layer, an LLM needs to be trained on a large volume, sometimes referred to as a corpus, of data that is typically petabytes in size. The training can take multiple steps, usually starting with an unsupervised learning approach. In that approach, the model is trained on unstructured data and unlabeled data. The benefit of training on unlabeled data is that there is often vastly more data available. At this stage, the model begins to derive relationships between different words and concepts.

The next step for some LLMs is training and fine-tuning with a form of self-supervised learning. Here, some data labeling has occurred, assisting the model to more accurately identify different concepts.

Next, the LLM undertakes deep learning as it goes through the transformer neural network process. The transformer model architecture enables the LLM to understand and recognize the relationships and connections between words and concepts using a self-attention mechanism. That mechanism is able to assign a score, commonly referred to as a weight, to a given item (called a token) in order to determine the relationship.

Once an LLM has been trained, a base exists on which the AI can be used for practical purposes. By querying the LLM with a prompt, the AI model inference can generate a response, which could be an answer to a question, newly generated text, summarized text or a sentiment analysis report.

LLMs have become increasingly popular because they have broad applicability for a range of NLP tasks, including but not limited to, text generation, translation, content summary, rewriting content, classification and categorization, sentiment analysis, and conversational AI and chatbots.

There are numerous advantages that LLMs provide to organizations and users including, for example, extensibility and adaptability, flexibility, performance, accuracy, and ease of training. LLMs can serve as a foundation for customized use cases. Additional training on top of an LLM can create a finely tuned model for an organization's specific needs. One LLM can be used for many different tasks and deployments across organizations, users and applications. Modern LLMs are typically high-performing, with the ability to generate rapid, low-latency responses. As the number of parameters and the volume of trained data grow in an LLM, the transformer model is able to deliver increasing levels of accuracy. Many LLMs are trained on unlabeled data, which helps to accelerate the training process.

While there are many advantages to using LLMs, there are also several challenges and limitations such as, development costs (e.g., LLMs generally require large quantities of expensive graphics processing unit hardware and massive data sets), operational costs, bias, hallucination (e.g., AI hallucination occurs when an LLM provides an inaccurate response that is not based on trained data), complexity (e.g., with billions, or more, of parameters, modern LLMs are exceptionally complicated technologies that can be particularly complex to troubleshoot), and glitch tokens which are maliciously designed prompts to cause the LLM to malfunction.

There is an evolving set of terms to describe the different types of large language models. Among the common types are zero-shot models, fine-tuned or domain-specific models, language representation models, and multimodal models. A zero-shot model is a large, generalized model trained on a generic corpus of data that is able to give a fairly accurate result for general use cases, without the need for additional training. GPT-3 is often considered a zero-shot model. Fine-tuned/domain-specific models require additional training on top of a zero-shot model and can lead to a fine-tuned, domain-specific model. One example is OpenAI Codex, a domain-specific LLM for programming based on GPT-3. One example of a language representation model is Bidirectional Encoder Representations from Transformers (BERT), which makes use of deep learning and transformers well suited for NLP. Originally LLMs were specifically tuned just for text, but with the multimodal approach it is possible to handle both text and images. GPT-4 is an example of this type of model.

There are multiple important components significantly influencing the architecture of LLMs. The size of an LLM, often quantified by the number of parameters, greatly impacts its performance. Larger models tend to capture more intricate language patterns but require increased computational resources for training and inference. Effective input representations, like tokenization, are vital as they convert text into formats that the model can process. Special tokens, like [CLS] and [SEP] in BERT, enable the model to understand sentence relationships and structure. Pre-training objectives define how a model learns from unlabeled data. For instance, predicting masked words in BERT helps the model learn contextual word relationships, while autoregressive language modeling in GPT-3 teaches coherent text generation. The computational demands of LLMs can be mitigated through techniques like knowledge distillation, model pruning, and quantization. These methods maintain model efficiency without sacrificing performance. How a model generates output is essential. Greedy decoding, beam search, and nucleus sampling are techniques used in LLMs for coherent and diverse output generation. These methods balance between accuracy & creativity, while creating a significant difference between LLMs and traditional language models.

The illustrated Transformer comprises an Encoder and a Decoder. The Encoder takes input embeddings and processes them through a stack of layers (represented as dashed box 2210). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The input embedding 2201 to the Encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"-"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 2202 is added to the input embedding to provide position information to the model. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The Encoder utilizes a multi-head attention mechanism 2203 which is a key component of the Transformer architecture. It allows the Encoder to attend to different parts of the input sequence and capture dependencies between tokens. The attention mechanism computes three matrices: Query (Q), Key (K), and Value (V). The Query, Key, and Value matrices are obtained by linearly projecting the input embeddings using learned weight matrices. The attention scores are computed by taking the dot product of the Query matrix with the transpose of the Key matrix, followed by scaling and applying a softmax function. The attention scores determine the importance of each token in the input sequence for a given position. The Value matrix is then multiplied with the attention scores to obtain the weighted sum of the values, which forms the output of the attention mechanism. Multi-Head Attention splits the Query, Key, and Value matrices into multiple heads, allowing the model to attend to different aspects of the input simultaneously. The outputs from each head are concatenated and linearly projected to obtain the final output of the Multi-Head Attention layer 2203.

After the Multi-Head Attention layer, a residual connection is applied, followed by Layer Normalization at add and norm 2204. The residual connection adds the input embeddings to the output of the attention layer, helping the model learn faster and deeper. Layer Normalization normalizes the activations across the features, stabilizing the training process.

The Feed Forward layer 2205 is a fully connected neural network applied to each position of the Encoder's hidden states. It consists of two linear transformations with a Rectified Linear Unit (ReLU) activation function in between. The purpose of the Feed Forward layer is to introduce non-linearity and increase the model's capacity to learn complex representations. The output of the Feed Forward layer has the same dimensionality as the input embeddings. A residual connection and Layer Normalization 2204 are applied after the Feed Forward layer.

The Encoder layers 2210 are stacked Nx times, where N is a hyperparameter that determines the depth of the Encoder. Each layer follows the same structure: Multi-Head Attention, Add & Norm, Feed Forward, and Add & Norm. By stacking multiple Encoder layers, the model can capture hierarchical and long-range dependencies in the input sequence. The output of the final Encoder layer represents the encoded input sequence, which is then passed to the Decoder for generating the output sequence.

The Decoder generates the output probabilities. It has a similar structure to the Encoder, with a few additions. The Decoder takes output embeddings and processes them through a stack of layers (represented as dashed box 2220). The output embedding layer 2206 takes the previous output tokens (shifted right by one position) and converts them into dense vectors. Each token is mapped to a learnable embedding vector of a fixed size. The embedding vectors capture semantic and syntactic relationships between tokens.

Positional encoding 2207 is added to the output embedding to provide position information to the model. Since the Transformer architecture does not have inherent recurrence or convolution, positional encodings help capture the order and relative positions of tokens. The positional encodings are typically sine and cosine functions of different frequencies, allowing the model to learn relative positions.

The masked multi-head attention 2208 mechanism prevents the model from attending to future tokens. This layer performs self-attention on the Decoder's input sequence. It allows the Decoder to attend to different parts of its own input sequence. The attention is "masked" to prevent the Decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 2204. The residual connection adds the input to the output of the attention layer, helping the model learn faster and deeper. Layer normalization normalizes the activations across the features, stabilizing the training process.

The multi-head attention 2209 layer performs attention between the Decoder's hidden states and the Encoder's output. It allows the Decoder to attend to relevant parts of the input sequence based on the Encoder's representations. The attention weights are computed based on the compatibility between the Decoder's hidden states and Encoder's outputs.

Another add and norm 2204 layer is then followed by feed forward network 2205. This fully connected feed-forward network may be applied to each position of the Decoder's hidden states. It consists of two linear transformations with a Rectified Linear Unit (ReLU) activation in between. The feed forward layer helps the model capture non-linear interactions and increases the model's capacity.

Another add and norm 2204 layer is followed by linear 2212 and softmax 2213 layers. The final hidden states of the Decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the Decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the Decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the Decoder as input for the next step, until a stopping criterion is met (e.g., reaching a maximum length or generating an end-of-sequence token). The size and composition of the vocabulary can vary depending on the specific task and the data the model is trained on. It can include words, subwords, or even characters, depending on the tokenization strategy used.

The Decoder layers 2220 can be stacked Nx times, allowing the model to capture complex dependencies and generate coherent output sequences.

This transformer architecture allows the model to process input sequences, capture long-range dependencies, and generate output sequence based on the encoded input and the previously generated tokens.

There are at least three variations of transformer architecture that enable different LLMs. A first variation comprises Auto-Encoding Models. In autoencoders, the decoder portion of the transformer is discarded after pre-training and only the encoder is used to generate the output. The popular BERT and RoBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x_t|x\_1, x\_2, \ldots, x\_\{t-1\})$, where $x\_t$ is the element at position t, and $x\_1, x\_2, \ldots, x\_\{t-1\}$ are the previously generated elements. The Transformer architecture, particularly the Decoder component, is well-suited for auto-regressive modeling. The Decoder generates the output sequence one element at a time, conditioned on the previously generated elements and the encoded input sequence from the Encoder. In the Transformer Decoder, the self-attention mechanism is masked to prevent the model from attending to future positions during training. This masking ensures that the model relies only on the previously generated elements to make predictions, following the auto-regressive property. During training, the Transformer Decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the Transformer Decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the Transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 23:
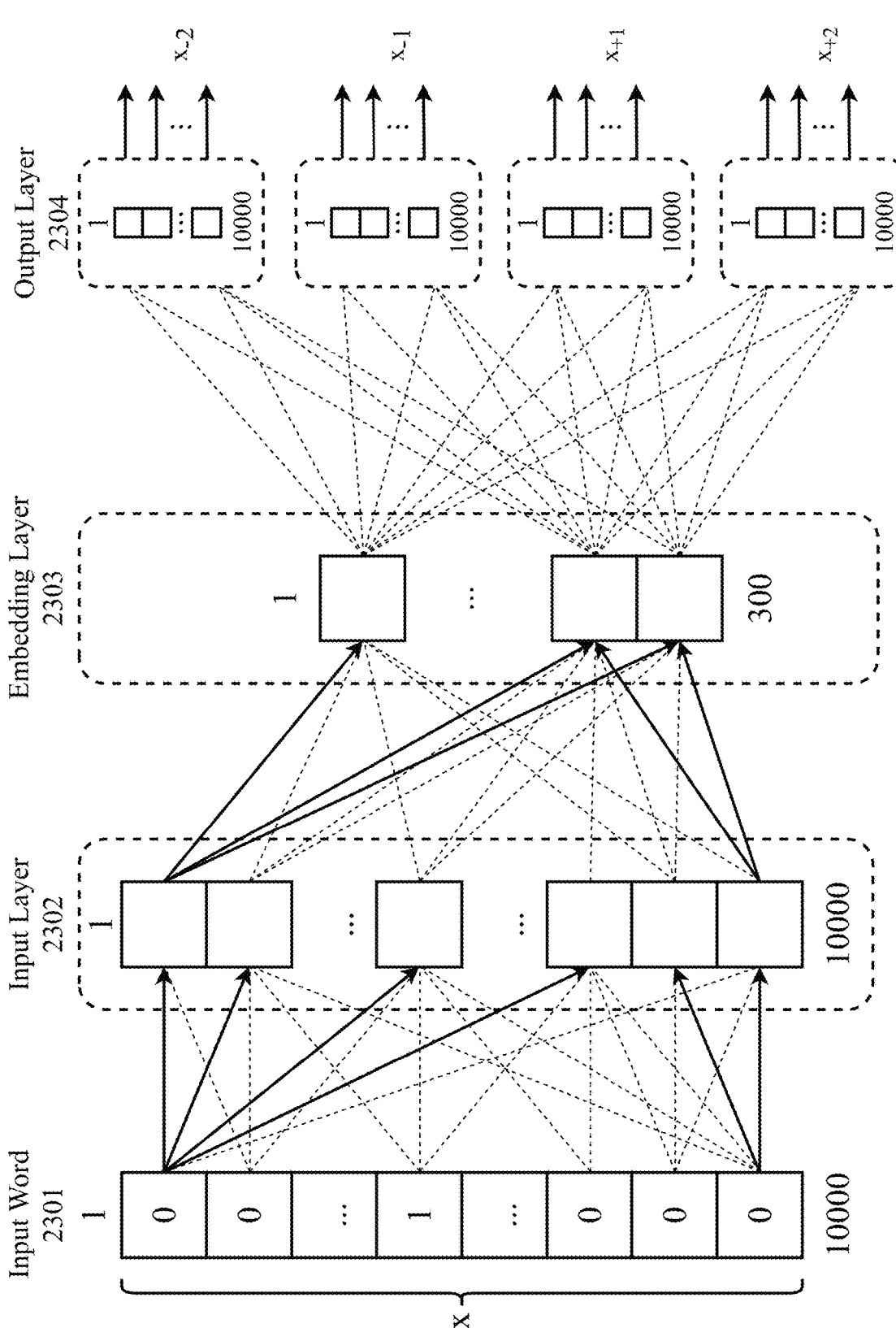
FIG. 23 is a block diagram illustrating an exemplary basic embedding layer generation process, according to an embodiment.

FIG. 23 is a block diagram illustrating an exemplary basic embedding layer generation process, according to an embodiment. The illustration shows the basic structure of an embedding layer, which is commonly used in natural language processing tasks to convert input words into dense vector representations. The diagram shows an input word 2301, an input word layer 2302, an embedding layer 2303, and an output layer 2304. As shown, the input word 2301 is represented as one-hot encoded vectors, where each word is represented by a vector of size 10,000 (i.e., the vocabulary size). One-hot encoding is a common technique used to represent categorical variables, such as words in a vocabulary, as binary vectors. In one-hot encoding, each word is represented by a vector with a length equal to the size of the vocabulary. The vector consists of zeros in all positions except for a single position, which is set to one, indicating the presence of the corresponding word. The input word is one-hot encoded with a 1 at the corresponding word index and 0s elsewhere. For example, if a vocabulary of 10,000 words exists, each word will be represented by a vector of size 10,000. If the input word is the 5th word in the vocabulary, its one-hot encoded vector will have a 1 at the 5th position and 0s everywhere else. It is important to note that the one-hot encoding is just one way to represent input words. Other techniques, such as integer encoding or using pre-trained word embeddings (e.g., Word2Vec or GloVe), can also be used depending on the specific requirements of the task and the available resources.

The input layer 2302 takes the one-hot encoded input word vectors and passes them to the embedding layer 2303. The input layer in the embedding generation process is responsible for handling the initial representation of the input words before they are passed to the embedding layer. The one-hot encoding ensures that each word has a unique representation, but it also results in sparse and high-dimensional vectors. The embedding layer 2303 then transforms these sparse vectors into dense, lower-dimensional representations (embeddings) that capture semantic and syntactic relationships between words. The embedding layer 2303 is a fully connected layer without an activation function. It maps the one-hot encoded input vectors to dense vector representations of a specified dimension (in this case, 300). The embedding layer has a weight matrix of size (vocabulary_size, embedding_dimension), which is learned during training. In the given example, the vocabulary size is 10,000, and the embedding dimension is 300. Each row in the weight matrix corresponds to a word in the vocabulary, and the columns represent the dimensions of the embedding space.

When a one-hot encoded vector is passed to the embedding layer, it performs an embedding lookup. Since the one-hot vector has a single 1 at the position corresponding to the input word, the embedding lookup effectively selects the corresponding row from the weight matrix, which represents the embedding vector for that word.

The embedding size (dimension) is a hyperparameter that determines the size of the dense vector representations. In the example, the embedding size is 300, meaning each word is represented by a vector of length 300. The choice of embedding size depends on the complexity of the task, the size of the vocabulary, and the available computational resources. Larger embedding sizes can capture more fine-grained semantic information but also require more memory and computation. The embedding layer's weights (the embedding vectors) are learned during the training process through backpropagation. The model adjusts these weights based on the downstream task's objective, such as minimizing a loss function. As a result, the learned embeddings capture semantic and syntactic relationships between words, with similar words having similar vector representations. Once the embeddings are learned, they can be reused for various downstream tasks. The learned embeddings can be used as input features for other models, such as recurrent neural networks (RNNs) including echo state network (ESN) and graph neural network (GNN) variants or convolutional neural networks (CNNs), in tasks like text classification, sentiment analysis, or language translation.

The output layer 2304 consists of the dense word embeddings generated by the embedding layer. In this example, there are four output embedding vectors, each of size 300, corresponding to different words in the vocabulary. The embedding layer allows the model to learn meaningful representations of words in a lower-dimensional space, capturing semantic and syntactic relationships between words. These embeddings can then be used as input to downstream tasks such as text classification, sentiment analysis, or language modeling.

FIG. 1 is a block diagram illustrating an exemplary system architecture for a distributed generative artificial intelligence reasoning and action platform 120, according to an embodiment. According to the embodiment, platform 120 is configured as a cloud-based computing platform comprising various system or sub-system components configured to provide functionality directed to the execution of neuro-symbolic generative AI reasoning and action. Exemplary platform systems can include a distributed computational graph (DCG) computing system 121, a curation computing system 122, a marketplace computing system 123, and a context computing system 124. In some embodiments, systems 121-124 may each be implemented as standalone software applications or as a services/microservices architecture which can be deployed (via platform 120) to perform a specific task or functionality. In such an arrangement, services can communicate with each other over an appropriate network using lightweight protocols such as HTTP, gRPC, or message queues. This allows for asynchronous and decoupled communication between services. Services may be scaled independently based on demand, which allows for better resource utilization and improved performance. Services may be deployed using containerization technologies such as Docker and orchestrated using container orchestration platforms like Kubernetes. This allows for easier deployment and management of services.

The distributed generative AI reasoning and action platform 120 can enable a more flexible approach to incorporating machine learning (ML) models into the future of the Internet and software applications; all facilitated by a DCG architecture capable of dynamically selecting, creating, and incorporating trained models with external data sources and marketplaces for data and algorithms.

According to the embodiment, DCG computing system 121 provides orchestration of complex, user-defined workflows built upon a declarative framework which can allow an enterprise user 110 to construct such workflows using modular components which can be arranged to suit the use case of the enterprise user. As a simple example, an enterprise user 110 can create a workflow such that platform 120 can extract, transform, and load enterprise-specific data to be used as contextual data for creating and training a ML or AI model. The DCG functionality can be extended such that an enterprise user can create a complex workflow directed to the creation, deployment, and ongoing refinement of a trained model (e.g., LLM). For example, in some embodiments, an enterprise user 110 can select an algorithm from which to create the trained model, and what type of data and from what source they wish to use as training data. DCG computing system 121 can take this information and automatically create the workflow, with all the requisite data pipelines, to enable the retrieval of the appropriate data from the appropriate data sources, the processing/preprocessing of the obtained data to be used as inputs into the selected algorithm(s), the training loop to iteratively train the selected algorithms including model validation and testing steps, deploying the trained model, and finally continuously refining the model over time to improve performance.

A context computing system 124 is present and configured to receive, retrieve, or otherwise obtain a plurality of context data from various sources including, but not limited to, enterprise users 110, marketplaces 130a-n, third-party sources 150, and other data sources 140a-n. Context computing system 124 may be configured to store obtained contextual data in a data store. For example, context data obtained from various enterprise endpoints 110a-n of a first enterprise may be stored separately from the context data obtained from the endpoints of a second enterprise. In some embodiments, context data may be aggregated from multiple enterprises within the same industry and stored as a single corpus of contextual data. In such embodiments, contextual data may be transformed prior to processing and storage so as to protect any potential private information or enterprise-specific secret knowledge that the enterprise does not wish to share.

A curation computing system 122 is present and configured to provide curated (or not) responses from a trained model (e.g., LLM) to received user queries. A curated response may indicate that it has been filtered, such as to remove personal identifying information or to remove extraneous information from the response, or it may indicate that the response has been augmented with additional context or information relevant to the user. In some embodiments, multiple trained models (e.g., LLMs) may each produce a response to a given prompt, which may include additional contextual data/elements, and a curation step may include selecting a single response of the multiple responses to send to a user, or the curation may involve curating the multiple responses into a single response. The curation of a response may be based on rules or policies that can set an individual user level, an enterprise level, or at a department level for enterprises with multiple departments (e.g., sales, marketing, research, product development, etc.).

According to the embodiment, an enterprise user 110 may refer to a business organization or company. An enterprise may wish to incorporate a trained ML model into their business processes. An enterprise may comprise a plurality of enterprise endpoints 110a-n which can include, but are not limited to, mobile devices, workstations, laptops, personal computers, servers, switches, routers, industrial equipment, gateways, smart wearables, Internet-of-Things (IoT) devices, sensors, and/or the like. An enterprise may engage with platform 120 to create a trained model to integrate with its business processes via one or more enterprise endpoints. To facilitate the creation of purpose-built, trained model, enterprise user 110 can provide a plurality of enterprise knowledge 111 which can be leveraged to build enterprise specific (or even specific to certain departments within the enterprise) ML/AI models. Enterprise knowledge 111 may refer to documents or other information important for the operation and success of an enterprise. Data from internal systems and databases, such as customer relationship management (CRM) systems, enterprise resource planning (ERP) systems, rules and policies databases, and transactional databases, can provide information about the operational context of an enterprise. For example, product knowledge, market knowledge, industry trends, regulatory knowledge, business processes, customer knowledge, technology knowledge, financial knowledge, organization knowledge, and risk management knowledge may be included in enterprise knowledge base 111.

According to the embodiment, platform 120 is configured to retrieve, receive, or otherwise obtain a plurality of data from various sources. A plurality of marketplaces 130a-n may be present and configured to provide centralized repositories for data, algorithms, and expert judgment, which can be purchased, sold, or traded on an open marketplace. External data sourced from various marketplaces 130a-n can be used as a training data source for creating trained models for a particular use case. A marketplace computing system 123 is present and configured to develop and integrate various marketplaces 130a-n. Marketplace computing system 123 can provide functionality directed to the registration of experts or entities. An expert may be someone who has a deep understanding and knowledge of a specific industry, including its trends, challenges, technologies, regulations, and best practices. Industry experts often have many years of experience working in the industry and have developed a reputation for their expertise and insights. Examples of experts can include, but are not limited to, consultants, analysts, researchers, academics, or professionals working in the industry. In some embodiments, experts and/or entities can register with platform 120 so that they may become verified experts/entities. In such an embodiment, an expert/entity profile may be created which can provide information about expert judgment, scored data and algorithms, and comparisons/statistics about the expert's/entity's scores and judgment with respect to other expert/entities. Marketplace computing system 123 may further provide functionality directed to the management of the various marketplaces and the data/algorithms provided therein.

According to some embodiments, platform 120 can communicate with and obtain data from various third-party services 150. For example, third-party services can include LLM services such as APIs and LLM hosting platforms, which platform 120 can interface with to obtain algorithms or models to use as starting points for training a neuro-symbolic generative AI reasoning and action model to be deployed at the enterprise or individual level. As another example, social media platforms can provide data about trends, events, and public sentiment, which can be useful for understanding the social context of a situation. Exemplary data sources 140*a-n* can include, but are not limited to, sensors, web data, environmental data, and survey and interviews.

Figure 2:
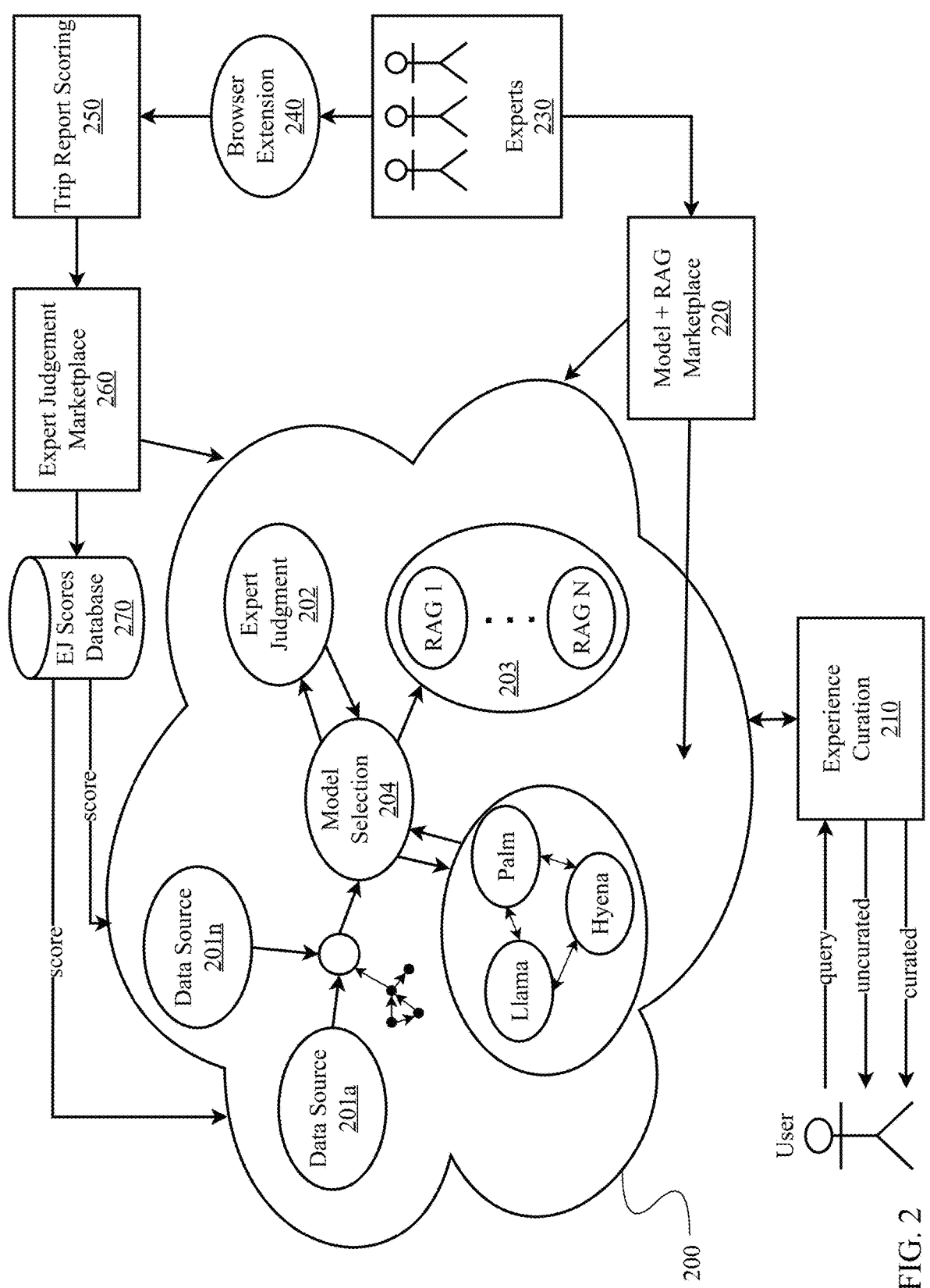
FIG. 2 is a block diagram illustrating an exemplary aspect of a distributed generative AI reasoning and action platform incorporating various additional contextual data.

FIG. 2 is a block diagram illustrating an exemplary aspect of a distributed generative AI reasoning and action platform incorporating various additional contextual data. According to the aspect, a plurality of contextual data from various data sources may be integrated into platform 120. A simple exemplary directed computational graph 200 is illustrated within the cloud and utilizing the plurality of contextual data to create and train a model. Various marketplaces 130*a-n* are shown which can provide contextual data to platform 120 including an expert judgment marketplace 260 and a model and retrieval augmented generation (RAG) marketplace 220. According to the aspect, DCG 200 orchestrates model (and model weight) selection 204, including multi-model usage in series or parallel (i.e., feed output of one model into another, or compare and choose outputs across multiple models), based on multiple data sources (both trained and external), input from crowdsourced expert judgment, training or tuning data set corpora, and RAG libraries.

Expert judgment will become increasingly important in the world of proprietary or otherwise blackbox ML or AI models where hallucinations and training data quality may produce misleading or otherwise incorrect results. The expert judgment marketplace 260 provides a way for experts 230 to weigh-in on the correctness of data whether that is training data or model output, and can be facilitated by a browser extension 240, for example, to score things like data sources during their daily "trip around web". This trip report scoring 250 concept allows experts to score data sources. In an implementation, a browser extension 240 is developed with an accuracy score input where the user can rank a news article they are reading as they consume it. Expert judgment marketplace 260 allows for consumers to pick and rank "experts" based on how well their judgment helps or hinders their overall consumption of model output. For example, experts that routinely highly rank data sources, like news sites, that are known to spread false information should likewise be less trusted over time compared to their peers, and any models trained on that data similarly less trusted. Ultimately a database 270 of data sources and schemas scored by algorithms or experts could be used as input into the DCG 200 for more accurate and real-time inference based on ongoing rating of preferred data set and data format combinations (e.g., the same data might be purchased in unstructured, structured, schematized, normalized, or semantified formats) which may introduce different types of bias or impacts on performance, results, or processing costs.

Accordingly, a RAG marketplace 220 may be implemented to further refine model output. RAG information may be included as additional context which can be supplied to a GenAI model in addition to a prompt (engineered, or otherwise). This is especially important where companies may want to sell access to their proprietary dataset through the form of a RAG. For example, a medical research company may have valuable information they could sell to other institutions in the form of a RAG to augment related research without specifically providing access to the raw training data. Retrieval-augmented generation is a framework that combines elements of retrieval-based and generative models to improve the performance of natural language processing tasks. In RAG, a retriever component is used to select relevant information from a large corpus, and a generator component is used to produce a final output based on both the retrieved information and the input query. RAG marketplace 220 may be scored by experts for accuracy and effectiveness across domains.

In some implementations, the platform may implement a recursive abstractive processing for tree organized retrieval (RAPTOR) model. RAPTOR models address limitations of RAG, specifically RAG's lack of ability to handle long documents, and that RAG treats all documents equally, which doesn't take into account any hierarchical document structure and varying information importance. RAPTOR addresses these RAG shortcomings by a method of using recursive/iterative clustering and chunk embeddings, combined with LLM chunk summarizations. Documents are broken into chunks, and passed through an LLM to create summarizations that act as a higher level representation of the underlying information chunk, and is added to the hierarchical tree. This tree is clustered to find similar information chunks based on the similarity of their embeddings. Each chunk and cluster can be handled individually or as a group as needed.

The platform can perform handling long documents and hierarchical structures using RAPTOR models. Such a process may comprise the following steps: document chunking, LLM summarizations, embedding creation, initial clustering, hierarchical tree construction, and information handling.

With respect to document chunking, the platform may perform an initial breakdown wherein long documents are divided into manageable chunks. Each chunk represents a portion of the document that can be processed individually. The size of each chunk may be determined based on the capacity of the LLM and the nature of the document content to ensure coherence and completeness within each chunk.

With respect to LLM summarizations, the platform may perform abstractive summarization wherein each chunk is passed through an LLM to generate a summary. These summaries are not just shorter versions but higher-level representations that capture the essence and key points of the chunks. The summaries may serve as nodes in a hierarchical tree, representing higher-level abstractions of the underlying information.

With respect to embedding creation, the platform may generate semantic embeddings wherein each chunk and its summary are encoded into embeddings using the LLM. These embeddings capture the semantic meaning and contextual information of the chunks. Embeddings can be compared using similarity measures (e.g., cosine similarity, etc.) to identify relationships between chunks.

The platform may perform recursive and iterative clustering via a RAPTOR model. With respect to initial clustering, the platform can cluster chunks wherein similar embeddings are grouped together to form clusters. This initial clustering may be based on the semantic similarity of the chunk embeddings. Each cluster may be summarized by the LLM to create a higher-level representation of the information contained within the cluster.

With respect to hierarchical tree construction, the platform may generate tree nodes wherein the summaries of clusters act as nodes in a hierarchical tree. Each node represents a summary of the underlying information chunks. The process of clustering and summarizing is repeated recursively. Summaries of clusters are further clustered to form higher-level summaries, building a multi-level hierarchical tree.

With respect to information handling, the platform supports individual and/or group handling wherein each chunk and cluster within the hierarchical tree may be addressed individually or as a group. This flexibility allows for detailed, fine-grained retrieval of information as well as broader, more abstract retrieval depending on the query requirements.

This process enabled by RAPTOR models provide various advantages to support AI-enhanced semantic search and knowledge curation. By breaking down long documents into smaller chunks, RAPTOR models make it feasible to process and retrieve information from extensive texts efficiently. Recursive summarization ensures that the context and key points are preserved and represented at higher levels of abstraction. The hierarchical tree structure allows for more organized and structured retrieval of information, taking into account the varying importance and relationships between different parts of the document. Depending on the query, the model can focus on specific chunks or higher-level summaries, providing adaptive retrieval capabilities. Furthermore, by clustering and summarizing based on semantic similarity and importance, RAPTOR models prioritize significant information, ensuring that critical insights are highlighted in the retrieval process.

RAPTOR models can be significantly enhanced by incorporating multimodal data—such as text (e.g., articles, documents, emails, chat messages, etc.), video (e.g., recorded meetings, webinars, instructional videos, etc.), audio (e.g., voice notes, podcasts, recorded calls, etc.), positional data (e.g., GPS coordinates, location history, etc.), recent actions (e.g., user interactions, browsing history, app usage, etc.), and future calendar events (e.g., scheduled meetings, reminders, deadlines, etc.)—into their semantic search and recommendation capabilities. The process of enhancing the RAPTOR models may comprise the steps of multimodal data integration, data processing and representation, integrating the multimodal data into the RAPTOR model, and implementing context-aware search and recommendations.

With respect to data processing and representation text data may undergo chunking and embedding wherein text data is divided into chunks and passed through an LLM to generate embeddings and abstractive summaries. The system may utilize the embeddings to capture the semantic meaning of text data within its context. For video and audio data, the system may convert speech to text using Automatic Speech Recognition (ASR) systems, use key frame extraction to identify key frames in videos and generate text descriptions using computer vision techniques, and then generate embeddings for transcribed text and key frame descriptions using LLMs. For positional data, the system may encode positional data as embeddings that represent the spatial context of user activities and then cluster positional data to identify significant locations and movement patterns. For recent actions and calendar events, the system may encode recent user actions and interactions as embeddings to capture behavioral context and represent future calendar events as temporal embeddings to incorporate time-related context.

With respect to enhancing RAPTOR models with multimodal data, the system may implement multimodal embedding fusion wherein embeddings from different modalities (text, video, audio, positional data, actions, calendar events) are combined into a unified representation. In an embodiment, the RAPTOR models may utilize one or more attention mechanisms to weigh the importance of different modalities based on the query and context. The system may be further configured for hierarchical tree construction with multimodal data. This may involve processing multimodal data chunks and generating summaries that are incorporated into the hierarchical tree structure, clustering multimodal embeddings to find similar information chunks across different modalities, and recursively summarizing and clustering multimodal data to build a comprehensive hierarchical tree.

With respect to context-aware search and recommendations, the system may implement processes for contextual query understanding. For instance, the system may extract context from the user's current activity, recent actions, and calendar events to understand the query's intent and dynamically expand the query using relevant context from multimodal data to improve search accuracy. To support contextual recommendations, the system may use the hierarchical tree and multimodal embeddings to score the relevance of potential recommendations in order to provide recommendations that are personalized based on the user's current context, recent actions, and future plans.

According to the aspect, a user experience curation engine 210 is needed that is able to curate output whether that is in the form of filtering out sensitive data or simply customizing results in a way the user prefers (which may be based on user-/entity-defined rules or policies). A user can submit a query to experience curation engine 210 which can send the query to the DCG trained model to obtain a response. Experience curation 210 may then process the received response to curate it (or not) to meet the preferences of the user.

As illustrated, DCG 200 shows a simple example of a directed computational graph which can be used to create a complex workflow to create and train an MI/AI model (e.g., variations of or standard transformer architecture). A shown, the DCG comprises multiple sources of information for training the selected models(s) including multiple data sources 201*a-n* which may or may not be scored by experts, expert judgment 202, and one or more RAGs 203 which may be obtained from RAG marketplace 220 or may be obtained directly from enterprise knowledge. DCG may have access to stored models or variants thereof. In the illustration, LLAMA (Learned Layer-wise Attention Metric for Transformers), PALM (Permuted Adaptive Lateral Modulation), and HYENA (Hyperbolic Encoder for Efficient Attention) are shown as possible examples of the types of models which can be selected by the DCG to create and train a GenAI model. Furthermore, the "model parameters" and mathematical techniques or assumptions used in each model may be cataloged and included in a model-specific template which may be stored in cloud-based storage on platform 120. In some embodiments, platform 120 may store a hierarchical representation of transformer models (e.g., as a graph), which may represent a lineage of the evolution of transformer models. In an implementation, model selection or exploration involves selections based on the evolutionary tree of one or more model types and use said tree (e.g., graph) for selections in heuristic search for best algorithm/data combinations, licensing costs/explorations, etc. It should be appreciated that certain aspects of the invention may be tailored based on what kind of mathematical approach underpins a specific model.

In operation, DCG 200 obtains the various contextual data from the connected data sources, creates training, validation, and test datasets from the obtained data, and uses the various datasets to train, validate, and test the model as it undergoes a model training loop that iteratively trains the model to generate responses based on the plurality of contextual data.

Figure 3:
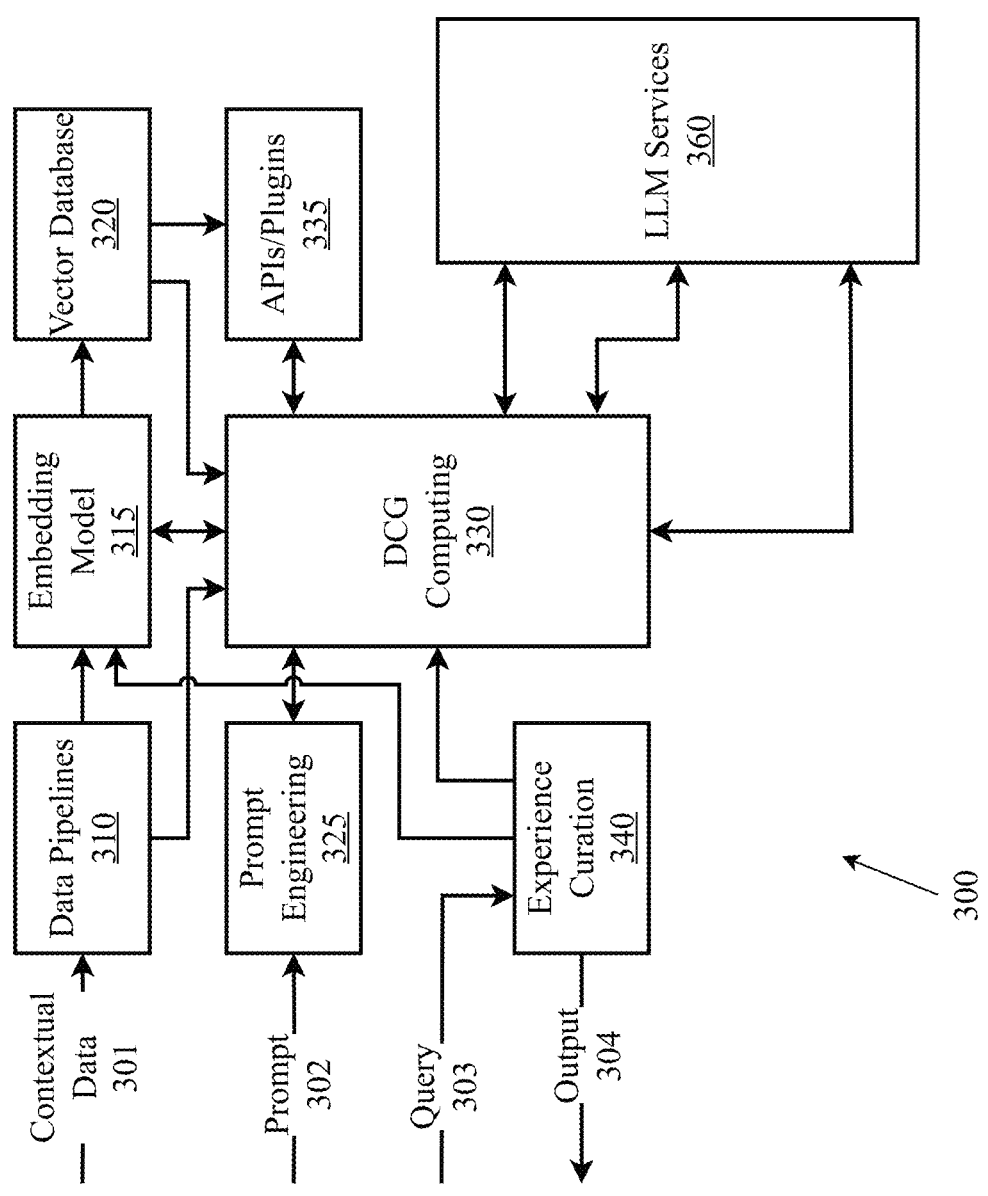
FIG. 3 is a diagram illustrating incorporating symbolic reasoning in support of LLM-based generative AI, according to an aspect of a neuro-symbolic generative AI reasoning and action platform.

FIG. 3 is a diagram illustrating incorporating symbolic reasoning in support of LLM-based generative AI, according to an aspect of a neuro-symbolic generative AI reasoning and action platform. According to the aspect, platform 120 can incorporate symbolic reasoning and in-context learning to create and train off the shelf models (e.g., an LLM foundational model or narrow model) through clever prompting and conditioning on private data or very situation specific "contextual" data. Platform 120 can obtain contextual data 301 and preprocess the data for storage. Contextual data 301 may refer to data obtained from marketplaces 130*a-n*, third-party services 150, and enterprise knowledge 111, as well as other types of contextual data that may be obtained from other sources. DCG 330 is responsible for orchestrating the entire process and can create data pipelines 310 as needed to facilitate the ingestion of contextual data 301. Contextual data can include text documents, PDFs, and even structure formats like CSV (comma-separated values) or SQL tables or other common generic data formats like OWL or RDF or domain specific content such as the Financial Industry Business Ontology (FIBO) or Open Graph of Information Technology (OGIT). This stage involves storing private data (e.g., context data) to be retrieved later.

Typically, the context data 301 is broken into chunks, passed through and embedding model 315, then stored in a specialized database called a vector database 320. Embedding models are a class of models used in many tasks such as natural language processing (NLP) to convert words, phrases, or documents into numerical representations (embeddings) that capture similarity which often correlates semantic meaning. Exemplary embedding models can include, but are not limited to, text-embedding-ada-002 model (i.e., OpenAI API), bidirectional encoder representations form transformers, Word2Vec, FastText, transformer-based models, and/or the like. The vector database 315 is responsible for efficiently storing, comparing, and retrieving a large plurality of embeddings (i.e., vectors). Vector database 315 may be any suitable vector database system known to those with skill in the art including, but not limited to, open source systems like Pinecone, Weaviate, Vespa, and Qdrant. According to the embodiment, embedding model 315 may also receive a user query from experience curation 340 and vectorize it where it may be stored in vector database 320. This provides another useful datapoint to provide deeper context when comparing received queries against stored query embeddings.

A user may submit a query 303 to an experience curation engine 340 which starts the prompt construction and retrieval process. The query is sent to DCG 330 which can send the query to various components such as prompt engineering 325 and embedding model 315. Embedding model 315 receives the query and vectorizes it and stores it in vector database 320. The vector database 320 can send contextual data (via vectors) to DCG 330 and to various APIs/plugins 335. Prompt engineering 325 can receive prompts 302 from developers to train the model on. These can include some sample outputs such as in few-shot prompting. The addition of prompts via prompt engineering 325 is designed to ground model responses in some source of truth and provide external context the model wasn't trained on. Other examples of prompt engineering that may be implemented in various embodiments include, but are not limited to, chain-of-thought, self-consistency, generated knowledge, tree of thoughts, directional stimulus, and/or the like.

During a prompt execution process, experience curation 340 can send user query to DCG 330 which can orchestrate the retrieval of context and a response. Using its declarative roots, DCG 330 can abstract away many of the details of prompt chaining; interfacing with external APIs 335 (includ-ing determining when an API call is needed); retrieving contextual data from vector databases 330; and maintaining memory across multiple LLM calls. The DCG output may be a prompt, or series of prompts, to submit to a language model via LLM services 360 (which may be potentially prompt tuned). In turn, the LLM processes the prompts, contextual data, and user query to generate a contextually aware response which can be sent to experience curation 340 where the response may be curated, or not, and returned to the user as output 304.

Figure 4:
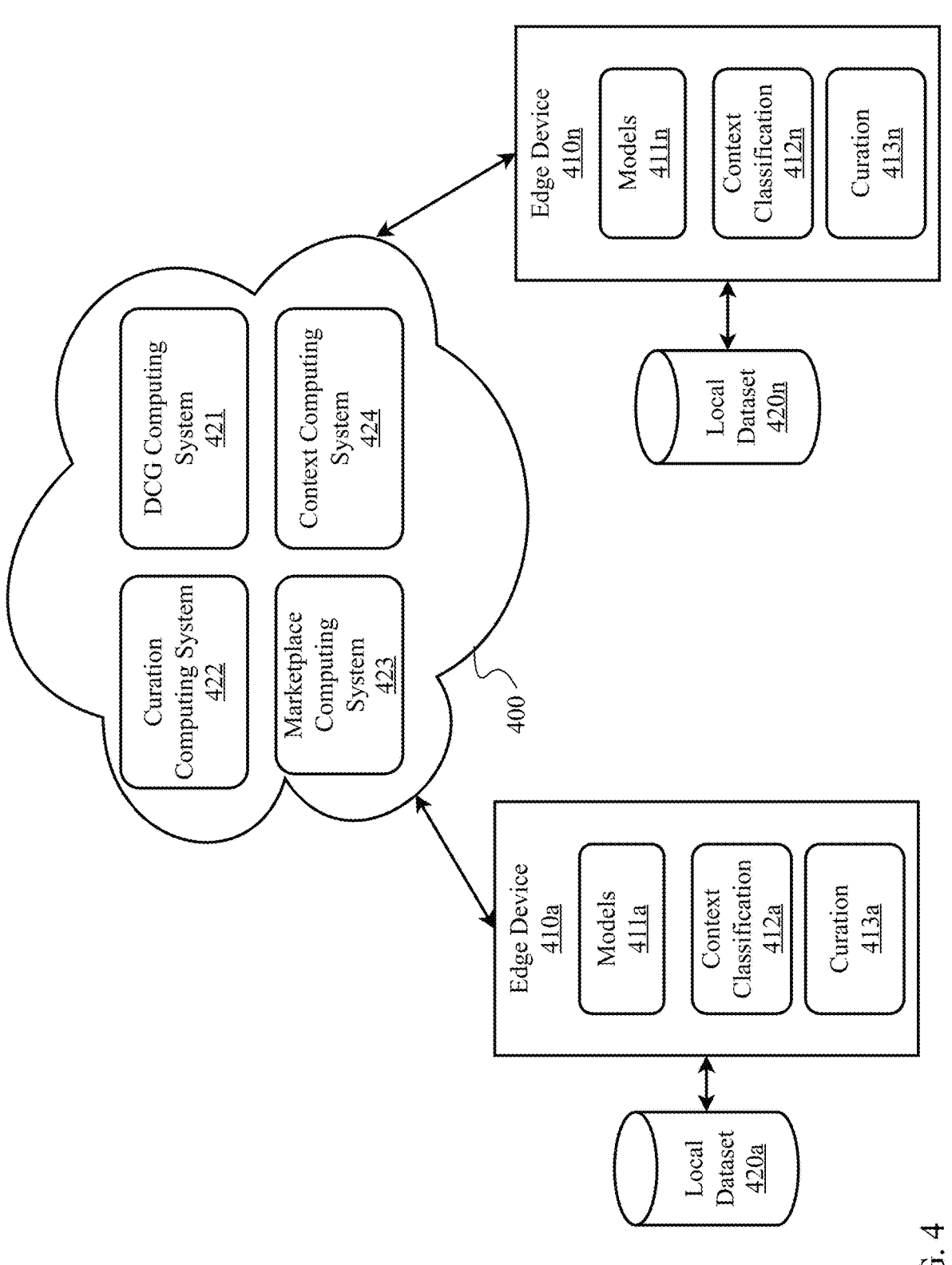
FIG. 4 is a block diagram illustrating an exemplary architecture for a neuro-symbolic generative AI reasoning and action platform configured for federated learning at a plurality of edge devices, according to an embodiment.

FIG. 4 is a block diagram illustrating an exemplary architecture for a neuro-symbolic generative AI reasoning and action platform 400 configured for federated learning at a plurality of edge devices 410*a-n*, according to an embodiment. According to the embodiment, platform 400 comprises DCH computing system 421, curation computing system 422, marketplace computing system 423, and context computing system 424. According to an embodiment, edge devices 410*a-n* may represent various enterprise endpoints. In other embodiments, edge devices 410*a-n* may represent various endpoints from two or more separate enterprises. In an embodiment, an edge device 410*a-n* may be a computing device associated with a platform user, such as someone who engages with the platform for experience curation or an expert who provides expert judgment scores to platform 400 via, for example, expert judgment marketplace 260 or some other mechanism.

As shown, each edge device 410*a-n* may comprise instances of local models 411*a-n*, context classification processes 412-*n*, and experience curation processes 413*a* operating on the device. Each edge device may have access to a local data or knowledge base 420*a-n* and which is only accessible by its associated edge device. Edge devices 410*a-n* may utilize these components to perform various computations wherein the processing of data and execution of algorithms happens locally on the device, rather than relying on the systems and services provided by platform 400. In some embodiments, a plurality of edge devices 410*a-n* may be implemented as individual computing nodes in a decentralized federated system, wherein tasks and data may be distributed across multiple nodes, allowing for parallel processing and potentially faster computation. Federated systems are often used in scenarios where data privacy and security are important, as data can remain on local nodes and only aggregated or processed results are shared more widely.

In some implementations, the platform 400 may leverage federated learning, where machine learning models 411*a-n* are trained across multiple decentralized edge devices 410*a-n*, with the models' updates being aggregated centrally. This approach allows for the training of models without the need to centrally store sensitive data from individual devices. For example, each edge device 410*a-n* could train local instances of neuro-symbolic GenAI reasoning and action models and local instances of context classification models 412*a-n*. According to an embodiment, context classification models 412*a-n* may be configured to select relevant passages from a knowledge base 420*a-n* or corpus given a query. This can be done using various techniques such as BM25, TF-IDF, or neural retrieval models like dense passage retrieval. The retrieved passages serve as context or input to a generator (e.g., a transformer-based model).

Federated learning can occur at the edge device wherein the context classification model 412*a* is trained locally. Periodically, (e.g., hourly, daily, weekly, etc.) platform 400 may collect (e.g., aggregate) model parameters, encrypted data, and/or the like from all of, or a subset of, edge devices 410*a-n* and apply the aggregated model parameters as an update to a master or global model (e.g., context classification, neuro-symbolic GenAI model, etc.). The updated global model or just its parameters, may be transmitted to all of, or a subset of, the edge devices 410*a-n* where they may be applied to the local models operating thereon. Similarly, platform 400 can aggregate obtained training data, which may or may not be encrypted, and apply the training data to global models. These updated models may be transmitted to edge devices as described above.

As shown, edge devices 410*a-n* may further comprise a curation application 413*a-n* operating on the device. Curation application 413*a* may be configured to act as an intermediary between a user who can submit a query and models 411*a* which receive the query and generate a response back. Curation 413*a-n* may receive a response from a locally stored model and curate the response based on user (or entity) defined rules or preferences. For example, a response may first be filtered of any personal information by curation 413*a* prior to the being relayed back to the user. As another example, curation 413*a* may transform the response into specific format, style, or language based on user defined preferences. This allows the edge device 410*a* user to have their experience with the local models curated to fit any criteria they deem important.

Figure 5:
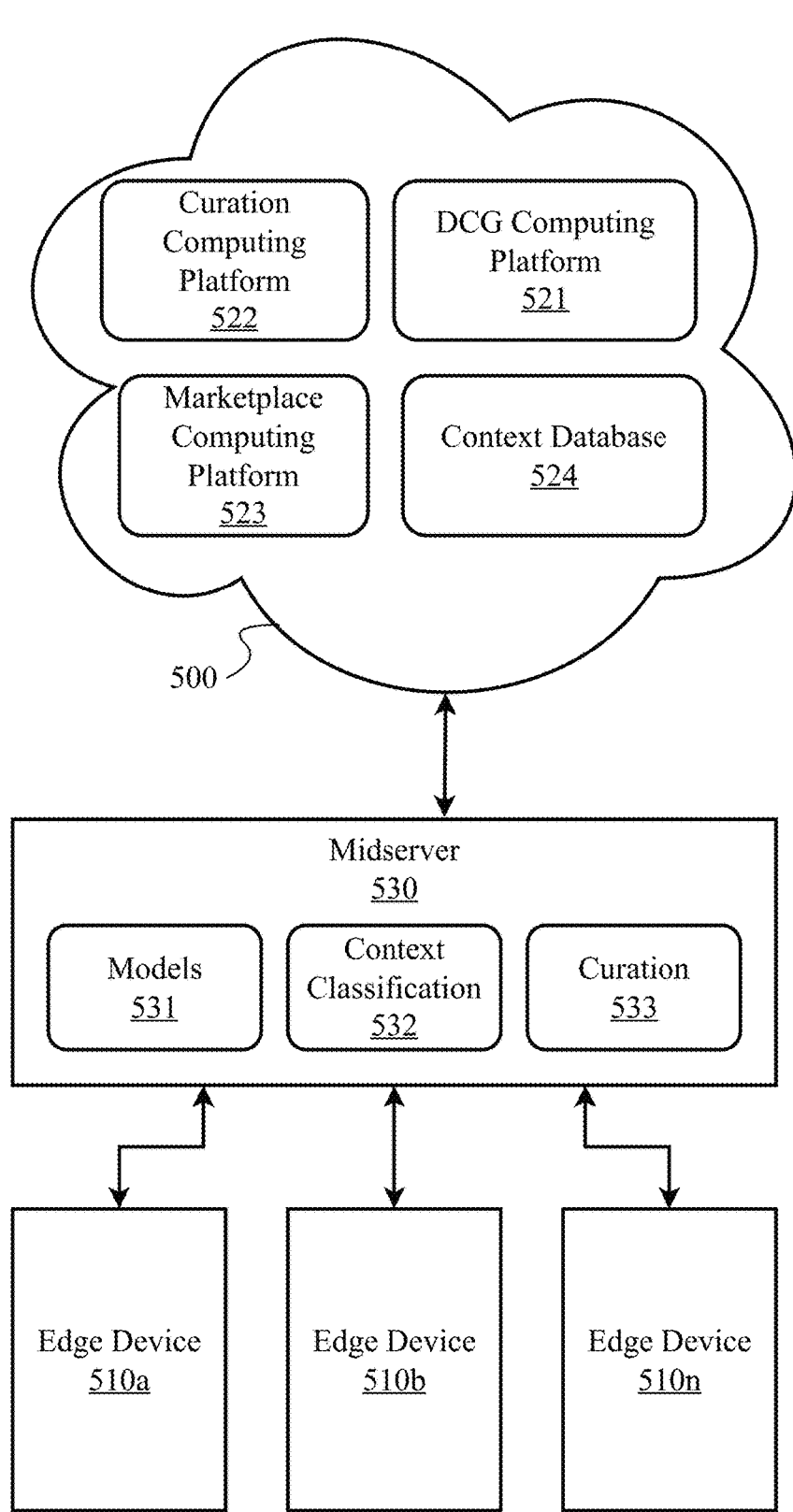
FIG. 5 is a block diagram illustrating an exemplary architecture for a neuro-symbolic generative AI reasoning and action platform configured to utilize a midserver to act as a computing intermediary between a plurality of edge devices and the platform.

FIG. 5 is a block diagram illustrating an exemplary architecture for a neuro-symbolic generative AI reasoning and action platform 500 configured to utilize a midserver 530 to act as a computing intermediary between a plurality of edge devices 510*a-n* and the platform. According to the embodiment, midserver 530 facilitates communication between edge devices 510*a-n* and the backend systems 521, 522, 523, 524 provided by platform 500. According to the embodiment, midserver 530 may have stored and operating on it one or more neuro-symbolic GenAI reasoning and action models 531, context classification processes 532, and curation processes 533. Midserver 530 can be configured to periodically receive data (e.g., context data) and state information from each of the connected edge devices 510*a-n*. Midserver 530 may use this information to train/update the models 531, 532. Additionally, midserver 530 can be configured to receive user-submitted queries from edge devices via curation 533, obtain relevant context associated with the received query via context classification 532, and use a neuro-symbolic GenAI model 531 to process the query and context data to generate a response to the user. The generated response may be curated (or not) and transmitted back to the user of the edge device.

In some implementations, edge devices 510*a-n* may have stored upon them local models as described in FIG. 4, and midserver 530 may store global, models or even mid-tier models associated with the local models. In such an implementation, midserver can aggregate model parameters and update the global/mid-tier models accordingly.

Figure 6:
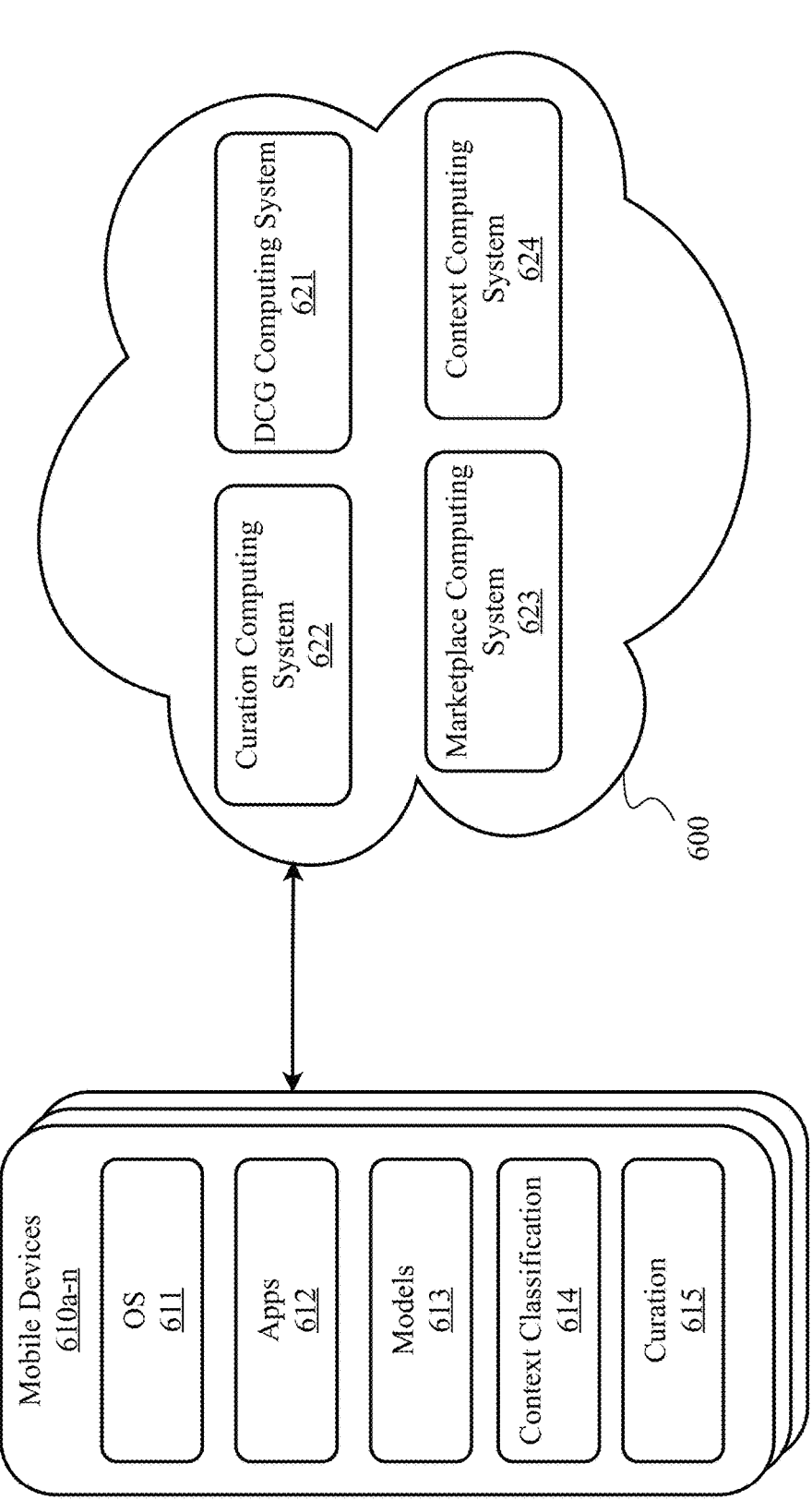
FIG. 6 is a block diagram illustrating an exemplary mobile device configured for experience curation using embedded capabilities and functionality provided by a neuro-symbolic generative AI reasoning and action platform, according to an embodiment.

FIG. 6 is a block diagram illustrating an exemplary mobile device 610*a-n* configured for experience curation using embedded capabilities and functionality provided by a neuro-symbolic generative AI reasoning and action platform 600, according to an embodiment. According to the embodiment, a mobile device 610*a* may comprise an operating system 611, various software applications 612 (e.g., text messaging application, social media application, mobile games, music streaming applications, etc.), a local instance of a neuro-symbolic GenAI model 613, a context classification model 614, and an experience curation application 615. Mobile devices 610*a-n* may further comprise a processor, memory, sensors, storage, wireless communication modules, a display, audio components, and various other components to enable the functionality of a mobile computing device. Mobile devices 610*a-n* may connect to platform 600 via a suitable communication network such as the Internet. In some embodiments, mobile device may utilize the systems and services 621, 622, 623, 624 provided by platform to facilitate query-response interactions with a neuro-symbolic GenAI model.

According to the embodiment, mobile device 610*a* stores and operates local models 613, 614 and a curation application 615 which can be leveraged during instances when mobile device 610*a* is unable to connect with platform 600 or otherwise has an intermittent connection thereby making data transmission difficult, slow, or impossible. In such situations, mobile device 610*a* can leverage the local components to perform computation at the edge. A user of mobile device 610*a* can use curation application 615 to submit a query to the local neuro-symbolic GenAI model 613, along with any aggregated context retrieved via context classification 614. The model 613 can generate a response and send it to curation application 615 where it may be curated (or not) based on the mobile device user's preferences or rules.

In some embodiments, when there is only an intermittent connection to platform 600, such as when a mobile device is in an area with poor network coverage, various strategies may be implemented to provide functionality to the mobile device user. For example, data (e.g., a user submitted query or prompt) can be temporarily stored in a buffer on the device until a connection to platform 600 is available. Once the connection is reestablished, the buffered data can be transmitted. Likewise, frequently accessed data or recently transmitted data can be cached on the device. This allows the device to access the data locally when a connection to platform 600 is not available. In some implementations, data can be compressed before transmission to reduce the amount of data that needs to be transmitted. This can help to minimize the impact of intermittent connections on data transmission. In some embodiments, mobile device 610*a-n* may use protocols that are designed to handle intermittent connections, such as MQTT (Message Queuing Telemetry Transport) or CoAP (Constrained Application Protocol), can help to ensure that data is successfully transmitted even in challenging network conditions. Finally, some use cases may implement an offline mode that allows users to continue using the application (or local instances) and storing data locally until a connection to platform 600 is available again.

Figure 7:
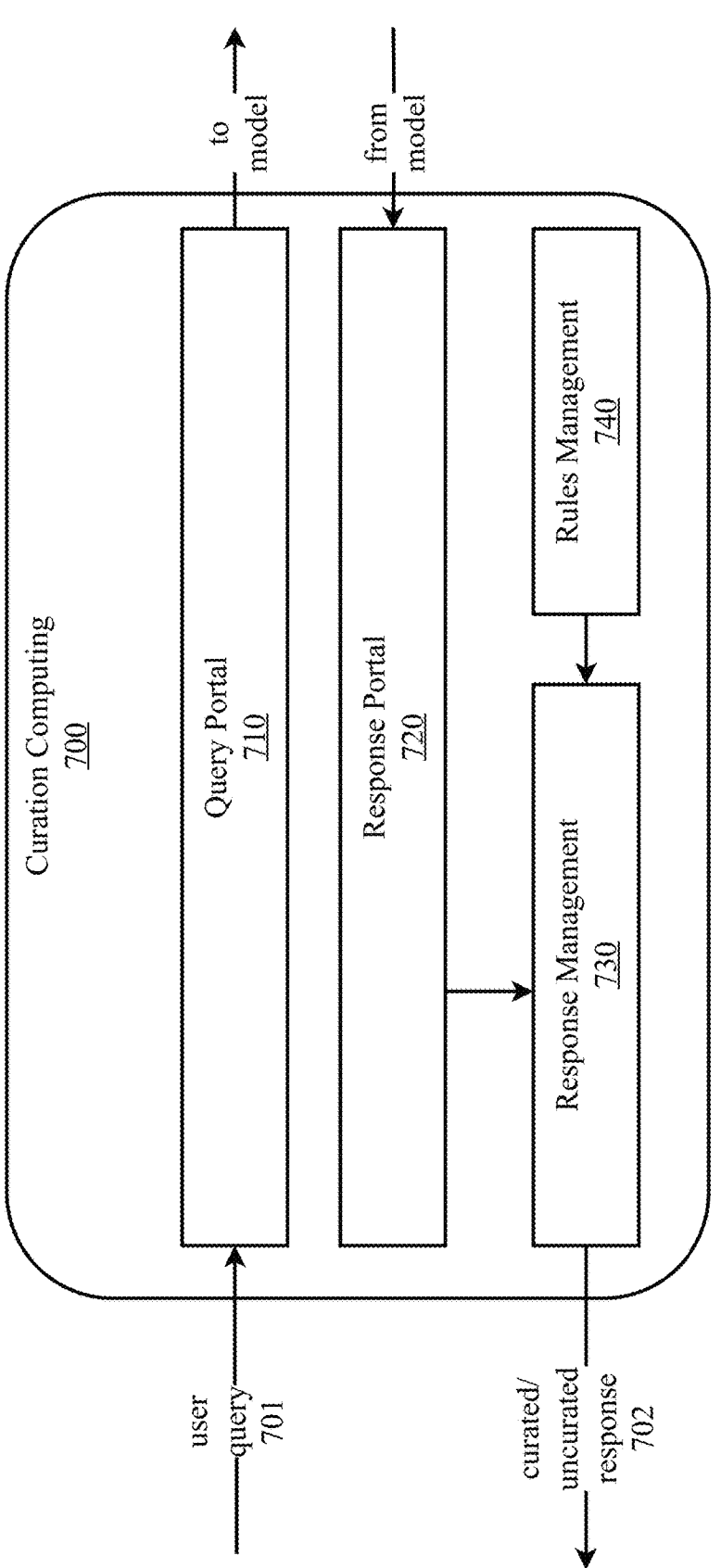
FIG. 7 is a block diagram illustrating an exemplary aspect of a distributed generative artificial intelligence reasoning and action platform, a curation computing system.

FIG. 7 is a block diagram illustrating an exemplary aspect of a distributed generative artificial intelligence reasoning and action platform, a curation computing system 700. According to the aspect, curation computing system 700 is configured to provide curated (or not) responses from a trained model (e.g., transformer-based model) to received user queries. A curated response may indicate that the response has been filtered, such as to remove personal identifying information or to remove extraneous information from the response, or it may indicate that the response has been augmented with additional context or information relevant to the user. The curation of a response may be based on rules or policies that can be set at an individual user level, an enterprise level, or at a department level for enterprises with multiple departments (e.g., sales, marketing, research, product development, etc.). User/entity rules and/or preferences may be stored in a data storage system of platform 120 and retrieved by a rules management component 740 during experience curation processes.

In operation, curation computing 700 receives a user query 701 directed to a neuro-symbolic GenAI model. A query portal 710 may be present and configured to receive a query 701 and prepare it for processing by a GenAI model. For example, a query may be split into tokens, (e.g., words or sub words) which are basic units of the language model. As another example, a text-based query may undergo normalization (e.g., converting to lowercase, removing punctuation, handling special characters, etc.) to ensure consistency and improve model performance. As yet another example, for models that use attention mechanisms, an attention mask may be applied to the input to indicate which tokens should be attended to and which should be ignored. In some implementations, a query portal 710 may be configured to send received queries to an embedding model which can vectorize the received query and store it in a vector database. In such embodiments, stored query embeddings may be used as a form of contextual data which may be retrieved and transmitted with the query to a GenAI model which generates a response based on the received query and contextual data.

According to the aspect, a response portal 720 is present and configured to receive a response from one a GenAI model and a response management system 730 determines if the received response needs to be curated or not. If the response does not need to be curated, then it may be sent as an uncrated response 702 to the user who submitted the query. Response management 730 can determine if there are any user/entity defined rules or preferences available such as stored in a user/entity profile in a data storage system of platform 120. Rules management 740 can retrieve said rules and response management can curate or otherwise augment the received response based on the user/entity rules or preferences. The result is a curated response 702 which can be transmitted back to the user who submitted the query.

Figure 8:
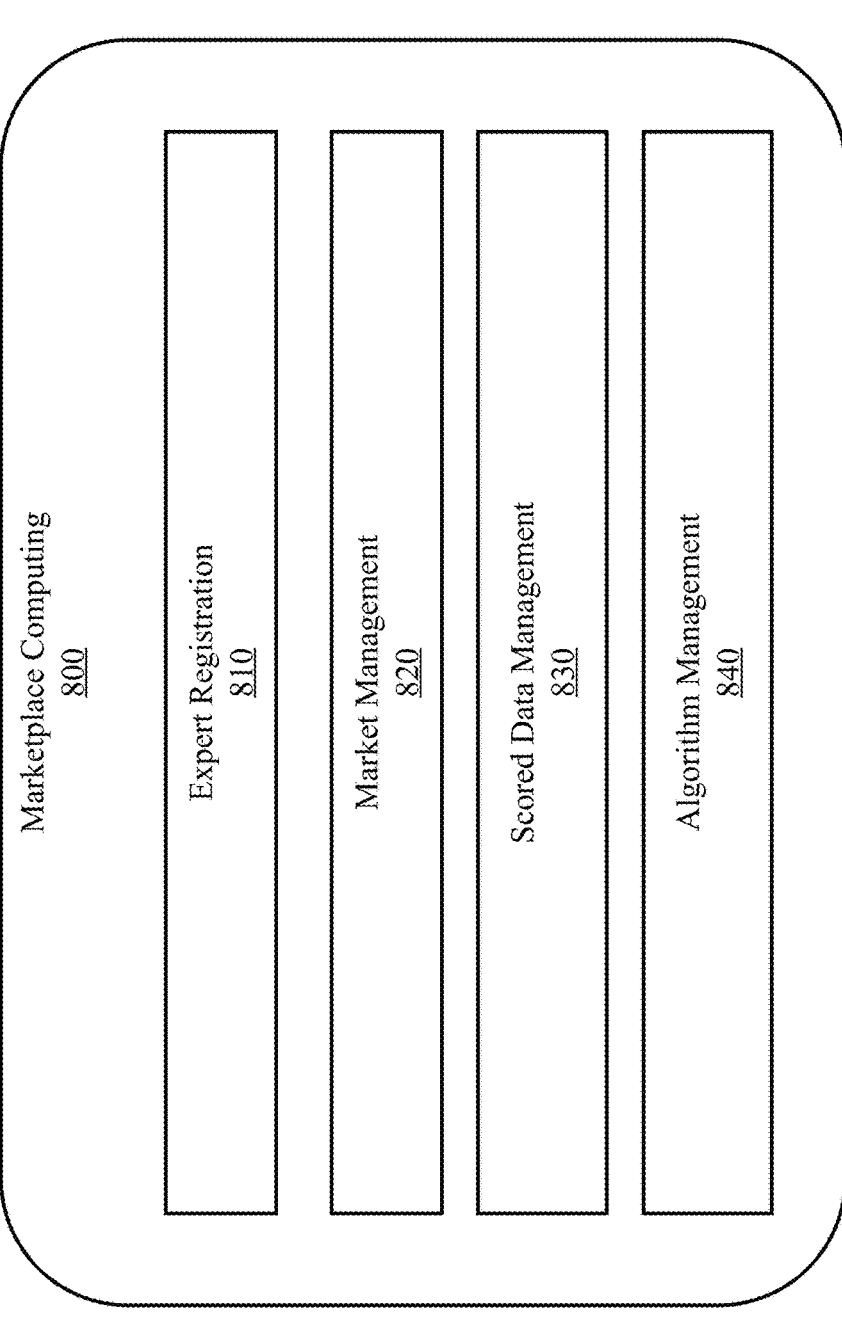
FIG. 8 is a block diagram illustrating an exemplary aspect of a distributed generative artificial intelligence reasoning and action platform, a marketplace computing system.

FIG. 8 is a block diagram illustrating an exemplary aspect of a distributed generative artificial intelligence reasoning and action platform, a marketplace computing system 800. According to the aspect, marketplace computing system 800 is present and configured to develop and integrate various marketplaces 130a-n for data, algorithms, and RAGs into platform 120. Marketplace computing system 800 can provide functionality directed to the registration of experts 810 or entities. An expert may be someone who has a deep understanding and knowledge of a specific industry, including its trends, challenges, technologies, regulations, and best practices. Industry experts often have many years of experience working in the industry and have developed a reputation for their expertise and insights. An expert may be registered by providing proof of identity and qualifications, and creating an expert profile which can store a variety of information about the expert such as their name, industry, credentials, scores (e.g., scores that the expert has assigned to data sources, models/algorithms, model outputs, and/or the like), and reputation. For example, a university professor who specializes in transformer-based algorithms can register as an expert in the realm of generative algorithms. As another example, a virologist could register as an expert and provide scores for academic papers which disclose a new methodology for viral spread modelling.

Marketplace computing system 800 may further comprise a market management component 820 which can interface with a plurality of markets 130a-n to integrate information contained therein. A scored data management component 830 may be configured to interface with a browser extension 240 or expert judgment marketplace 260 to retrieve expert scores and store them in an expert judgment score database

270. According to the aspect, an algorithm management component 840 is present and configured to acquire algorithms from algorithm marketplaces to be used in the construction and configuration of neuro-symbolic GenAI models.

Figure 9:
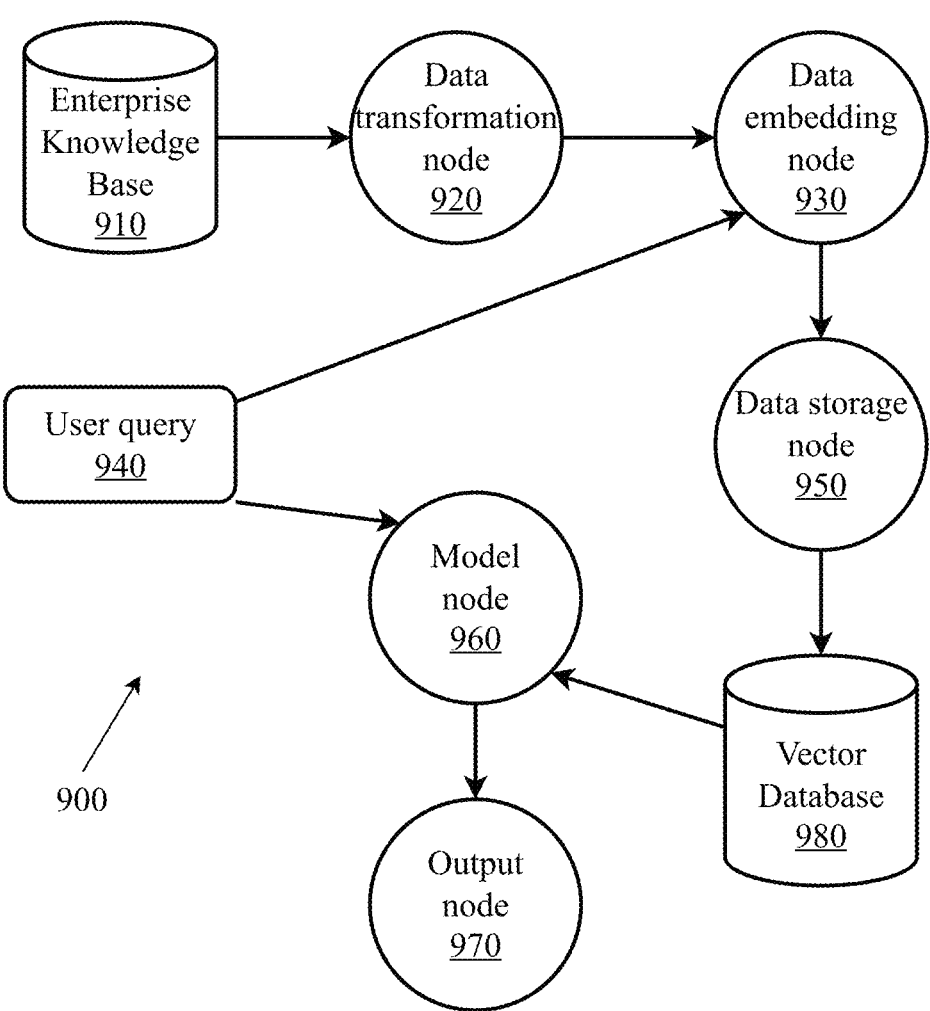
FIG. 9 is a block diagram illustrating a simple example of a distributed computational graph representation for providing neuro-symbolic GenAI capabilities, according to an aspect.

FIG. 9 is a block diagram illustrating a simple example of a distributed computational graph 900 representation for providing neuro-symbolic GenAI capabilities, according to an aspect. According to the aspect, the DCG may be represented as a series of nodes which represent discrete computational or data processing functions, and a series of edges connecting the nodes which represent information or data messages being sent between processing nodes. A DCG can be used to acquire a plurality of context data in the form of an enterprise knowledge base 910. A data transformation node 920 is created to handle the ingestion and transformation of acquired context data. Obtained data may then be sent to a data embedding node 930 which can vectorize the received context data. The vectorized data may flow from the embedding node 930 to a data storage node 950. Data storage node 950 may select the appropriate vector database 980 in which to store the vectorized context data. An input node 940 may allow for a user to submit a query to the workflow. The user query can be sent to data embedding node 930 where it may be vectorized and sent to data storage node 950 for storage in the vector database. The user query can also be sent to a model node 960 which contains the selected model(s) which will process the user query along with any relevant context data obtained from data storage node vector database 980. Model node 960 then processes this information to generate a response which can be sent to output node 970. In some instances, output node 970 may output the response directly to the user. In other instances, output node 970 may be configured to transform the response into a curated response based on user/entity defined rules or preferences.

FIGS. 10-14 illustrate various exemplary aspects of system architectures of distributed computational graph computing environments. For more detailed information regarding the operation of the various components and aspects described herein with respect to FIGS. 10-14, please refer to U.S. patent application Ser. No. 15/931,534 which is incorporated herein by reference.

Figure 10:
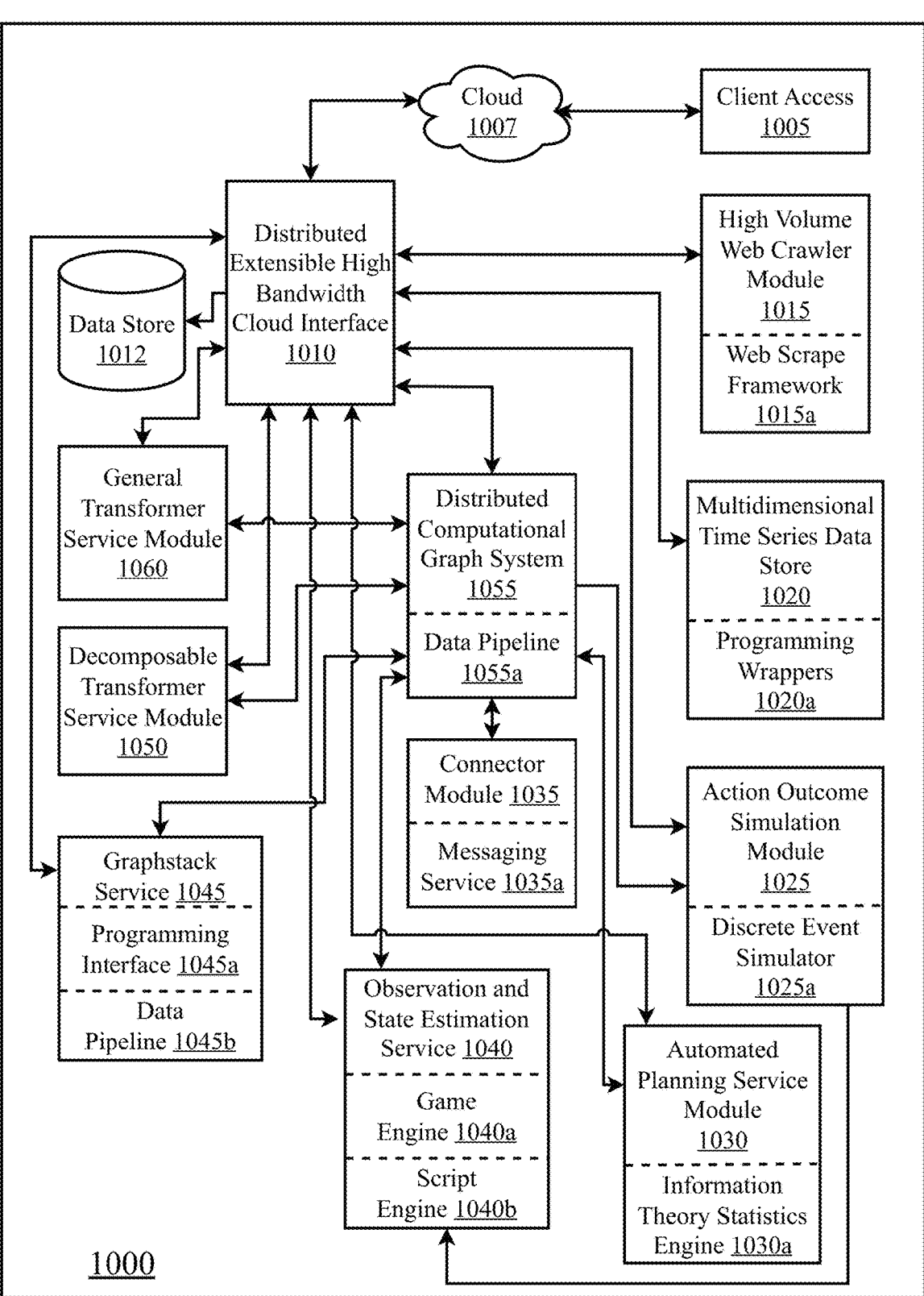
FIG. 10 is a block diagram illustrating an exemplary aspect of an embodiment of a distributed computational graph computing system utilizing an advanced cyber decision platform (ACDP) for external network reconnaissance and contextual data collection.

FIG. 10 is a block diagram illustrating an exemplary aspect of an embodiment of a distributed computational graph computing system utilizing an advanced cyber decision platform (ACDP) for external network reconnaissance and contextual data collection. Client access to the system 1005 for specific data entry, system control and for interaction with system output such as automated predictive decision making and planning and alternate pathway simulations, occurs through the system's distributed, extensible high bandwidth cloud interface 1010 which uses a versatile, robust web application driven interface for both input and display of client-facing information via network 1007 and operates a data store 1012 such as, but not limited to MONGODB™, COUCHDB™, CASSANDRA™ or REDIS™ according to various arrangements. Much of the enterprise knowledge/context data analyzed by the system both from sources within the confines of the enterprise business, and from cloud based sources, also enter the system through the cloud interface 1010, data being passed to the connector module 1035 which may possess the API routines 1035a needed to accept and convert the external data and then pass the normalized information to other analysis and transformation components of the system, the directed computational graph module 1055, high volume web crawler module 1015, multidimensional time series database (MDTSDB) 1020 and the graph stack service 1045. The directed computational graph module 1055 retrieves one or more streams of data from a plurality of sources, which includes, but is in no way not limited to, enterprise knowledge, RAGs, expert judgment/scores, a plurality of physical sensors, network service providers, web based questionnaires and surveys, monitoring of electronic infrastructure, crowdsourcing campaigns, and human input device information. Within the directed computational graph module 1055, data may be split into two identical streams in a specialized pre-programmed data pipeline 1055a, wherein one sub-stream may be sent for batch processing and storage while the other sub-stream may be reformatted for transformation pipeline analysis. The data is then transferred to the general transformer service module 1060 for linear data transformation as part of analysis or the decomposable transformer service module 1050 for branching or iterative transformations that are part of analysis. The directed computational graph module 1055 can represent all data as directed graphs where the transformations are nodes and the result messages between transformations edges of the graph. The high volume web crawling module 1015 uses multiple server hosted preprogrammed web spiders, which while autonomously configured are deployed within a web scraping framework 1015a of which SCRAPY™ is an example, to identify and retrieve data of interest from web based sources that are not well tagged by conventional web crawling technology. Data persistence stores such as the multiple dimension time series data store module 1020 may receive streaming data from a large plurality of sensors that may be of several different types. The multiple dimension time series data store module may also store any time series data encountered by the system such as but not limited to enterprise network usage data, component and system logs, environmental context, edge device state information, performance data, network service information captures such as, but not limited to news and financial feeds, and sales and service related customer data. The module is designed to accommodate irregular and high volume surges by dynamically allocating network bandwidth and server processing channels to process the incoming data. Inclusion of programming wrappers 1020a for languages examples of which are, but not limited to C++, PERL, PYTHON, Rust, GoLang, and ERLANG™ allows sophisticated programming logic to be added to the default function of the multidimensional time series database 1020 without intimate knowledge of the core programming, greatly extending breadth of function. Data retrieved by various data stores such as SQL, graph, key-value, or the multidimensional time series database (MDTSDB) 1020 and the high volume web crawling module 1015 may be further analyzed and transformed into task optimized results by the directed computational graph 1055 and associated general transformer service 1050 and decomposable transformer service 1060 modules. Alternately, data from the multidimensional time series database and high volume web crawling modules may be sent, often with scripted cuing information determining important vertexes 1045a, to the graph stack service module 1045 which, employing standardized protocols for converting streams of information into graph representations of that data, for example, open graph internet technology although the invention is not reliant on any one standard. Through the steps, the graph stack service module 1045 represents data in graphical form influenced by any predetermined scripted modifications 1045a and stores it in a graph-based data store 1045b such as AWS Neptune, TigerGraph, GIRAPH™ or a key value pair type data store REDIS™, Dynamo or RIAK™, a columnar store like Cassandra or Scylla, or a SQL database like PostgreSQL among others, all of which are suitable for storing graph-based information at various scales and efficiencies.

Results of the transformative analysis process may then be combined with further client directives, and additional business rules and practices relevant to the analysis and situational information external to the already available data in the automated planning service module 1030 which also runs powerful information theory 1030a based predictive statistics functions and machine learning algorithms to allow future trends and outcomes to be rapidly forecast based upon the current system derived results and choosing each a plurality of possible business decisions. Using all available data, the automated planning service module 1030 may propose business decisions most likely to result in the most favorable business outcome with a usably high level of certainty. Closely related to the automated planning service module in the use of system derived results in conjunction with possible externally supplied additional information (i.e., context) in the assistance of end user business decision making, the action outcome simulation module 1025 with its discrete event simulator programming module 1025a coupled with the end user facing observation and state estimation service 1040 which is highly scriptable 1040b as circumstances require and has a game engine 1040a to more realistically stage possible outcomes of business decisions under consideration, allows business decision makers to investigate the probable outcomes of choosing one pending course of action over another based upon analysis of the current available data.

Figure 11:
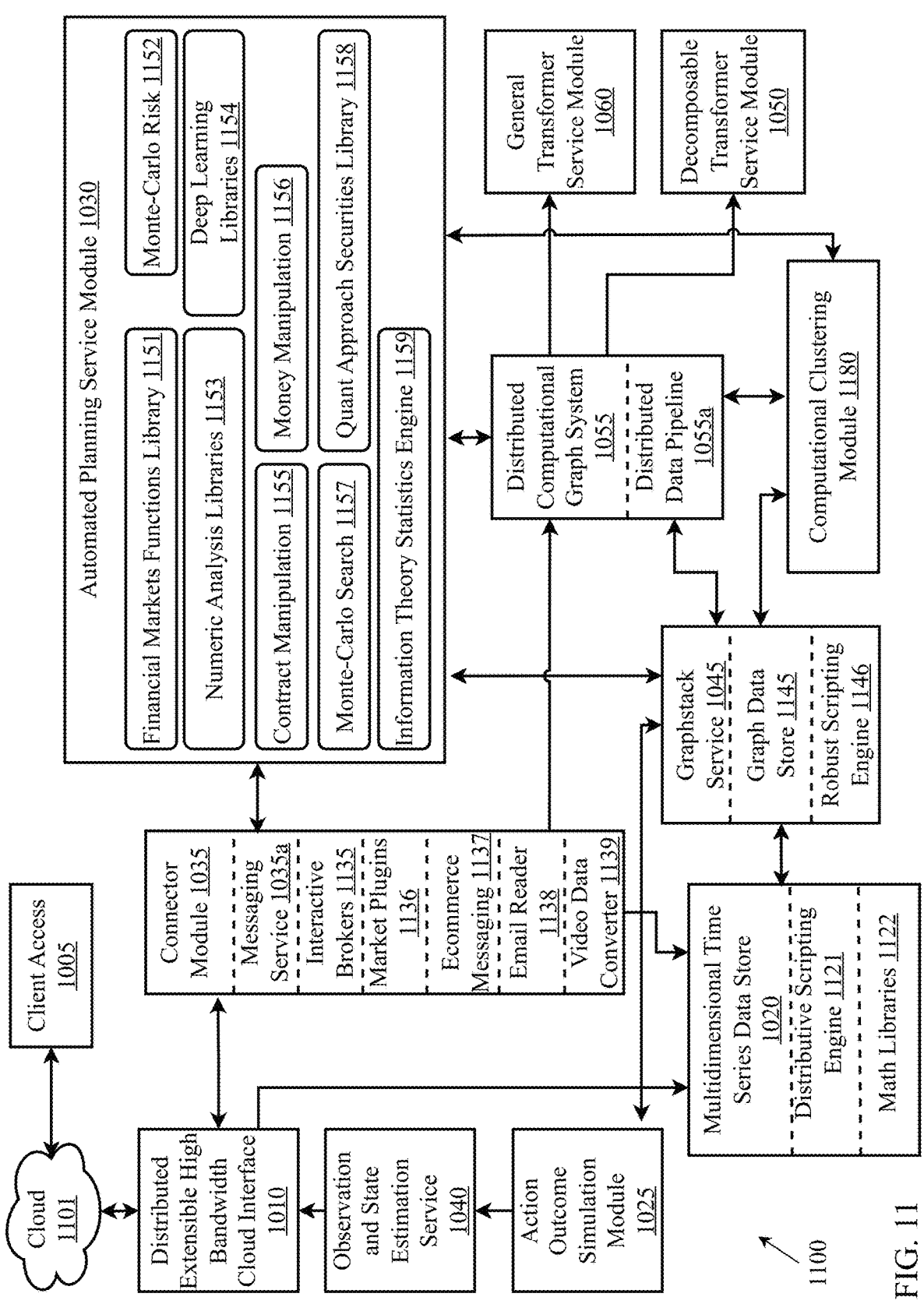
FIG. 11 is a block diagram illustrating another exemplary aspect of an embodiment of a distributed computational graph computing systems utilizing an advanced cyber decision platform.

FIG. 11 is a block diagram illustrating another exemplary aspect of an embodiment 1100 of a distributed computational graph computing systems utilizing an advanced cyber decision platform. According to the aspect the integrated platform 1100, is very well suited to perform advanced predictive analytics and predictive simulations to produce investment predictions. Much of the trading specific programming functions are added to the automated planning service module 1030 of the modified advanced cyber decision platform 1100 to specialize it to perform trading analytics. Specialized purpose libraries may include but are not limited to financial markets functions libraries 1151, Monte-Carlo risk routines 1152, numeric analysis libraries 1153, deep learning libraries 1154, contract manipulation functions 1155, money handling functions 1156, Monte-Carlo search libraries 1157, and quant approach securities routines 1158. Pre-existing deep learning routines including information theory statistics engine 1159 may also be used. The invention may also make use of other libraries and capabilities that are known to those skilled in the art as instrumental in the regulated trade of items of worth. Data from a plurality of sources used in trade analysis are retrieved, much of it from remote, cloud resident 1101 servers through the system's distributed, extensible high bandwidth cloud interface 110 using the system's connector module 135 which is specifically designed to accept data from a number of information services both public and private through interfaces to those service's applications using its messaging service 135a routines, due to ease of programming, are augmented with interactive broker functions 1135, market data source plugins 1136, e-commerce messaging interpreters 1137, business-practice aware email reader 1138 and programming libraries to extract information from video data sources 1139.

Other modules that make up the advanced cyber decision platform may also perform significant analytical transformations on trade related data. These may include the multidimensional time series data store 1020 with its robust scripting features which may include a distributive friendly, fault-tolerant, real-time, continuous run prioritizing, programming platform such as, but not limited to Erlang/OTP 1121 and a compatible but comprehensive and proven library of math functions of which the C" math libraries are an example 1122, data formalization and ability to capture time series data including irregularly transmitted, burst data; the GraphStack service 145 which transforms data into graphical representations for relational analysis and may use packages for graph format data storage such as Titan 1145 or the like and a highly interface accessible programming interface an example of which may be Akka/Spray, although other, similar, combinations may equally serve the same purpose in this role 1146 to facilitate optimal data handling; the directed computational graph module 155 and its distributed data pipeline 155a supplying related general transformer service module 160 and decomposable transformer module 150 which may efficiently carry out linear, branched, and recursive transformation pipelines during trading data analysis may be programmed with multiple trade related functions involved in predictive analytics of the received trade data. Both possibly during and following predictive analyses carried out by the system, results must be presented to clients 1005 in formats best suited to convey both important results for analysts to make highly informed decisions and, when needed, interim or final data in summary and potentially raw for direct human analysis. Simulations which may use data from a plurality of field spanning sources to predict future trade conditions are accomplished within the action outcome simulation module 1025. Data and simulation formatting may be completed or performed by the observation and state estimation service 1040 using its ease of scripting and gaming engine to produce optimal presentation results.

In cases where there are both large amounts of data to be ingested, schematized, normalized, semantified or otherwise cleansed, enriched or formalized and then intricate transformations such as those that may be associated with deep machine learning, predictive analytics and predictive simulations, distribution of computer resources to a plurality of systems may be routinely required to accomplish these tasks due to the volume of data being handled and acted upon. The advanced cyber decision platform employs a distributed architecture that is highly extensible to meet these needs. A number of the tasks carried out by the system are extremely processor intensive and for these, the highly integrated process of hardware clustering of systems, possibly of a specific hardware architecture particularly suited to the calculations inherent in the task, is desirable, if not required for timely completion. The system includes a computational clustering module 1180 to allow the configuration and management of such clusters during application of the advanced cyber decision platform. While the computational clustering module is drawn directly connected to specific co-modules of the advanced cyber decision platform these connections, while logical, are for ease of illustration and those skilled in the art will realize that the functions attributed to specific modules of an embodiment may require clustered computing under one use case and not under others. Similarly, the functions designated to a clustered configuration may be role, if not run, dictated. Further, not all use cases or data runs may use clustering.

Figure 12:
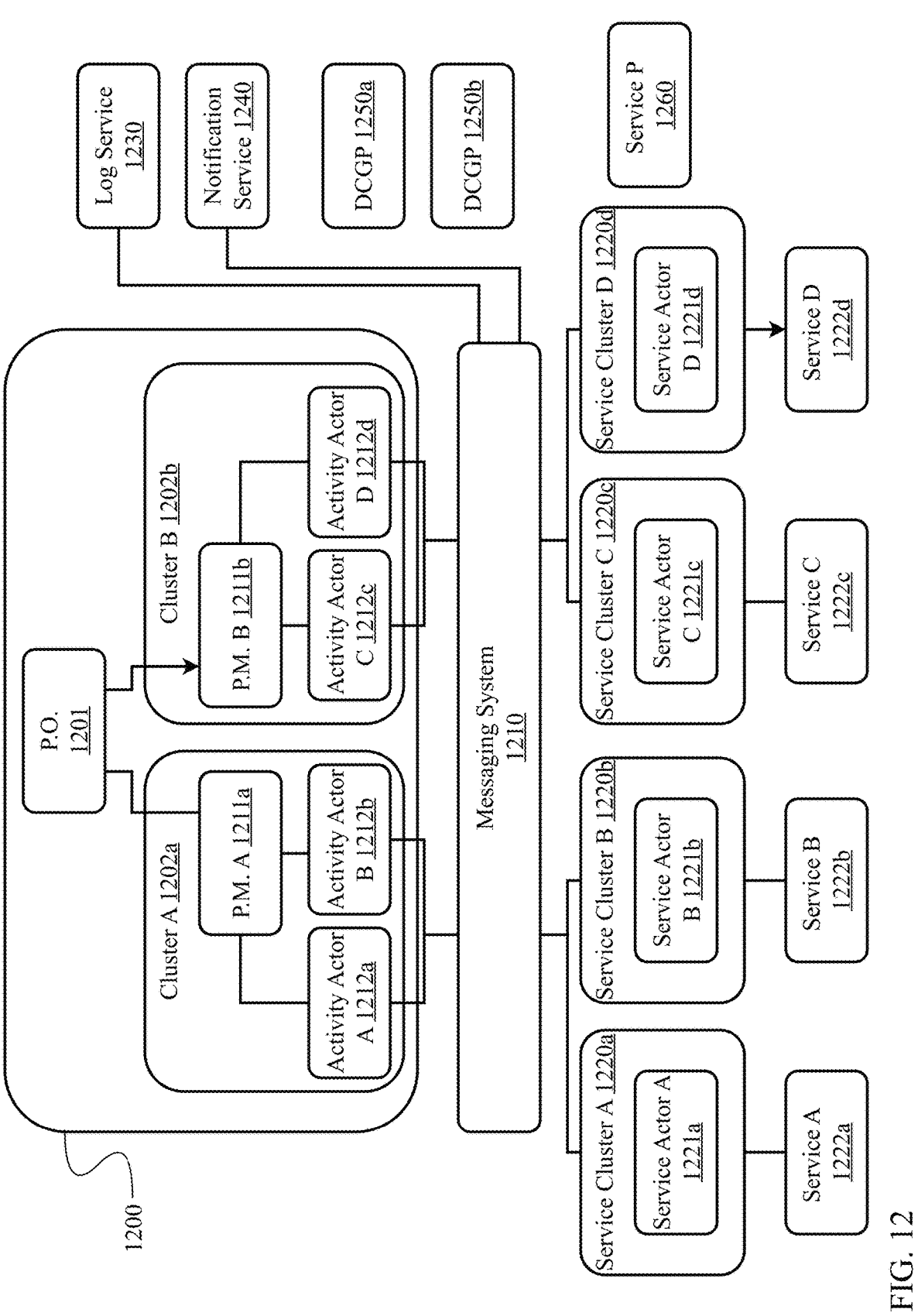
FIG. 12 is a diagram of an exemplary architecture for a system for rapid predictive analysis of very large data sets using an actor-driven distributed computational graph, according to one aspect.

FIG. 12 is a diagram of an exemplary architecture for a system for rapid predictive analysis of very large data sets using an actor-driven distributed computational graph 1200, according to one aspect. According to the aspect, a DCG 1200 may comprise a pipeline orchestrator 1201 that may be used to perform a variety of data transformation functions on data within a processing pipeline, and may be used with a messaging system 1210 that enables communication with any number of various services and protocols, relaying messages and translating them as needed into protocol-specific API system calls for interoperability with external systems (rather than requiring a particular protocol or service to be integrated into a DCG 1200).

Pipeline orchestrator 1201 may spawn a plurality of child pipeline clusters 1202a-b, which may be used as dedicated workers for streamlining parallel processing. In some arrangements, an entire data processing pipeline may be passed to a child cluster 1202a for handling, rather than individual processing tasks, enabling each child cluster 1202a-b to handle an entire data pipeline in a dedicated fashion to maintain isolated processing of different pipelines using different cluster nodes 1202a-b. Pipeline orchestrator 1201 may provide a software API for starting, stopping, submitting, or saving pipelines. When a pipeline is started, pipeline orchestrator 1201 may send the pipeline information to an available worker node 1202a-b, for example using AKKA™ clustering. For each pipeline initialized by pipeline orchestrator 1201, a reporting object with status information may be maintained. Streaming activities may report the last time an event was processed, and the number of events processed. Batch activities may report status messages as they occur. Pipeline orchestrator 1201 may perform batch caching using, for example, an IGFS™ caching filesystem. This allows activities 1212a-d within a pipeline 1202a-b to pass data contexts to one another, with any necessary parameter configurations.

A pipeline manager 1211a-b may be spawned for every new running pipeline, and may be used to send activity, status, lifecycle, and event count information to the pipeline orchestrator 1201. Within a particular pipeline, a plurality of activity actors 1212a-d may be created by a pipeline manager 1211a-b to handle individual tasks, and provide output to data services 1222a-d. Data models used in a given pipeline may be determined by the specific pipeline and activities, as directed by a pipeline manager 1211a-b. Each pipeline manager 1211a-b controls and directs the operation of any activity actors 1212a-d spawned by it. A pipeline process may need to coordinate streaming data between tasks. For this, a pipeline manager 1211a-b may spawn service connectors to dynamically create TCP connections between activity instances 1212a-d. Data contexts may be maintained for each individual activity 1212a-d, and may be cached for provision to other activities 1212a-d as needed. A data context defines how an activity accesses information, and an activity 1212a-d may process data or simply forward it to a next step. Forwarding data between pipeline steps may route data through a streaming context or batch context.

A client service cluster 1230 may operate a plurality of service actors 1221a-d to serve the requests of activity actors 1212a-d, ideally maintaining enough service actors 1221a-d to support each activity per the service type. These may also be arranged within service clusters 1220a-d, in a manner similar to the logical organization of activity actors 1212a-d within clusters 1202a-b in a data pipeline. A logging service 1230 may be used to log and sample DCG requests and messages during operation while notification service 1240 may be used to receive alerts and other notifications during operation (for example to alert on errors, which may then be diagnosed by reviewing records from logging service 1230), and by being connected externally to messaging system 1210, logging and notification services can be added, removed, or modified during operation without impacting DCG 1200. A plurality of DCG protocols 1250*a-b* may be used to provide structured messaging between a DCG 1200 and messaging system 1210, or to enable messaging system 1210 to distribute DCG messages across service clusters 1220*a-d* as shown. A service protocol 1260 may be used to define service interactions so that a DCG 1200 may be modified without impacting service implementations. In this manner it can be appreciated that the overall structure of a system using an actor-driven DCG 1200 operates in a modular fashion, enabling modification and substitution of various components without impacting other operations or requiring additional reconfiguration.

Figure 13:
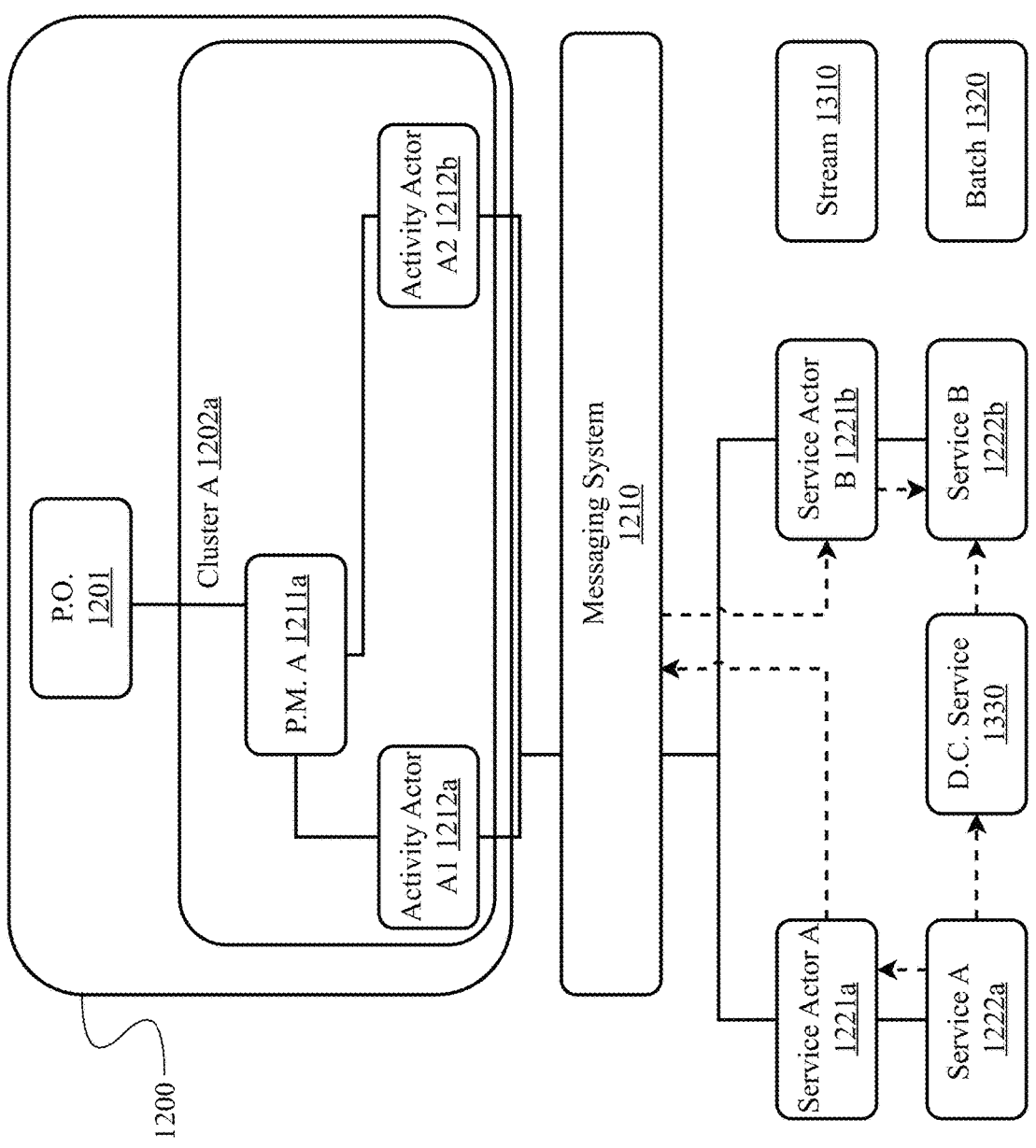
FIG. 13 is a diagram of an exemplary architecture for a system for rapid predictive analysis of very large data sets using an actor-driven distributed computational graph, according to one aspect.

FIG. 13 is a diagram of an exemplary architecture for a system for rapid predictive analysis of very large data sets using an actor-driven distributed computational graph 1200, according to one aspect. According to the aspect, a variant messaging arrangement may utilize messaging system 1210 as a messaging broker using a streaming protocol 1310, transmitting and receiving messages immediately using messaging system 1210 as a message broker to bridge communication between service actors 1221*a-b* as needed. Alternately, individual services 1222*a-b* may communicate directly in a batch context 1320, using a data context service 1330 as a broker to batch-process and relay messages between services 1222*a-b*.

Figure 14:
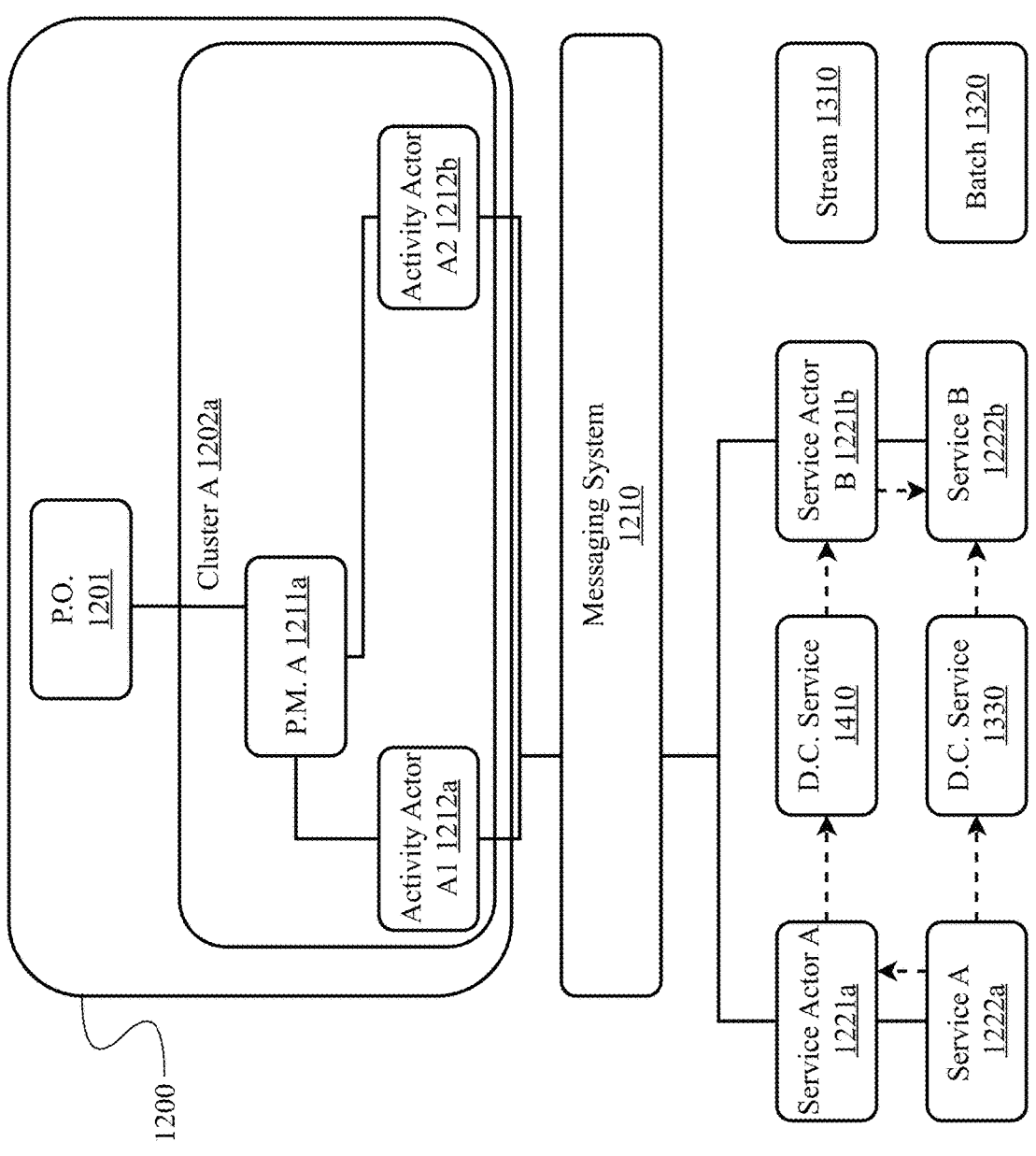
FIG. 14 is a diagram of an exemplary architecture for a system for rapid predictive analysis of very large data sets using an actor-driven distributed computational graph, according to one aspect.

FIG. 14 is a diagram of an exemplary architecture for a system for rapid predictive analysis of very large data sets using an actor-driven distributed computational graph 1200, according to one aspect. According to the aspect, a variant messaging arrangement may utilize a service connector 1410 as a central message broker between a plurality of service actors 1221*a-b*, bridging messages in a streaming context 1310 while a data context service 1330 continues to provide direct peer-to-peer messaging between individual services 1222*a-b* in a batch context 1320.

It should be appreciated that various combinations and arrangements of the system variants described above (referring to FIGS. 10-14) may be possible, for example using one particular messaging arrangement for one data pipeline directed by a pipeline manager 1211*a-b*, while another pipeline may utilize a different messaging arrangement (or may not utilize messaging at all). In this manner, a single DCG 1200 and pipeline orchestrator 1201 may operate individual pipelines in the manner that is most suited to their particular needs, with dynamic arrangements being made possible through design modularity as described above in FIG. 12.

Figure 15:
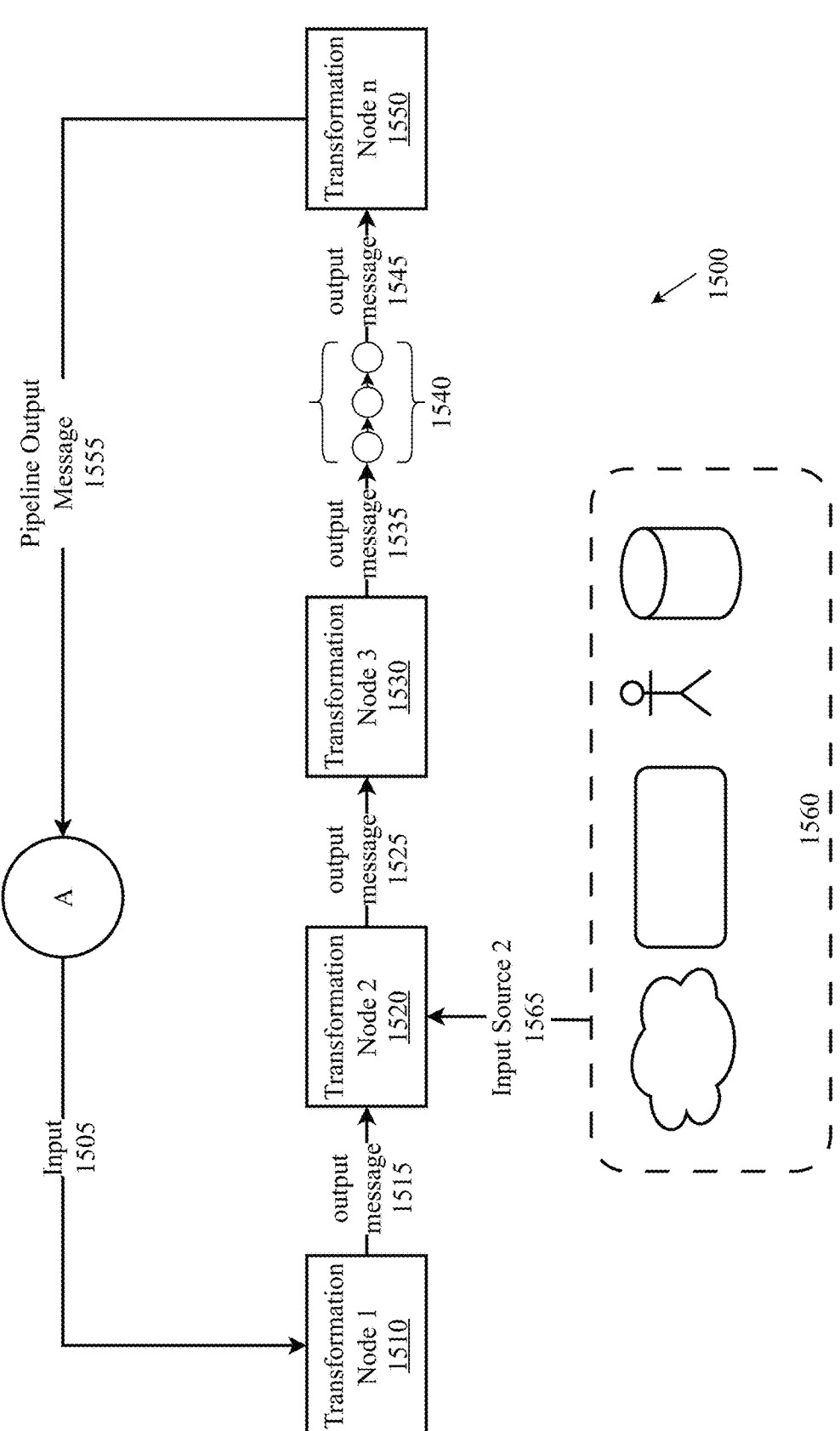
FIG. 15 is a block diagram of an exemplary architecture for a transformation pipeline within a system for predictive analysis of very large data sets using a distributed computational graph computing system.
Figure 17:
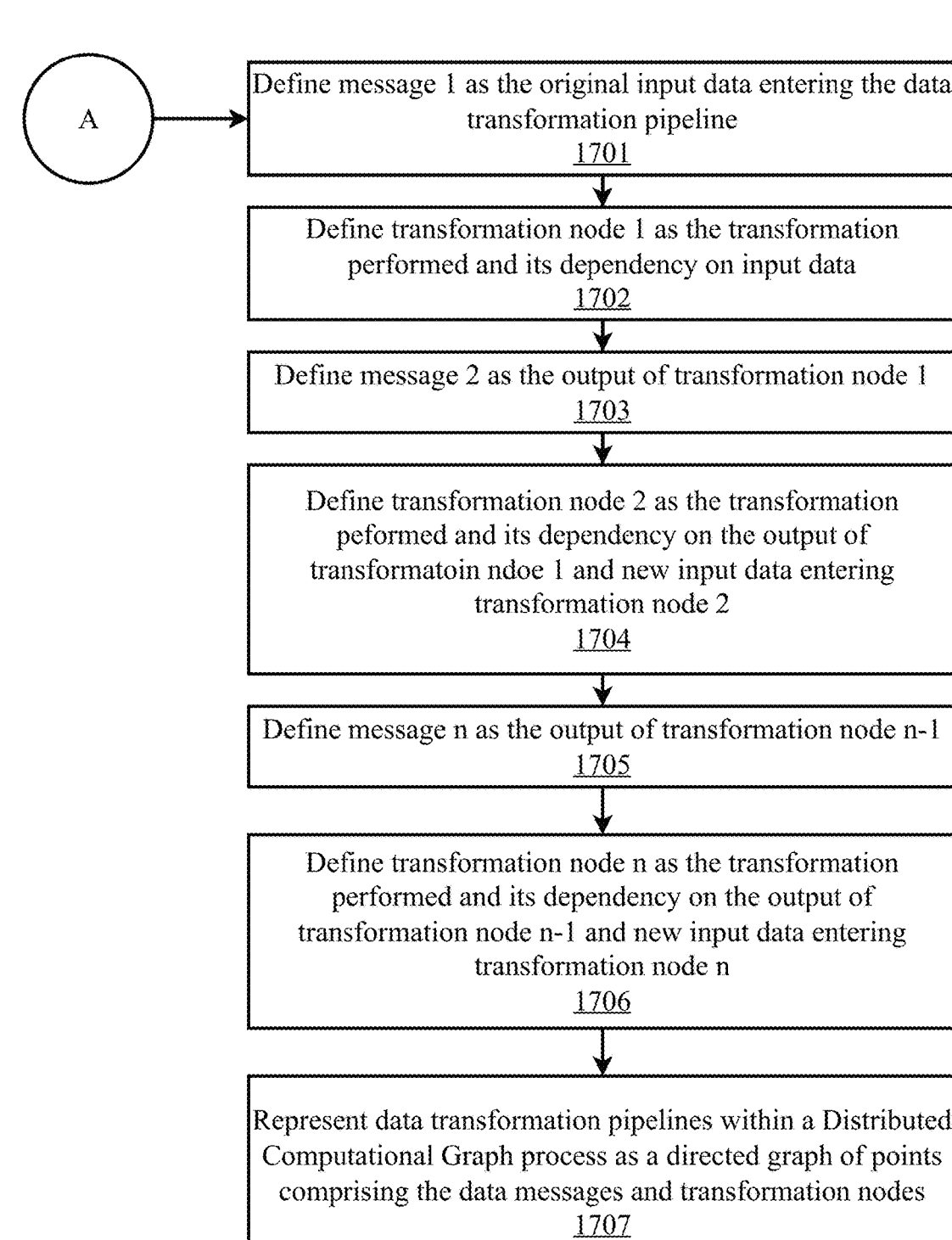
FIG. 17 is a process flow diagram of a method for an aspect of modeling the transformation pipeline module as a directed graph using graph theory.

FIGS. 15-17 illustrate various exemplary aspects of system architectures and methods of distributed computational graph computing environments. For more detailed information regarding the operation of the various components and aspects described herein with respect to FIGS. 15-17, please refer to U.S. patent application Ser. No. 15/616,427 which is incorporated herein by reference.

FIG. 15 is a block diagram of an exemplary architecture for a transformation pipeline within a system for predictive analysis of very large data sets using a distributed computational graph computing system 1500. According to the aspect, streaming input from a data filter software module, 1505 serves as input to the first transformation node 1510 of the transformation pipeline. Each transformation node's function 1510, 1520, 1530, 1540, 1550 is performed on input data stream and transformed output message 1515, 1525, 1535, 1545, 1555, 1565 is sent to the next step. In this aspect, transformation node 2 1520 has a second input stream 1560. The specific source of this input is inconsequential to the operation of the invention and could be another transformation pipeline software module, a data store, human interaction, physical sensors, monitoring equipment for other electronic systems or a stream from the internet as from a crowdsourcing campaign, just to name a few possibilities 1560. For example, a first input stream may comprise enterprise knowledge and a second input stream may comprise RAG data from a RAG marketplace. Functional integration of a second input stream into one transformation node requires the two input stream events be serialized. The illustrated system can perform this serialization using a decomposable transformation software module. While transformation nodes are described according to various aspects as uniform shape, such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. For example, engines may be singletons (composed of a single activity or transformation). Furthermore, leveraging the architecture in this way allows for versioning and functional decomposition (i.e. embedding entire saved workflows as single nodes in other workflows). Further according to the aspect, individual transformation nodes in one pipeline may represent function of another transformation pipeline. It should be appreciated that the node length of transformation pipelines depicted in no way confines the transformation pipelines employed by the invention to an arbitrary maximum length 1510, 1520, 1530, 1540, 1550, as, being distributed, the number of transformations would be limited by the resources made available to each implementation of the invention. It should be further appreciated that there need be no limits on transform pipeline length. Output of the last transformation node and by extension, the transform pipeline, 1550 may be sent back to messaging software module 562 for pre-decided action.

Figure 32:
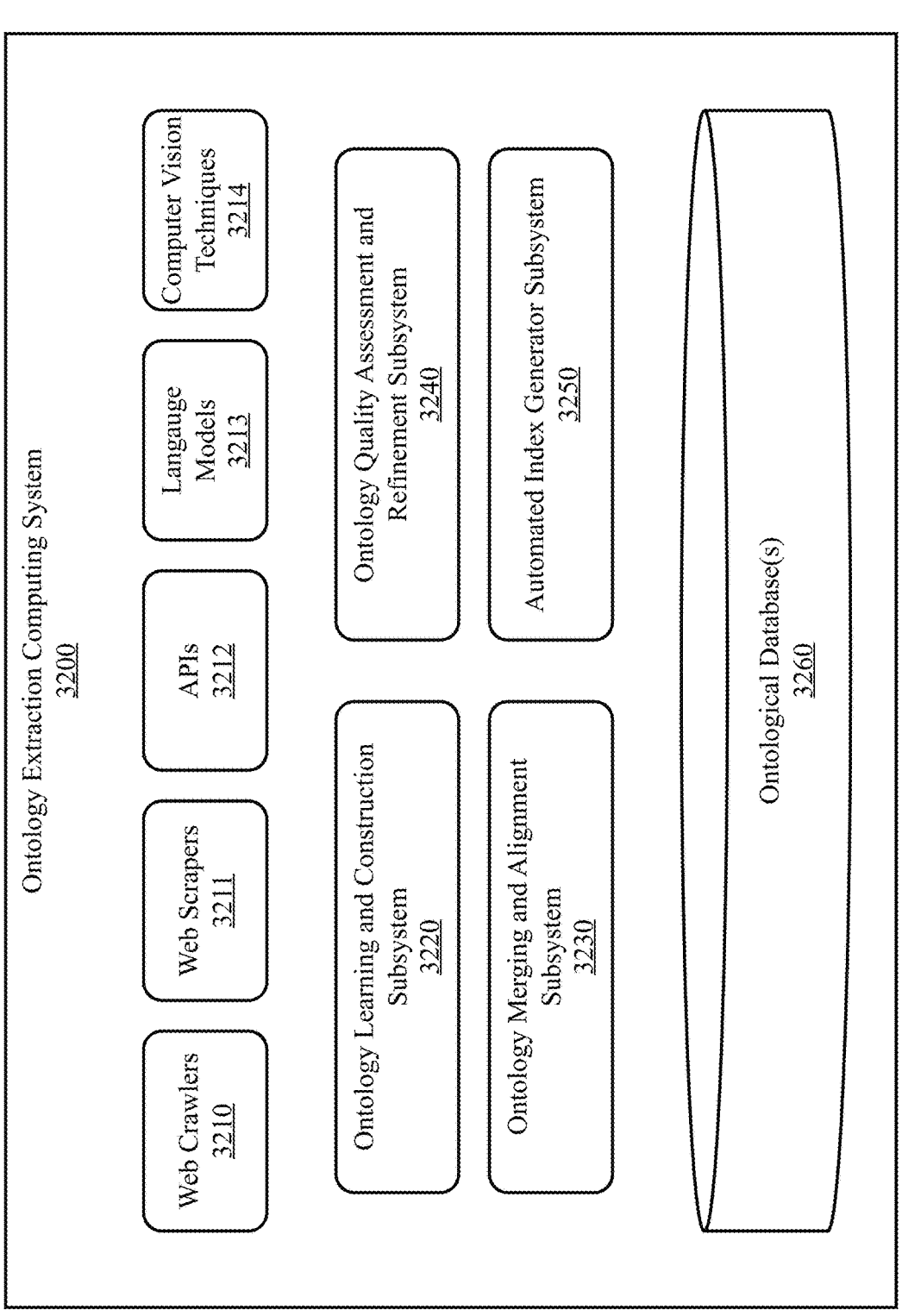
FIG. 32 is a block diagram illustrating an exemplary aspect of a distributed, composite symbolic and non-symbolic AI platform for advanced reasoning, an ontology extraction computing system.

FIG. 32 is a block diagram illustrating an exemplary aspect of a distributed, composite symbolic and non-symbolic AI platform for advanced reasoning 2120, an ontology extraction computing system. According to the aspect, the ontology extraction computing system 3200 creates and updates comprehensive ontologies by gathering and analyzing data from diverse sources using techniques such as web scraping, natural language processing, and machine learning. It leverages large language models to enhance entity recognition, relation extraction, and concept disambiguation during the ontology generation process. The system employs incremental ontology learning, collaborative editing, and quality assessment mechanisms to ensure the ontologies remain accurate, up-to-date, and aligned with domain knowledge. The extracted ontologies are seamlessly integrated with the platform's knowledge graph database, model blending capabilities, and context data to enable sophisticated semantic search, personalized query understanding, and context-aware results.

According to the aspect, the computing system 3200 may utilize various information gathering tools and techniques to extract knowledge from a plurality of information sources. The system may implement web crawlers 3210 and scrapers 3211 to gather data from various public sources such as, for example, social media, government records, scientific journals, and online encyclopedias. The system may leverage API 3212 integrations to retrieve data from private databases and knowledge bases. According to an aspect, the system may utilize pre-trained language models 3213 (e.g., BERT, GPT-3, LLMs, etc.) to extract relevant information from unstructured text data and employ computer vision techniques 3214 (e.g., object detection, image classification) to extract information from visual data sources. In some aspects, the system may be configured to perform "labeling" of non-textual data into text (e.g., image classification or scene classification/labelling) before computing embeddings to better establish more of the language based elements (which are largely more developed) and then creating numerical embedding representation for vector database persistence and downstream model incorporation.

Continuous crawling of specialized domains ensures that the knowledge base remains current and comprehensive. This is important for fields that evolve rapidly, such as technology, medicine, and finance. Specialized crawlers 3210 feed real-time data into the vector databases and knowledge graphs, ensuring that the information is always up-to-date and relevant.

Additionally, by utilizing data such as personal browsing history, topics of interest, etc., specialized crawlers can better determine what specific sources may or may not be relevant or valuable. This can help disambiguate between similar topics and terms in the query/response process.

According to an embodiment, the computing system 3200 may further comprise generative AI, including Kolmogorov-Arnold Networks (KANs) and LLMs configured to support AI-enhanced search and the curation of knowledge corpora and semantics search. LLMs, like GPT-4, excel in understanding and generating human-like text. They can interpret user queries with a high degree of nuance, recognizing intent and context, which traditional search engines often miss. LLMs can parse complex queries and return precise answers rather than just relevant documents. This makes search interactions more conversational and intuitive. KANs can generate new, contextually relevant content on-the-fly, filling gaps in existing knowledge corpora and keeping the information up-to-date. LLMs can synthesize information from multiple sources, providing concise summaries or comprehensive reports tailored to specific needs. KANs can integrate new information seamlessly into existing knowledge structures, enhancing the overall coherence and utility of the knowledge base. In at least one embodiment, the systems disclosed herein support AI-enhanced search and knowledge curation with one or more of the generative AI models disclosed herein.

According to an embodiment, LLMs can be used as an observation technique while scraping the web to improve the quality and efficiency of ontology generation. During web content extraction system 3200 can use web scraping libraries or frameworks, such as BeautifulSoup or Scrapy, to extract the textual content from web pages and apply preprocessing techniques, such as HTML parsing, text cleaning, and noise removal, to obtain clean and structured text data. This may comprise parallel or distributed scraping approaches to efficiently gather content from a large number of web pages. Furthermore, system 3200 may employ pre-trained LLMs, such as BERT, GPT, or domain-specific models, to perform named entity recognition (NER) on the extracted web page content. For example, the system can fine-tune the LLMs on labeled NER datasets relevant to the target domain to improve their performance in identifying entities of interest and then apply the fine-tuned LLMs to the scraped text data to identify and extract named entities, such as persons, organizations, locations, or domain-specific concepts. Additionally, the system can utilize LLMs to identify and extract relationships between the recognized named entities within the web page content. Again, this may involve fine-tuning the LLMs on labeled relation extraction datasets to enable them to recognize specific types of relationships relevant to the target ontology and then applying the fine-tuned LLMs to the scraped text data to extract semantic relationships between entities, such as "is-a," "part-of," or domain-specific relations.

With respect to concept disambiguation and linking, the system can leverage the knowledge encoded in LLMs to disambiguate and link the extracted entities and concepts to existing ontological resources or knowledge bases. For example, this may involve techniques such as entity linking or named entity disambiguation to map the extracted entities to their corresponding entries in the ontology or knowledge base. The system may employ LLMs to generate contextual embeddings for the extracted entities and concepts, enabling more accurate disambiguation and linking based on semantic similarity. According to an embodiment, the system may be configured to integrate the extracted entities, relationships, and linked concepts into the ontology being constructed or enriched and update the ontology structure and hierarchy based on the newly discovered entities and relationships, ensuring consistency and coherence. This process may leverage the knowledge captured by LLMs to infer additional properties, attributes, or axioms for the ontology classes and instances. According to an aspect, the system may implement feedback loops and validation mechanisms to iteratively refine the ontology based on the extracted information and LLM-based observations and/or utilize human-in-the-loop approaches, such as expert review or crowdsourcing, to validate the automatically extracted ontological elements and provide guidance for improvement. The system can fine-tune the LLMs based on the feedback and validation results to continuously enhance their performance in entity recognition, relation extraction, and concept disambiguation.

By integrating LLMs as an observation technique during web scraping, ontology extraction computing system 3200 can leverage the vast knowledge and understanding captured by these models to identify entities, extract relationships, and disambiguate concepts more effectively. LLMs provide a powerful tool for analyzing and interpreting the unstructured text data available on the web, enabling the automatic population and enrichment of ontologies.

Unlike some search engine's keyword-based approach, LLMs and KANs can understand and respond to the context and intent of queries, providing more accurate and relevant results. For example, Google relies on indexing existing web content, whereas generative AI can create new content and provide synthesized, up-to-date information. AI-enhanced search offers a more interactive and conversational user experience, making it easier to obtain precise answers and insights. As mentioned herein, integrating personal data such as browsing history ties in perfectly with marketing/advertising as well as more finely tuned search results. Developing a model of user interest and history can quantitatively map to advertising campaigns and product and be transparently integrated into results with a high degree of value added.

The integration of vector databases, knowledge graphs, and RAG models allows for deeper and more nuanced knowledge representation, surpassing the capabilities of current AI models. The ability to fine-tune models for specific domains and continuously update the knowledge base ensures that the system provides expert-level knowledge and stays relevant to the latest developments. The integration of LLMs, KANs, vector databases, traditional search databases, and knowledge graphs creates a powerful ecosystem for AI-enhanced search and knowledge curation. This approach supports more advanced knowledge representation, real-time updates, and domain-specific expertise, offering significant improvements over traditional search engines and existing AI models. The result is a more accurate, context-aware, and interactive search experience that meets the evolving needs of users in specialized fields.

According to some embodiments, ontology extraction computing system 3200 may leverage DCG computing system 121 to integrate dynamic knowledge graphs and ontologies into the semantic search system and to develop data ingestion pipelines using technologies like, for example, Apache Kafka, Apache Flink, or Apache Spark Streaming to consume and process real-time data streams from various sources. This may comprise the implementation of data preprocessing and transformation processes to clean, normalize, and structure the incoming data before integrating it into the knowledge graphs and ontologies.

Ontology extraction computing system 3200 can support incremental ontology learning and evolution across time and space. Platform 2120 may develop algorithms and techniques for incremental ontology learning, allowing the system to discover and incorporate new concepts, relationships, and patterns from the incoming data streams, as well as implement ontology alignment and mapping techniques, such as semantic similarity measures and graph matching algorithms, to integrate new knowledge into the existing ontological structures. In at least one embodiment, the system uses machine learning approaches, such as clustering, association rule mining, or graph neural networks, to identify emergent patterns and relationships within the knowledge graphs and update the ontologies accordingly.

According to an aspect, the platform offers user-friendly interfaces and tools that enable domain experts and users to collaboratively edit, curate, and extend the ontologies and knowledge graphs. For example, workflow and approval processes may be implemented to review and validate user-contributed updates before integrating them into the production ontologies and knowledge graphs. The platform may leverage a real-time update and synchronization mechanism(s) to propagate changes and additions to the knowledge graphs across all components of the AI platform. In an implementation, the platform utilizes event-driven architectures using message queues or publish-subscribe patterns to notify relevant components about updates to the knowledge graphs and ontologies.

The system may extend semantic search components, such as query understanding, semantic matching, and result ranking, to leverage the dynamically updated knowledge graphs and ontologies. This may comprise implementing mechanisms to map user queries and search terms to relevant concepts and relationships within the knowledge graphs, enabling more accurate and context-aware search results, and utilizing the ontological structure and semantic relationships to expand and refine search queries, improve result relevance, and provide explanations and justifications for search rankings.

According to the aspect, an ontology learning and construction subsystem 3220 is present and configured to use various mechanisms and techniques to construct ontologies from the plurality of extracted information. The subsystem 3220 may use natural language processing (NLP) techniques like named recognition, part-of-speech (POS) tagging, and dependency parsing to identify concepts, entities, and their relationships with the gathered data. Furthermore, the subsystem 3220 can apply unsupervised learning methods such as clustering (e.g., K-means, hierarchical clustering) and topic modeling (e.g., Latent Dirichlet Allocation) to discover semantic categories and hierarchies. In some implementations, various rule-based and statistical approaches may be used for relation extraction, such as pattern-based methods (e.g., Hearst patterns) and deep learning models (e.g., convolutional neural networks, recurrent neural networks). Additionally, graph-based techniques such as PageRank and community detection algorithms can be utilized to identify central concepts and their connections within the ontology. According to an aspect, the subsystem 3220 can incorporate existing domain-specific ontologies and knowledge bases (e.g., WordNet, DBpedia) to enrich and align the automatically generated ontologies.

According to the aspect, an ontology merging and alignment subsystem 3230 is present and configured to use one or more ontology alignment algorithms/techniques to merge the identified concepts from the plurality of gathered information. Platform 2120 can develop ontology alignment algorithms that use, for example, string similarity measures (e.g., Levenshtein distance), semantic similarity metrics (e.g., Word2Vec, GloVe), and structural similarity techniques (e.g., graph matching) to identify equivalent or related concepts across different ontologies and then implement ontology merging techniques that create a unified ontology by combining multiple source ontologies, resolving conflicts and inconsistencies, and maintaining logical coherence. According to an embodiment, the subsystem 3230 can use machine learning approaches (e.g., deep learning, probabilistic graphical models, etc.) to learn ontology mappings and perform automated ontology integration.

According to the aspect, an ontology quality assessment and refinement subsystem 3240 is present and configured to assess the quality of the generated ontologies. For example, the subsystem may apply ontology evaluation metrics such as consistency, completeness, and conciseness to assess the quality of the generated ontologies. Additionally, the subsystem can implement ontology debugging and repair techniques to identify and resolve logical inconsistencies, semantic errors, and structural anomalies within the ontologies. This can include the use of human-in-the-loop approaches, such as expert feedback and crowdsourcing, to validate and refine the automatically generated ontologies. The process may comprise continuously updating and enriching the ontologies based on new data, user feedback, and domain-specific knowledge.

The system 3200 may store the generated ontologies in a scalable and efficient database system 3260, such as a graph database (e.g., Neo4j, Amazon Neptune, JanusGraph, etc.) or a triplestore (e.g., Apache Jena, Virtuoso), and may further implement indexing techniques optimized for semantic queries, such as inverted indices, B+ trees, and bitmap indices, to enable fast retrieval of ontological information. According to an aspect, the system 3200 utilizes distributed computing frameworks (e.g., Apache Spark, Apache Beam, Apache Flink) for parallel or concurrent processing and coupled with databases or block storage for efficient storage of large-scale ontologies and ontological data. Ontological databases 3260 may also include vector databases which store data as high-dimensional vectors, enabling semantic search capabilities. This allows for more relevant results based on the meaning and context of the query rather than keyword matching. According to an embodiment, combining vector databases with LLMs facilitates more accurate retrieval of information, as the models can leverage the semantic embeddings to find contextually relevant content. In some embodiments, a hybrid search system may be implemented, wherein integrating traditional search databases ensures that both keyword-based and semantic search methods are employed, providing comprehensive search results that leverage the strengths of both approaches. In some embodiments, ontological databases 3260 may comprise knowledge graphs which represent information as nodes and edges, capturing relationships and hierarchies. This structured format enhances the ability to perform complex queries and derive insights from the data. Integrating symbolic representations with LLMs allows for logical reasoning over the knowledge graph, supporting more sophisticated query processing and inference.

According to the aspect, an automated index generator subsystem 3250 is present and configured utilize various indexing techniques to map gathered information to existing or new ontologies. For example, the subsystem may implement inverted indexing, which maps each term (word or phrase) to a list of ontology concepts and relationships in which it appears. This enables fast lookup of relevant ontological information based on search queries. As another example, the subsystem may leverage term frequency-inverse document frequency (TF-IDF) weighting to assign importance scores to terms within the ontology, prioritizing rare and informative terms over common ones. Additionally, or alternatively, the subsystem can apply semantic indexing techniques, such as latent semantic indexing (LSI) or word embeddings (e.g., Word2Vec, GloVe), to capture semantic similarities between terms and concepts in the ontology. According to an aspect, the subsystem can utilize graph indexing methods, such as adjacency lists or matrices, to efficiently represent and traverse the ontological structure during search and retrieval.

Automated index generator subsystem 3250 may be further configured to perform text normalization techniques, such as tokenization, stemming, and lemmatization, to standardize the representation of terms and concepts within the ontology. This may comprise applying named entity recognition and entity linking methods to identify and link mentions of named entities (e.g., people, organizations, locations) to their corresponding ontology concepts. According to an aspect, the subsystem uses synonym expansion and word sense disambiguation techniques to enhance the coverage and accuracy of the index by considering alternative terms and resolving ambiguities.

In some embodiments, system 3200 may implement a distributed indexing architecture using technologies like Apache Solr or Elasticsearch or AWS Opensearch to handle large-scale ontologies and enable efficient search and retrieval. This may involve, for example, utilizing sharding and replication techniques to distribute the index across multiple nodes, improving scalability and fault tolerance. The system can employ caching mechanisms, such as query result caching and term-level caching, to optimize search performance and reduce latency. Furthermore, the system can be configured to enable query processing and ranking.

This may comprise developing query parsing and understanding components to interpret user queries and match them against the indexed ontology concepts and relationships, and the implementation of query expansion techniques, such as query rewriting and query suggestion, to improve the recall and relevance of search results by considering synonyms, related concepts, and user intent. According to an embodiment, the system may apply ranking algorithms, such as BM25 or learning-to-rank models, to prioritize search results based on relevance scores computed from term frequencies, ontological relationships, and user feedback. For example, the system may implement user interfaces and APIs that allow users to interact with the search system, input queries, and receive ranked search results, and collect user feedback, such as click-through data and explicit ratings, to continuously improve the relevance and quality of search results. According to an aspect, the system may utilize machine learning techniques, such as reinforcement learning or online learning, to automatically adapt the ranking models based on user feedback and evolving search patterns.

According to an embodiment, automated index generator subsystem 3250 can integrate with the knowledge graph database 2129 to seamlessly update the index whenever new ontological information is added or modified, and leverage the model blending computing system 2125 to combine multiple indexing and ranking strategies, optimizing search performance across different domains and user preferences. According to an aspect, the system can utilize the composite knowledge graph database 2129 to store and manage the ontologies and semantic relationships extracted by the ontology and ontological data extraction system. According to an aspect, the subsystem utilizes context data and user profiles to personalize search results and provide context-aware recommendations based on user interests and search history.

By incorporating these technical enhancements and system/subsystem components, the ontology and ontological data extraction computing system 3200 can automatically create rich, comprehensive, and high-quality ontologies from diverse data sources. These ontologies can then be used to power advanced semantic search capabilities within the overall AI platform. The extracted ontologies can be seamlessly integrated with the existing components of the platform 2120, such as the knowledge graph database 2129, model blending computing system 2125, and context data, to enable sophisticated reasoning, personalized query understanding, and context-aware search results. Furthermore, the platform's continuous learning and feedback mechanisms can be leveraged to iteratively refine the ontologies based on user interactions, new data, and evolving domain knowledge. This ensures that the ontologies remain up-to-date, accurate, and aligned with the latest developments in various fields.

In some implementations, ontology extraction computing system 3200 may integrate it advanced AI techniques, including neurosymbolic methods and KANs, with enterprise resource planner (ERP) systems (e.g., SAP, Office 365, Google's Suite, etc.) to obtain enterprise-wide data. This integration can offer highly contextualized and actionable knowledge across various environments such as construction sites, offices, and movie sets. One approach to such an integration may comprise the steps of: integration with enterprise-wide data (e.g., data collection and processing comprising data extraction, data normalization, and data enrichment), multimodal data fusion and feature extraction (e.g., feature extraction and creating a unified representation), contextual analysis and scene understanding (e.g., scene graph generation, knowledge infusion), advanced reasoning and predictive analysis (e.g., rule-based inference via Datalog, neurosymbolic reasoning), and proactive contextual assistance (e.g., user profiles and contextual updates, predictive and proactive assistance, recommendations, etc.).

In an example scenario involving a construction site, the process may comprise: data integration wherein the system combines ERP data (inventory, safety records, etc.), Office 365 (inspection records, emails), and Google Suite (site plans, meeting schedules); contextual understanding wherein the system detects unsafe conditions using scene graphs, suggests safety measures, and provides real-time equipment status from ERP data; and proactive assistance wherein the system recommends safety checks, highlights overdue reports, and schedules inspections based on contextual analysis.

In an example scenario involving an office environment, the process may comprise: data integration wherein the system merges ERP data (project timelines, financials), Office 365 (emails, calendar events), and Google Suite (documents, spreadsheets); contextual understanding wherein the system analyzes meeting notes, project statuses, and financial reports to provide a comprehensive view of ongoing activities; and proactive assistance wherein the system suggests task prioritization, alert about upcoming deadlines, and provide financial insights based on integrated data.

In an example scenario involving a movie set, the process may comprise: data integration wherein the system incorporates ERP data (equipment rentals, budget tracking), Office 365 (scripts, production schedules), and Google Suite (storyboards, shot lists); contextual understanding wherein the system uses scene graphs to manage set logistics, monitor equipment usage, and track budget expenditures; and proactive assistance wherein the system recommends schedule adjustments, highlight potential budget overruns, and suggest resource allocation based on contextual data.

According to an embodiment, ontology extraction computing system 3200 may be configured to provide advanced AI-enabled planning services. Combining advanced AI techniques with planning services such as Monte Carlo Tree Search (MCTS) and Reinforcement Learning (RL) can significantly enhance the efficiency and effectiveness of managing user tasks, projects, and daily activities. AI-enabled planning services can leverage MCTS and RL to support advanced planning tasks. MCTS is a heuristic search algorithm for decision processes, which uses random sampling of the decision space to build a search tree. RL is a machine learning paradigm where an agent learns to make decisions by receiving rewards or penalties for its actions, optimizing its strategy over time. The AI-enabled planning service can integrate with enterprise data and user context to support advanced planning tasks. Data sources such as a user calendar may be access to extract events, deadlines, and meetings from Google Calendar, Office 365, or other scheduling tools. Additionally, the system can use data from project management tools like Monday.com to access Gantt charts and project timelines.

As an example of advanced AI-planning for project management, consider a scenario where a user has a complex project plan specified in a Monday.com Gantt chart and various meetings and deadlines in their calendar. An exemplary process may comprise the steps of: data extraction and preprocessing wherein the system extracts project timelines, task dependencies, deadlines from the Gantt chart, and calendar events and deadlines from the user's scheduling tool; utilizing MCTS combined with RL for scheduling wherein the system uses MCTS+RL to explore different sequences of tasks and meetings to optimize the project schedule, and then trains an RL agent to learn the best scheduling strategies based on historical data, user preferences, and project requirements (another paradigmatic variant would be UCT (Upper Confidence bounds applied to Trees); performs dynamic adjustment wherein the system continuously updates the schedule as new tasks are added, deadlines change, or meetings are rescheduled, and provides real-time recommendations to the user for task prioritization and rescheduling to optimize productivity and project completion.

As another example of utilizing action notation modeling language (ANML) for human-robot shared action planning, consider a scenario where a personal robot assists the user in running errands, driving their car, unloading groceries, and cleaning the house. An exemplary process may comprise the steps of: defining tasks and actions using ANML, specifying preconditions, effects, and dependencies for each action; decomposing complex tasks into subtasks using Hierarchical Task Networks (HTNs), creating a hierarchy of actions to achieve the user's goals, and planning actions in a sequence that respects dependencies and optimizes efficiency; using MCTS or UCT to explore different sequences of robot and human actions, building a search tree to determine system states and map transition probabilities and state desirability and determine policies most likely to result in the optimal plan, and then training an RL agent to learn the best strategies for coordinating human-robot interactions, optimizing task execution based on feedback and rewards; and continuously updating the plan as new tasks are added or user preferences change, and providing real-time suggestions to the user for task prioritization and coordination with the robot.

An example task plan for the robot may comprise the following. Running errands: robot checks the car's readiness and loads the groceries; user drives to the grocery store while the robot assists with navigation; and robot helps unload the groceries at home. Cleaning the house: robot starts vacuuming while the user organizes clutter; and robot and user coordinate to clean different rooms sequentially. Driving the car: robot assists with navigation and monitoring traffic conditions; and user focuses on driving while the robot provides real-time alerts and suggestions.

A detailed example of ANML commands for the robot scenario are as follows:

```
- Drive Car:
  ‴anml
  action drive_car(user, car) {
      precondition: user.inside(car) & car.ready( );
      effect: user.at(destination);
  }
  ‴
- Load Groceries:
  ‴anml
  action load_groceries(robot, car, groceries) {
      precondition: groceries.at(store) & car.at(store) & robot.at(store);
      effect: groceries.in(car);
  }
  ‴
- Clean House:
  ‴anml
  action clean_house(user, robot, house) {
      precondition: user.at(house) & robot.at(house);
      effect: house.clean( );
  }
  ‴
HTNs for Task Decomposition:
```

-continued

```
- Run Errands:
  ```htn
  task run_errands(user, robot, car, groceries, store, home) {
      subtasks: [
          load_groceries(robot, car, groceries),
          drive_car(user, car),
          unload_groceries(user, robot, car, groceries, home)
      ];
  }
  ```…

- Daily Routine:
  ```htn
  task daily_routine(user, robot, car, house, groceries, store, home) {
      subtasks: [
          run_errands(user, robot, car, groceries, store, home),
          clean_house(user, robot, house)
      ];
  }
  ```…
```

By combining advanced AI techniques such as MCTS and RL with enterprise-wide data and ANML for human-robot shared action planning, the systems and platforms described herein can offer highly contextualized and optimized solutions for various environments like construction sites, offices, and movie sets. This approach ensures that tasks are efficiently scheduled and executed, enhancing user productivity, safety, and goal achievement. The integration of neurosymbolic reasoning and dynamic contextual updates provides a robust and explainable AI framework tailored to specific user needs.

Figure 33:
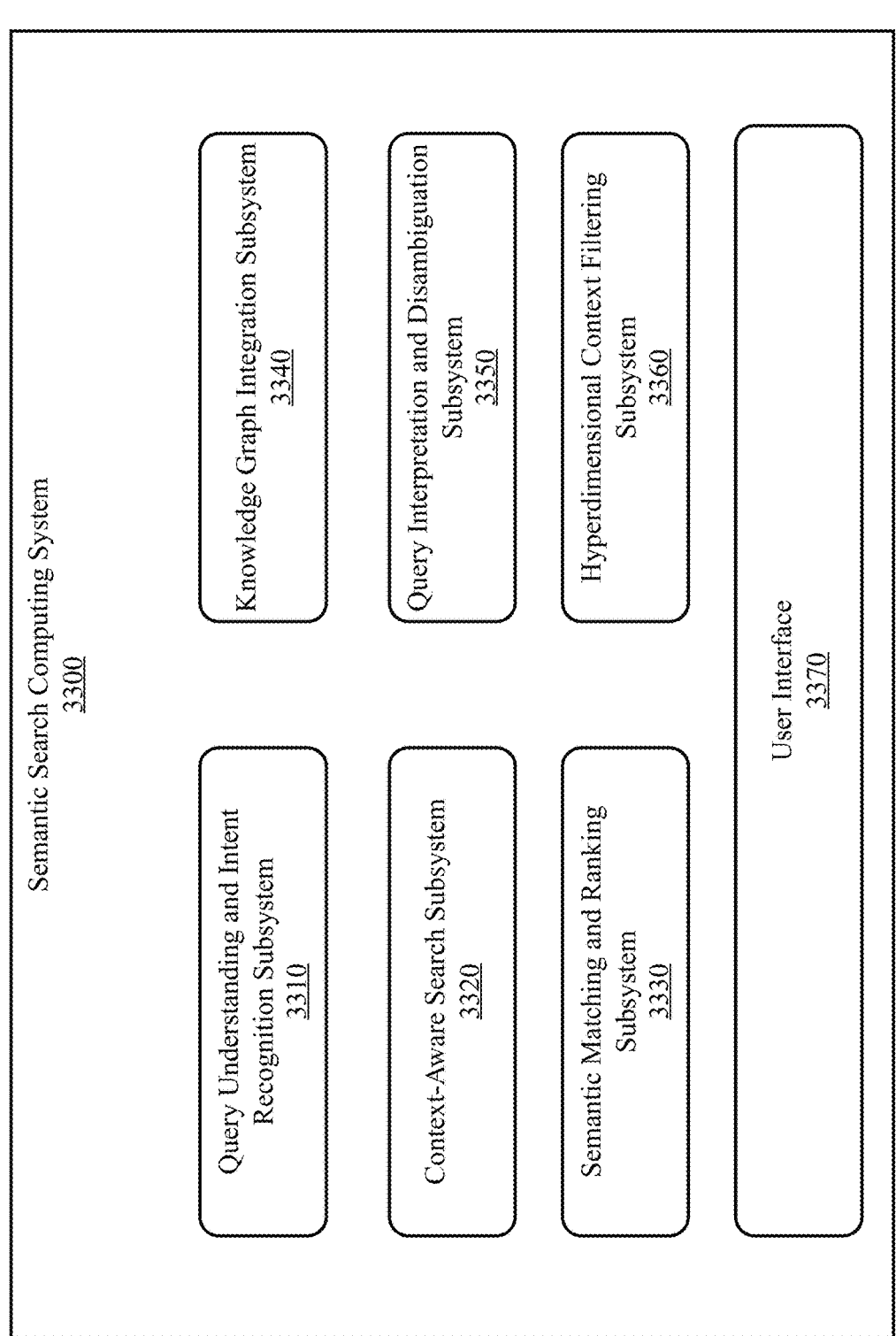
FIG. 33 is a block diagram illustrating an exemplary aspect of a distributed, composite symbolic and non-symbolic AI platform for advanced reasoning, a semantic search computing system.

FIG. 33 is a block diagram illustrating an exemplary aspect of a distributed, composite symbolic and non-symbolic AI platform for advanced reasoning 2120, a semantic search computing system. According to the aspect, the semantic search computing system 3300 is configured to provide functionality directed to an enhanced semantic search engine.

According to the aspect, a query understanding and intent recognition subsystem 3310 is present and configured to implement various techniques and mechanisms to capture the intent associated with a received query. Queries may be received from a user interface 3370 or via integrated other systems or services. For example, the subsystem may implement NLP techniques, such as named entity recognition, part-of-speech tagging, and dependency parsing, to analyze and understand the structure and semantics of user queries. According to an aspect, the subsystem may further utilize machine learning models, such as deep learning architectures (e.g., recurrent neural networks, transformers), to capture the intent behind user queries and map them to relevant ontological concepts and relationships. Additionally, or alternatively, the subsystem can employ query expansion techniques, such as synonym expansion and query rewriting, to enhance the coverage and flexibility of query understanding by considering alternative phrasings and related terms.

According to the aspect, a context-aware search subsystem 3320 is present and configured to integrate with the search engine with the platform's context data, including user profiles, search history, and real-time user behavior, to personalize and refine search results based on individual user preferences and context. This may comprise the implementation of context-aware ranking algorithms, such as collaborative filtering or matrix factorization, to prioritize search results that are most relevant to the user's current context and interests. In at least one embodiment, the subsystem may use machine learning techniques, such as reinforcement learning or multi-armed bandits, to continuously adapt and optimize the search experience based on user feedback and evolving contextual signals.

According to the aspect, a semantic matching and ranking subsystem 3330 is present. The platform may leverage developed semantic matching algorithms that go beyond keyword-based matching and consider the semantic relatedness between query terms and ontology concepts/relationships. Semantic similarity measures, such as, for example, cosine similarity or semantic distance metrics (e.g., WordNet-based measures) may be implemented, to quantify the relevance of ontological information to user queries. In some implementations, the subsystem can apply learning-to-rank techniques, such as pointwise, pairwise, or listwise approaches, to train ranking models that optimize the ordering of search results based on relevance judgments and user feedback.

A knowledge graph integration subsystem 3340 may be used to integrate the semantic search computing system 3300 with the knowledge graph database 2129 to leverage the rich semantic information captured in the ontologies and enable complex querying and reasoning capabilities. For example, the implementation of graph traversal algorithms, such as breadth-first search or depth-first search, can be used to efficiently explore and retrieve relevant subgraphs from the knowledge graph based on user queries. Additionally, or alternatively, the subsystem can utilize graph embedding techniques, such as TransE or GraphSAGE, to learn low-dimensional vector representations of ontology concepts and relationships, enabling efficient similarity computations and semantic search. The subsystem can implement graph-based reasoning algorithms, such as path ranking algorithm (PRA) or graph convolutional networks (GCNs), to discover implicit relationships and infer new knowledge based on the existing ontological structure. According to an embodiment, the subsystem utilizes rule-based reasoning engines, such as Apache Jena or RDFox, to apply domain-specific rules and constraints to the knowledge graph, enabling logical inference and consistency checking. Additionally, or alternatively, the subsystem may incorporate natural language inference (NLI) models, such as BERT or RoBERTa, to assess the semantic relatedness and entailment between query terms and knowledge graph statements, enhancing the relevance and coverage of search results.

According to the aspect, a query interpretation and disambiguation subsystem 3350 is present and configured to employ word sense disambiguation (WSD) techniques, such as knowledge-based or supervised machine learning approaches, to resolve ambiguities in user queries and map query terms to their intended meanings within the ontology. This process may utilize entity linking methods to identify and link named entities mentioned in user queries to their corresponding ontology concepts, enabling more precise and targeted search results. According to an embodiment, the subsystem implements query interpretation models, such as slot filling or semantic parsing, to extract structured information from user queries and map them to ontological predicates and arguments.

The user interface 3370 is designed in an intuitive manner that allow users to input queries, refine search parameters, and interact with search results in a user-friendly manner. This may comprise the implementation of result summarization and highlighting techniques to present search results in a concise and informative way, emphasizing the most relevant ontological information and relationships. Furthermore, the user interface 3370 can provide faceted search and filtering options to allow users to narrow down search results based on specific ontological attributes, concepts, or relationships. In some implementations, graph traversal algorithms, such as breadth-first search (BFS) or depth-first search (DFS), are used to efficiently navigate and retrieve relevant subgraphs from the knowledge graph based on user queries. Parameterization of graph traversal options remain an example of how DFS vs BFS or other elements may be tweaked for a given query to maximize system performance or profitability. The system may incorporate context data, such as user profiles, search history, and real-time user behavior, to personalize and refine the semantic matching process associated with a user query. For example, the system can use context-aware semantic similarity measures that consider user preferences, domain expertise, and current search context when computing the relevance between query terms and knowledge graph entities/relationships. In at least one embodiment, the user interface 3370 may implement knowledge graph visualization techniques, such as node-link diagrams or hierarchical layouts, to provide interactive exploration and navigation of search results within the ontological structure, and develop natural language generation (NLG) models, such as sequence-to-sequence models or template-based approaches or LLMs, to generate human-readable summaries or explanations of search results based on the knowledge graph information.

According to the aspect, a hyperdimensional context filtering subsystem 3360 is present and configured to use hyperdimensional computing techniques to enhance the efficiency and abstractness of semantic search reasoning. This may comprise representing the knowledge graphs, ontologies, and contextual information as high-dimensional vectors (e.g., using techniques like Random Indexing or Holographic Reduced Representations). The platform can leverage algorithms for hyperdimensional context filtering, allowing the system to reason over the high-dimensional vector space and identify relevant patterns, relationships, and constraints. In an embodiment, the platform may implement specialized hardware accelerators, such as custom chips, ASICs, or FPGAs, to optimize the performance of hyperdimensional computing operations and enable real-time context filtering and similarity matching.

Semantic search computing system 3300 can leverage model blending computing system 2125 of the platform 2120 to combine multiple models for better prediction of user intent from queries. This may comprise the development of multiple intent classification models using different machine learning algorithms, such as logistic regression, support vector machines (SVM), or deep learning architectures (e.g., convolutional neural networks, recurrent neural networks). For example, the platform 2120 can train these models on labeled query-intent pairs, where each query is annotated with its corresponding user intent (e.g., informational, navigational, transactional, etc.), and utilize diverse feature sets for each model, such as bag-of-words, TF-IDF, word embeddings (e.g., Word2Vec, GloVe), or contextual embeddings (e.g., BERT, ELMo).

Various query expansion models may be developed as well. Various query expansion models may be implemented to generate alternative phrasings and related terms for the original user query. This may be accomplished via techniques such as synonym expansion using thesauri or word embeddings, probabilistic query expansion using co-occurrence statistics, or semantic query expansion using knowledge graphs. For example, the platform 2120 can train separate models for each query expansion approach, allowing semantic search computing system 3300 to capture different aspects of query understanding.

Additionally, the platform 2120 may develop multiple semantic matching models that measure the semantic similarity between the user query and ontological concepts/relationships. This may comprise the use of different similarity measures, such as cosine similarity, Jaccard similarity, or semantic distance metrics (e.g., path-based, information content-based). For example, the platform 2120 can train these models on labeled query-concept pairs or query-relationship pairs, where each pair is assigned a relevance score indicating the semantic relatedness.

The platform can implement various model blending techniques to combine the predictions from different intent classification, query expansion, and semantic matching models. As an example, the use of weighted averaging, where each model's prediction is assigned a weight based on its performance or domain expertise. The final intent prediction may be obtained by taking the weighted average of individual model predictions. As another example, the platform can employ stacking or meta-learning approaches, where a higher-level model (e.g., logistic regression, random forest) is trained to learn the optimal combination of base model predictions. Additionally, or alternatively, the system can utilize ensemble methods, such as bagging or boosting, to create multiple instances of each model and combine their predictions through voting or averaging. The platform can continuously evaluate the performance of individual models and blending strategies using evaluation metrics such as precision, recall, F1-score, or normalized discounted cumulative gain (NDCG). Model selection techniques, such as cross-validation or Bayesian optimization, may be used to identify the best-performing models or blending strategies for different query types or domains. In some implementations, the system can leverage online learning or incremental learning approaches to adapt the models in real-time based on user feedback and evolving search patterns.

According to an aspect, the system may incorporate user context information, such as user profile, search history, or real-time user behavior, into the model blending process to facilitate context-aware model blending. The platform 2120 can develop context-aware blending strategies that dynamically adjust the weights or contributions of individual models based on the user's current context and preferences. This process may utilize reinforcement learning techniques to learn the optimal blending strategy for each user or user segment, considering their specific characteristics and search behaviors.

By blending multiple models for intent classification, query expansion, and semantic matching, semantic search computing system 3300 can leverage the strengths of each model and capture different aspects of user intent understanding. The model blending process allows for the combination of predictions from diverse models, resulting in more accurate and comprehensive intent predictions.

According to some embodiments, the semantic search functionality can be integrated into the platform's overall reasoning and decision-making workflows orchestrated by the hierarchical process manager 2121 and DCG computing system 121. With respect to workflow integration, the system may define specific tasks or stages within the reasoning and decision-making workflows where semantic search functionality can be leveraged to retrieve relevant information or support decision-making processes. For example, the integration of semantic search API endpoints or service calls into the workflow definition files or configuration settings managed by hierarchical process manager 2121 and the establishment of data flow and communication channels between the semantic search computing system 3200 and other workflow components, such as data preprocessing modules, machine learning models, or visualization tools. With respect to data query generation and refinement, the system can implement query generation subsystems that automatically formulate search queries based on the current context, user input, or predefined templates associated with specific workflow tasks. This process may utilize NLP techniques, such as named entity recognition, part-of-speech tagging, or dependency parsing, to extract key entities, relationships, and constraints from user input or task specifications and apply query refinement techniques, such as query expansion, query reformulation, or query relaxation, to enhance the initial queries and improve the relevance and coverage of search results.

With respect to search result integration and fusion, the system can leverage data integration subsystems that consume the semantic search results and align them with the data formats and structures required by downstream workflow components. Furthermore, the system may implement data fusion techniques, such as entity resolution, data deduplication, or schema matching, to merge and reconcile search results from multiple sources or iterations. The system can apply data quality assessment and cleansing techniques to ensure the consistency, accuracy, and completeness of the integrated search results before passing them to subsequent workflow stages.

According to some embodiments, semantic search computing system 3300 may utilize distributed computing frameworks, such as Apache Spark or Elasticsearch, to scale the semantic search engine and handle large-scale ontologies and high query volumes. This may involve the implementation of caching mechanisms, such as query result caching and ontology caching, to improve search performance and reduce latency, and employing indexing techniques, such as inverted indices and graph indices, to enable fast retrieval of relevant ontological information during the search process.

By incorporating these technical components and system/subsystem enhancements, a powerful semantic search engine can be added to the platform, leveraging the ontologies generated by the ontology extraction system 3200 and the indices created by the automated index generator 3250. The semantic search computing system 3300 combines advanced NLP techniques, machine learning models, and semantic matching algorithms to understand user queries, capture their intent, and retrieve the most relevant ontological information. It integrates with the platform's context data and knowledge graph to provide personalized and context-aware search results. Query interpretation and disambiguation mechanisms ensure that user queries are accurately mapped to ontological concepts and relationships, while scalability and performance optimizations enable efficient search over large-scale ontologies. By seamlessly integrating the semantic search computing system with other platform components, such as the knowledge graph database and model blending capabilities, the platform can provide a comprehensive and intelligent search experience that goes beyond traditional keyword-based search.

Figure 34:
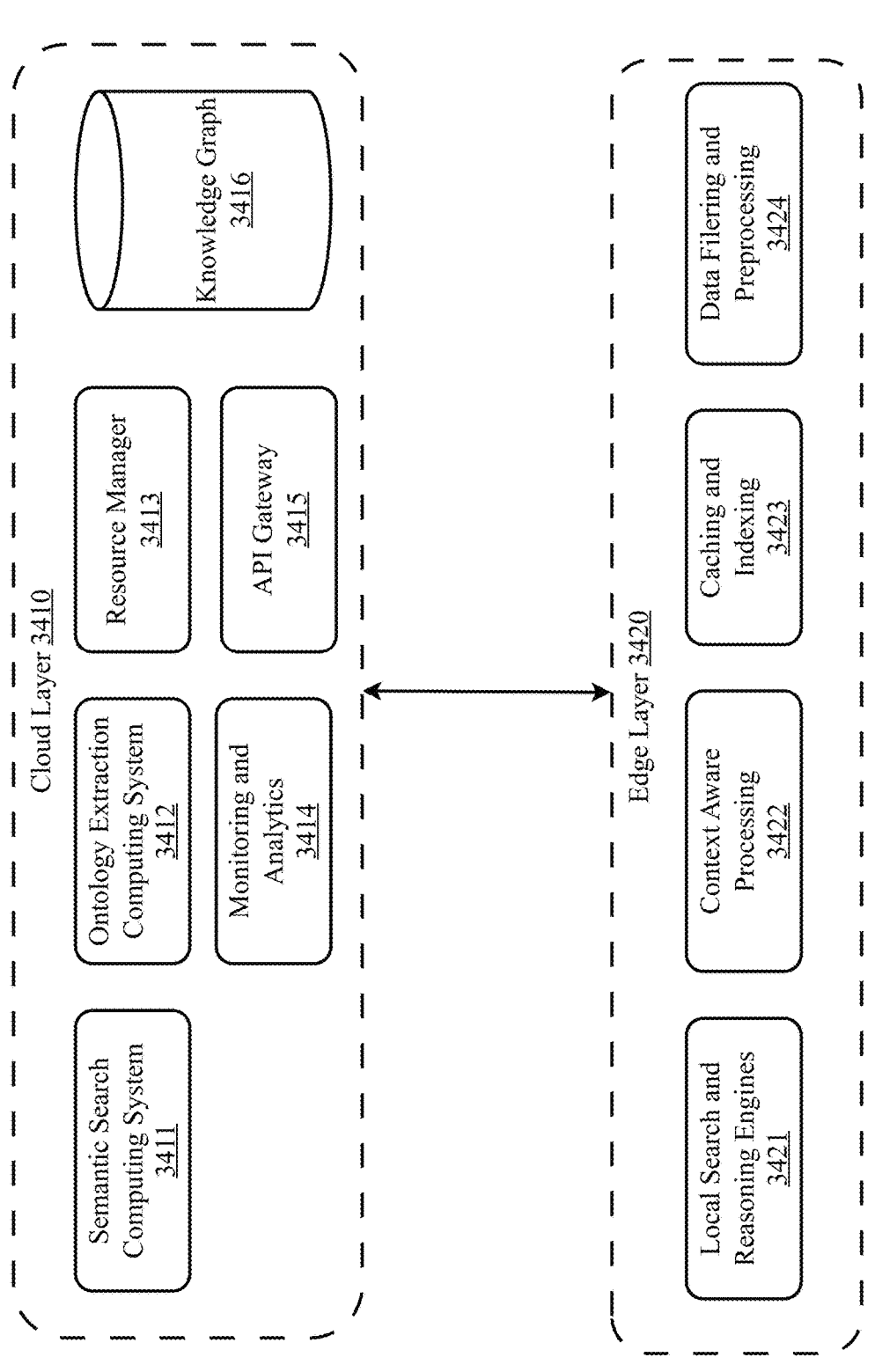
FIG. 34 is a block diagram illustrating an exemplary hierarchical architecture that leverages both cloud and edge resources for semantic search and reasoning tasks, according to an embodiment.

FIG. 34 is a block diagram illustrating an exemplary hierarchical architecture that leverages both cloud and edge resources for semantic search and reasoning tasks, according to an embodiment. The architecture may comprise multiple layers, each with specific components and responsibilities, to enable efficient distribution and coordination of tasks between the cloud and edge devices. By designing a hierarchical architecture that leverages both cloud and edge resources, the semantic search and reasoning system can achieve better performance, scalability, and user experience.

The cloud layer provides centralized management, coordination, and storage of the knowledge graph and ontologies, while the edge layer enables localized and context-aware processing, reducing latency and improving responsiveness.

As shown, the hierarchical embodiment comprises a cloud layer 3410 which hosts a central semantic search computing system 3411, also referred to herein as a semantic search engine, which receives search queries, performs complex query processing, and coordinates the search and reasoning tasks across the edge devices. The cloud layer also maintains a master copy of the knowledge graph database 3416, which serves as the central repository for all the ontologies, entities, relationships, and metadata. The cloud includes an ontology management system 3412 that allows for the creation, editing, versioning, and governance of ontologies used in the semantic search and reasoning processes. According to the embodiment, the cloud implements a resource manager 3413 that monitors the available resources, workload distribution, and performance of the edge devices, and dynamically allocates tasks based on the capabilities and constraints of each device. The cloud layer ensures data synchronization and replication mechanisms to keep the knowledge graph and ontologies consistent and up-to-date across the edge devices.

An API gateway 3415 is present and configured to act as the entry point for search queries and facilitates the communication and coordination between the cloud and edge layers, routing requests and responses based on the defined protocols and interfaces. A message queue system, such as Apache Kafka or RabbitMQ, enables asynchronous communication and task coordination between the cloud and edge devices, allowing for efficient distribution and load balancing of search and reasoning tasks. The architecture incorporates data compression and encryption techniques to optimize the data transfer between the cloud and edge devices, ensuring secure and efficient communication.

As shown in the embodiment, the architecture includes performance monitoring and analytics systems 3414 that collect and analyze metrics related to search and reasoning tasks, such as response times, resource utilization, and user satisfaction, to identify bottlenecks and optimize the system's performance. The architecture may incorporate usage analytics systems that track and analyze user behavior, search patterns, and feedback to gain insights into user preferences, improve search relevance, and personalize the search experience. According to some implementations, the architecture employs anomaly detection mechanisms to identify and flag unusual or suspicious activities, such as malicious queries or data inconsistencies, to maintain the integrity and security of the system.

As shown, an edge layer 3420 is present and may comprise a plurality of edge devices. Each edge device (e.g., smart phones, IoT devices, smart wearables, on-premise servers, etc.) hosts local search and reasoning systems 3421 that can perform search and reasoning tasks on a subset of the knowledge graph and ontologies relevant to the device's context and user preferences. The edge devices may implement context-aware query processing systems 3422 that can understand and adapt to the user's context, such as location, device capabilities, and network connectivity, to optimize the search and reasoning tasks. The edge devices may further employ caching and indexing mechanisms 3423 to store frequently accessed or locally relevant subsets of the knowledge graph and ontologies, enabling faster access and reduced network latency. The edge devices can perform data filtering and preprocessing task 3424 to reduce the amount of data transmitted to the cloud, by identifying and extracting relevant information based on the user's context and search requirements.

According to an embodiment, the hierarchical architecture supports auto-scaling mechanisms, both in the cloud and edge layers, to dynamically adjust the resources based on the workload demands and ensure optimal performance and cost-efficiency. The architecture can incorporate fault tolerance techniques, such as replication, failover, and data backup, to ensure the system remains operational and recovers quickly from failures or disruptions. Furthermore, the illustrated architecture implements load balancing mechanisms to distribute the search and reasoning tasks evenly across multiple cloud and edge resources, preventing overload and ensuring optimal resource utilization.

Detailed Description of Exemplary Aspects

FIG. 24 is a flow diagram illustrating an exemplary method 2400 for routing processing based on certainty threshold and/or challenge-based verification, according to an embodiment. According to the embodiment, the process begins at step 2401 by defining a hierarchy of reasoning tasks and subtasks that break down decision-making processes into manageable steps. Examples of reasoning tasks could include "Gather relevant information," "Analyze data," "Generate potential solutions," "Evaluate alternatives," and "Select the best option." For each identified reasoning task, break it down further into smaller, more manageable subtasks. For example, the reasoning task "Gather relevant information" could be decomposed into subtasks such as "Identify information sources," "Extract relevant data," "Preprocess and clean data," and "Integrate data from multiple sources. Determine which tasks or subtasks need to be completed before others can be started (prerequisites) and establish the flow of information and outputs between tasks and subtasks, specifying how the results of one task feed into the inputs of another. This can be orchestrated by the DCG computing system. For each subtask, assign the appropriate AI models, algorithms, or knowledge sources that will be used to perform the required processing. This could include machine learning models, rule-based systems, knowledge bases, or external APIs.

At step 2402 platform 2120 orchestrates the execution of these tasks and routes data to the appropriate models or knowledge sources based on predefined rules or learned policies. Platform 2120 or an administrator can set certainty thresholds for each task to determine when the system should proceed to the next step or seek additional information/verification at step 2403. Certainty thresholds can be predetermined levels of confidence or probability that an AI system uses to make decisions or trigger specific actions. As a last step 2404, the platform may use challenge-based verification mechanisms to test the robustness and reliability of a given AI system's decisions by subjecting the system to various challenges or adversarial scenarios. These mechanisms help identify potential weaknesses, biases, or failure points in the decision-making process. Some examples of challenge-based verification mechanisms can include, adversarial examples, edge case testing, counterfactual reasoning, stress testing, robustness to noise and outliers, and fairness and bias testing, to name a few.

Adversarial examples are carefully crafted inputs that are designed to fool or mislead the AI system into making incorrect predictions or decisions. For example, in an image classification system, an adversarial example could be an image that has been slightly perturbed or modified in a way that is imperceptible to humans but causes the system to misclassify the image. By testing the system's performance on a range of adversarial examples, platform 2120 can assess its robustness against manipulated or deceptive inputs.

Edge case testing involves evaluating the system's performance on rare, extreme, or unusual scenarios that may not be well-represented in the training data. For example, in a self-driving car system, an edge case could be a scenario where a pedestrian suddenly appears from behind a parked vehicle or a situation with complex road construction and detours. By subjecting the system to a variety of edge cases, platform 2120 can assess its ability to handle unexpected or challenging situations gracefully.

Counterfactual reasoning involves analyzing how the system's decisions would change if certain input features or conditions were different. As an example, in a loan approval system, counterfactual reasoning could involve examining how the system's decision would differ if an applicant's income or credit score were slightly modified. By exploring counterfactual scenarios, platform 2120 can identify the sensitivity of the system's decisions to specific input features and ensure that the decisions remain consistent and fair.

Robustness to noise and outliers tests the system's resilience to noisy or outlier data points that may be present in real-world scenarios. As an example, in a sentiment analysis system, robustness testing could involve evaluating the system's performance on reviews with spelling errors, grammatical mistakes, or unconventional language patterns. By assessing the system's performance on noisy and outlier data, platform 2120 can ensure that it remains reliable and accurate in the presence of imperfect or unexpected inputs.

Fairness and bias testing aim to identify and mitigate any biases or discriminatory behavior in the system's decision-making process. For example, in a hiring recommendation system, fairness testing could involve analyzing the system's predictions for any systematic biases based on protected attributes such as gender, race, or age. By conducting fairness and bias tests, you can ensure that the system's decisions are equitable and do not perpetuate or amplify societal biases.

These challenge-based verification mechanisms help assess the robustness, reliability, fairness, and transparency of an AI system's decisions. By subjecting the system to various challenges and adversarial scenarios, platform 2120 can identify potential weaknesses, biases, or failure modes and take appropriate measures to mitigate them. It's important to note that the specific challenges and verification mechanisms used will depend on the domain, the nature of the AI system, and the potential consequences of its decisions. A comprehensive verification strategy should encompass a diverse set of challenges to thoroughly test the system's performance and ensure its reliability in real-world deployment.

FIG. 25 is a flow diagram illustrating an exemplary method 2500 for retrieving relevant contextual data from a knowledge graph database and enriching vector embeddings with the contextual data, according to an embodiment. According to an aspect of an embodiment, this process may be conducted by embedding refinement computing system 2122. According to the embodiment, the process begins at step 2501 when platform 2120 queries a knowledge graph to retrieve symbolic information comprising relevant facts, entities, and relationships based on input data and the current reasoning context. At step 2502, the retrieved knowledge is used to refine vector embeddings generated by neural network models, incorporating symbolic information into the distributed representations (i.e., embeddings). As a last step 2503, the platform 2120 can implement techniques to effectively combine the embeddings with the knowledge graph data. One or more techniques may be used to combine the embeddings and the symbolic information. A first technique may leverage knowledge graph embedding alignment wherein platform 2120 generates vector embeddings for the entities and relationships in the knowledge graph using techniques such as TransE, TransR, or DistMult, for example, and aligning the vector embeddings generated by the neural network models with the knowledge graph embeddings using techniques such as embedding space transformation or joint embedding learning. Then the platform can update the neural network embeddings by incorporating the aligned knowledge graph embeddings, allowing the symbolic information to influence the distributed representations.

Another approach may utilize attention mechanisms to compute the relevance or importance of the retrieved knowledge for each input instance and then modify the neural network architecture to incorporate attention layers that take the retrieved knowledge as additional input. During the attention computation, higher weights may be assigned to the retrieved knowledge that is most relevant to the current input and task. Platform can update the vector embeddings generated by the neural network models by incorporating the attention-weighted knowledge representations.

Another technique may leverage knowledge-aware language models wherein the language model architecture is modified to incorporate knowledge-aware layers or components and the retrieved knowledge is injected into the language model during the encoding or decoding process. For example, platform 2120 can use techniques like knowledge-aware self-attention, where the attention computation is conditioned on the retrieved knowledge. Additional techniques can include the use of graph convolutional networks, and/or knowledge distillation.

It's important to note that the retrieved knowledge should be relevant and complementary to the input data and the task at hand. The symbolic information should provide additional context or constraints that can guide the refinement of the vector embeddings and improve the overall performance of the AI system.

FIG. 26 is a flow diagram illustrating an exemplary method 2600 for applying expressive weighting schemes to model combinations, according to an embodiment. According to an aspect of an embodiment, the process may be performed by model blending computing system 2125. According to the embodiment, the process begins at step 2601 by combining the outputs of multiple neural network models based on their individual strengths and weaknesses. This can include, for example, combining the output of two or more expert models within a larger model. At step 2602 weighting schemes dynamically adjust the contribution of each model based on factors such as uncertainty, task complexity, and domain relevance. As a last step 2603, platform 2120 may implement techniques like Bayesian model averaging, mixture of experts, and/or ensemble learning to optimally blend model outputs. When combining the outputs of multiple neural network models based on their individual strengths and weaknesses, and developing weighting schemes to dynamically adjust the contribution of each model, the goal is to create an ensemble of models that can leverage the diverse capabilities of each individual model to improve overall performance and robustness.

Multiple neural network models, each trained on the same task or dataset, can have different strengths and weaknesses.

Some models may excel at capturing certain patterns or features, while others may be more robust to noise or better at handling specific types of inputs. By combining the outputs of these models, platform 2120 can harness their complementary strengths and mitigate their individual weaknesses. Common approaches for combining model outputs include (but are not limited to) averaging (e.g., taking the average of the outputs from all models), voting (e.g., assigning the final output based on the majority vote of the model), and weighted averaging (e.g., assigning different weights to the outputs of each model based on their perceived importance or performance).

Weighting schemes determine how much influence each individual model has on the final combined output. Instead of using fixed weights, platform 2120 can develop dynamic weighting schemes that adjust the contribution of each model based on various factors. A first such factor is uncertainty wherein models that exhibit higher uncertainty or lower confidence in their predictions can be given lower weights, while models with higher confidence can have higher weights. Another factor is task complexity wherein for tasks with varying levels of complexity, the platform can assign higher weights to models that specialize in handling specific types of complexity. A domain relevance factor determines if the input data belongs to different domains or categories, wherein the platform can assign higher weights to models that are more relevant or perform better in that particular domain.

Combining the outputs of multiple models and dynamically adjusting their contributions based on relevant factors allows for more robust, accurate, and adaptable AI systems. By leveraging the strengths of different models and adapting to the characteristics of the input data, the ensemble can provide improved performance and handle a wider range of scenarios compared to individual models.

FIG. 27 is a flow diagram illustrating an exemplary method 2700 for using feedback loops considering security, licensing, provenance, and collaborative development, according to an embodiment. According to the embodiment, the process begins at step 2701 by implementing secure communication protocols and access control mechanisms to protect sensitive data and prevent unauthorized access. Platform 2120 may be configured to ensure compliance with licensing terms and conditions of datasets, models, and tools used therein at step 2702. For example, platform 2120 may use governance frameworks and policies that define the roles, responsibilities, and processes for collaborative AI development and implement compliance checks and validation processes to ensure adherence to legal, ethical, and regulatory requirements. Furthermore, the platform can record the lineage of data, models, and decisions made by the various AI systems through the lifecycle of said systems at step 2703. As a last step 2704, the platform may create and use collaborative development tools and workflows that allow multiple teams or organizations to jointly develop, test, and deploy AI models while maintaining security and provenance.

To perform data lineage tracking, platform 2120 can leverage a data versioning and tracking system that captures the source, transformations, and dependencies of the data used for training and inference. This may involve the use of metadata standards and schemas to describe properties, origins, and relationships of the data. Platform may maintain a historical record of data updates, modifications, and deletions to ensure traceability, as well as utilize data cataloging and discovery tools to facilitate easy searching and understanding of the data lineage.

To perform model lineage tracking platform 2120 can establish a model versioning and tracking system that captures the evolution of the AI models throughout their life-cycle. This may involve recording information such as model architectures, hyperparameters, training configurations, and performance metrics for each version of the model. Platform can maintain a repository of model artifacts, including trained weights, configuration files, and associated documentation to track the dependencies between models, including any transfer learning or fine-tuning relationships.

To perform decision lineage tracking platform 2120 can implement a decision tracking system that captures the inputs, outputs, and intermediate steps involved in each decision made by an AI system. This may involve recording the specific model versions, data inputs, and any external factors that influenced each decision and maintaining a log of decision outcomes, along with their associated confidence scores or uncertainty measures. This may further comprise a mechanism to link decisions back to the corresponding models and data used for inference. In some implementations, the platform may leverage auditing and reporting capabilities to analyze decision patterns, identify anomalies, and support accountability.

Collaborative development tools can include version control systems (e.g., Git) to manage the codebase, models, and configurations collaboratively. Platform 2120 can use access control mechanisms to ensure that only authorized individuals or teams can contribute to the development process and establish code review workflows and pull request processes to maintain code quality and security standards. In some implementations, the platform may leverage federated learning techniques to enable collaborative model training without directly sharing raw data.

FIG. 28 is a flow diagram illustrating an exemplary method 2800 for multi-modal alignment for consistent representations across data types, according to an embodiment. According to an aspect of an embodiment, the process may be performed by multi-modal alignment computing system 2123. According to the embodiment, the process begins at step 2801 when platform 2120 aligns and synchronizes representations across different data modalities (e.g., text, images, audio, smell, etc.) to create a unified and consistent representation of input data. At step 2802 one or more techniques such as cross-modal attention, multi-modal fusion, and/or joint embedding spaces are used to combine information from different modalities. At step 2803 the platform uses domain-specific knowledge (e.g., knowledge graph) to ensure the generated representations (embeddings) are consistent and realistic across modalities.

Multimodal embedding space alignment is performed by learning a shared embedding space where representations from different modalities can be projected and aligned. This may utilize techniques like canonical correlation analysis (CCA) or adversarial learning to map the representations from each modality into a common space. Platform may then train the embedding space alignment model using paired or aligned data from different modalities. Once the alignment model is trained, it can be used to project the representations from each modality into the shared space, creating a unified representation.

Cross-modal attention mechanisms utilize attention mechanisms to attend to relevant information from one modality based on the representations from another modality. For example, in a visual-textual alignment task, use the textual representations to guide the attention over the visual features, or vice versa. Platform can train the attention mechanism to learn the cross-modal dependencies and alignments wherein the attended representations from different modalities can be combined or fused to create a unified representation.

In some implementations, the platform can train a joint embedding model that learns to map the representations from different modalities into a shared embedding space. This may involve the use of techniques like contrastive loss or triplet loss to bring the representations of aligned or similar instances from different modalities closer together in the embedding space.

Figure 29:
FIG. 29 is a flow diagram illustrating an exemplary method for hyperparameter optimization using information-theoretic guidance, according to an embodiment.

FIG. 29 is a flow diagram illustrating an exemplary method 2900 for hyperparameter optimization using information-theoretic guidance, according to an embodiment. According to an aspect of an embodiment, this process may be performed by hyperparameter optimization computing system 2126. According to the embodiment, the process begins at step 2901 with the implementation of a hyperparameter optimization framework which searches for the best combination of model architectures, training settings, and embedding techniques. Developing such a framework may begin by defining the hyperparameter search space. This can include identifying the hyperparameters to optimize, such as model architectures, learning rates, batch sizes, embedding dimensions, etc., and specifying the range or possible values for each hyperparameter, defining the search space. This may further involve using appropriate data types and ranges for each hyperparameter (e.g., categorical variables for model architectures, continuous variables for learning rates). Some exemplary hyperparameter optimization algorithms which may be implemented can include, but are not limited to, gird search, random search, Bayesian optimization, and evolutionary algorithms. Platform may create an optimization loop that iteratively generates hyperparameter configurations, evaluates them using the objective function, and updates the search process based on the results. For grid search or random search, the platform can generate all the configurations upfront and evaluate them in parallel or sequentially. For Bayesian optimization or evolutionary algorithms, the platform may need to implement the specific update rules and sampling strategies based on the chosen algorithm.

At step 2902 information-theoretic measures are incorporated into the hyperparameter optimization to guide the optimization process and select hyperparameters that maximize the information content and generalization ability of learned representations. Information content refers to the amount of meaningful or relevant information captured by the learned representations (embeddings). Representations with high information content are able to capture and encode the salient features, patterns, and relationships present in the input data. Maximizing the information content ensures that the learned representations are rich, expressive, and informative. Representations with good generalization ability can effectively capture the underlying patterns and structures in the data, rather than merely memorizing the training examples. Maximizing the generalization ability ensures that the learned representations are robust, transferable, and applicable to a wide range of tasks and datasets.

Information-theoretic measures quantify the information content and relationships between variables or representations. Common information-theoretic measures, which may be implemented in various aspects of platform 2120, can include: Shannon entropy which measures the average amount of information contained in a random variable or representation; mutual information which quantifies the amount of information shared between two variables or representations; or Kullback-Leibler (KL) divergence which measures the difference between two probability distributions, often used to assess the dissimilarity between learned representations and a reference distribution. During the hyperparameter optimization process, information-theoretic measures can be used as objective functions or regularization terms to guide the search towards hyperparameters that maximize the information content and generalization ability. For example, platform 2120 or an administrator can define an objective function that combines the performance metric (e.g., accuracy) with an information-theoretic measure (e.g., mutual information between learned representations and class labels). By optimizing this objective function, the hyperparameter search will favor configurations that not only achieve high performance but also learn representations with high information content and generalization ability.

Information-theoretic measures can be used to evaluate and compare different hyperparameter configurations based on the quality of the learned representations. For each hyperparameter configuration, the platform can compute the relevant information-theoretic measures on the learned representations and assess their information content and generalization ability. Hyperparameter configurations that yield representations with higher information content and better generalization ability are considered more desirable and are selected as the optimal choices.

Information-theoretic measures can also be used as regularization terms or constraints during the model training process itself. For example, the platform can add a regularization term that encourages the learned representations to have high mutual information with the target variables or to minimize the KL divergence between the learned representations and a desired prior distribution. These regularization techniques help guide the model towards learning representations that are informative, generalize well, and align with the desired properties.

Hyperparameter optimization can be computationally expensive, especially when training and evaluating complex models. As such, the platform may leverage parallel computing techniques to distribute the evaluation of hyperparameter configurations across multiple cores, machines, or clusters. Additionally, or alternatively, the platform can incorporate early stopping mechanisms to terminate the evaluation of poorly performing hyperparameter configurations early, saving computational resources and allocate more resources (e.g., training iterations, computational budget) to promising configurations based on their intermediate performance. For example, techniques like successive halving or Hyperband can dynamically allocate resources based on the relative performance of configurations.

FIG. 30 is a flow diagram illustrating an exemplary method 3000 for linking embeddings to knowledge graphs, according to an embodiment. According to an aspect of an embodiment, the process may be performed by ontology extraction computing system 2124. According to the embodiment, the process begins at step 3001 by analyzing learned vector embeddings (produced by one or more neural network models) and extracting symbolic representations that capture the underlying semantic structure. At step 3002 the platform may use clustering, dimensionality reduction, and/or rule mining to distill the embeddings into interpretable symbolic forms.

Platform 2120 may apply clustering algorithms, such as k-means or hierarchical clustering, to group similar embeddings together based on their spatial proximity in the vector space. Each cluster can be considered as a symbolic representation or concept that captures a group of semantically related embeddings. Platform may analyze the clusters to identify common themes, attributes, or relationships among the embeddings within each cluster and then assign meaningful labels or descriptions to the clusters based on their content or representative embeddings.

In embodiments where dimension reduction techniques are used, platform 2120 may implement Principal Component Analysis (PCA) or t-SNE (t-Distributed Stochastic Neighbor Embedding), to reduce the high-dimensional embedding space to a lower-dimensional representation and then visualize the reduced-dimensional space to identify patterns, clusters, or separations among the embeddings. Platform can analyze the principal components or dimensions to understand the most significant factors contributing to the variance in the embedding space in order to interpret the dimensions or components in terms of their semantic meaning or the attributes they capture.

In other implementations, platform 2120 may use semantic similarity analysis to compute pairwise similarities or distances between embeddings using metrics such as cosine similarity, Euclidean distance, or dot product to identify pairs or groups of embeddings that have high semantic similarity, indicating their close relationship or shared attributes. The most similar embeddings may be analyzed to understand the semantic connections and relationships captured by the embedding space and to extract symbolic representations or rules based on the observed semantic similarities, such as synonyms, antonyms, or analogies.

At step 3002, the platform may utilize ontology alignment techniques that align the learned embeddings with existing ontologies or knowledge bases (e.g., knowledge graphs) that provide a structured symbolic representation of the domain. This may involve the use of ontology matching techniques, such as string similarity, semantic similarity, or structural similarity, to establish correspondences between embeddings and ontology concepts. Leverage the aligned ontology to assign symbolic labels or categories to the embeddings based on their semantic similarity to ontology concepts and enrich the ontology with new concepts or relationships discovered from the embedding space.

FIG. 31 is a flow diagram illustrating an exemplary method for advanced reasoning using a composite artificial intelligence platform, according to an embodiment. According to the embodiment, the process begins at step 3101 by generating vector embeddings (i.e., learned representations) of input data using a plurality of neural network models trained on large datasets. This may be accomplished by applying transfer learning, fine-tuning, and/or multi-task learning techniques to improve the quality and generalizability of the embeddings. At step 3102 platform 2120 can store and retrieve symbolic facts, entities, and relations using an ontology or schema that defines the types of entities, relationships, and attributes relevant to a given system's (AI model) domain, populating the system with data from structured and unstructured sources using information extraction techniques. Symbolic information can be stored in one or more knowledge graph databases 2129. At step 3103 platform 2120, via DCG computing system 121 and hierarchical process system 2121 manages and routes processing tasks based on certainty thresholds and/or challenge based verification, selecting the appropriate models and data sources to complete the tasks.

As a next step 3104 platform can refine vector embeddings using contextual information by retrieving relevant facts, entities, and relationships from the knowledge base (e.g., knowledge graphs), updating the embeddings by incorporating the retrieved contextual information. At steep 3105 platform 2120 combines the outputs of multiple models using expressive weighting schemes which dynamically adjust the contribution of each model based on various factors. Platform can implement secure communication protocols and access control mechanisms to ensure security, licensing compliance, and provenance tracking with respect to models, data sources, and decision making in a collaborative development environment at step 3106.

At step 3107 platform 2120 may align and harmonize representations across different data modalities and then optimize hyperparameters using information theoretic guidance at step 3108. As a last step 3109, platform 2120 extracts symbolic knowledge from the vector embeddings by analyzing the learned embeddings to extract symbolic representations and map the extracted symbolic representations to existing concepts and relationships in a knowledge graph.

In this way, platform 2120 can provide an end-to-end process of advanced reasoning in an artificial intelligence system, starting from the generation of vector embeddings using neural network models, progressing through the storage and retrieval of symbolic knowledge, managing and routing processing tasks, refining embeddings with contextual information, combining outputs of multiple models, ensuring security and compliance, aligning representations across modalities, optimizing hyperparameters, and finally extracting symbolic knowledge from the learned embeddings.

FIG. 16 is a process flow diagram of a method 1600 for predictive analysis of very large data sets using the distributed computational graph. One or more streams of data from a plurality of sources, which includes, but is in no way not limited to, a number of physical sensors, web-based questionnaires and surveys, monitoring of electronic infrastructure, crowdsourcing campaigns, and direct human interaction, may be received by system 1601. The received stream is filtered 1602 to exclude data that has been corrupted, data that is incomplete or misconfigured and therefore unusable, data that may be intact but nonsensical within the context of the analyses being run, as well as a plurality of predetermined analysis related and unrelated criteria set by the authors. Filtered data may be split into two identical streams at this point (second stream not depicted for simplicity), wherein one substream may be sent for batch processing 1600 while another substream may be formalized 1603 for transformation pipeline analysis 1604, 1500, and retraining 1605. Data formalization for transformation pipeline analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The formalized data stream may be subjected to one or more transformations. Each transformation acts as a function on the data and may or may not change the data. Within the invention, transformations working on the same data stream where the output of one transformation acts as the input to the next are represented as transformation pipelines. While the great majority of transformations in transformation pipelines receive a single stream of input, modify the data within the stream in some way and then pass the modified data as output to the next transformation in the pipeline, the invention does not require these characteristics. According to the aspect, individual transformations can receive input of expected form from more than one source or receive no input at all as would a transformation acting as a timestamp. According to the aspect, individual transformations may not modify the data as would be encountered with a data store acting as a queue for downstream transformations. According to the aspect, individual transformations may provide output to more than one downstream transformations. This ability lends itself to simulations where multiple possible choices might be made at a single step of a procedure all of which need to be analyzed. While only a single, simple use case has been offered for each example, in each case, that example was chosen for simplicity of description from a plurality of possibilities, the examples given should not be considered to limit the invention to only simplistic applications. Last, according to the invention, transformations in a transformation pipeline backbone may form a linear, a quasi-linear arrangement or may be cyclical, where the output of one of the internal transformations serves as the input of one of its antecedents allowing recursive analysis to be run. The result of transformation pipeline analysis may then be modified by results from batch analysis of the data stream and output 1606 in format predesigned by the authors of the analysis with could be human readable summary printout, human readable instruction printout, human-readable raw printout, data store, or machine encoded information of any format known to the art to be used in further automated analysis or action schema.

FIG. 17 is a process flow diagram of a method 1700 for an aspect of modeling the transformation pipeline module as a directed graph using graph theory. According to the aspect, the individual transformations 17102, 17104, 17106 of the transformation pipeline $t_1 \ldots t_n$ such that each $t_i$ T are represented as graph nodes. Transformations belonging to T are discrete transformations over individual datasets d, consistent with classical functions. As such, each individual transformation $t_j$, receives a set of inputs and produces a single output. The input of an individual transformation $t_i$ is defined with the function in: $t_i$ $d_1 \ldots d_k$ such that $in(t_i)= \{d_1 \ldots d_k\}$ and describes a transformation with k inputs. Similarly, the output of an individual transformation is defined as the function out: $t_i$ $[Id_1]$ to describe transformations that produce a single output (usable by other transformations). A dependency function can now be defined such that $dep(t_a,t_b)$ $out(t_a)in(t_b)$ The messages carrying the data stream through the transformation pipeline 1701, 1703, 1705 make up the graph edges. Using the above definitions, then, a transformation pipeline within the invention can be defined as G=(V,E) where message $(t_1, t_2 \ldots t_{(n-1)}, t_n)$V and all transformations $t_1 \ldots t_n$ and all dependencies $dep(t_i,t_j)$E 1707.

Figure 18:
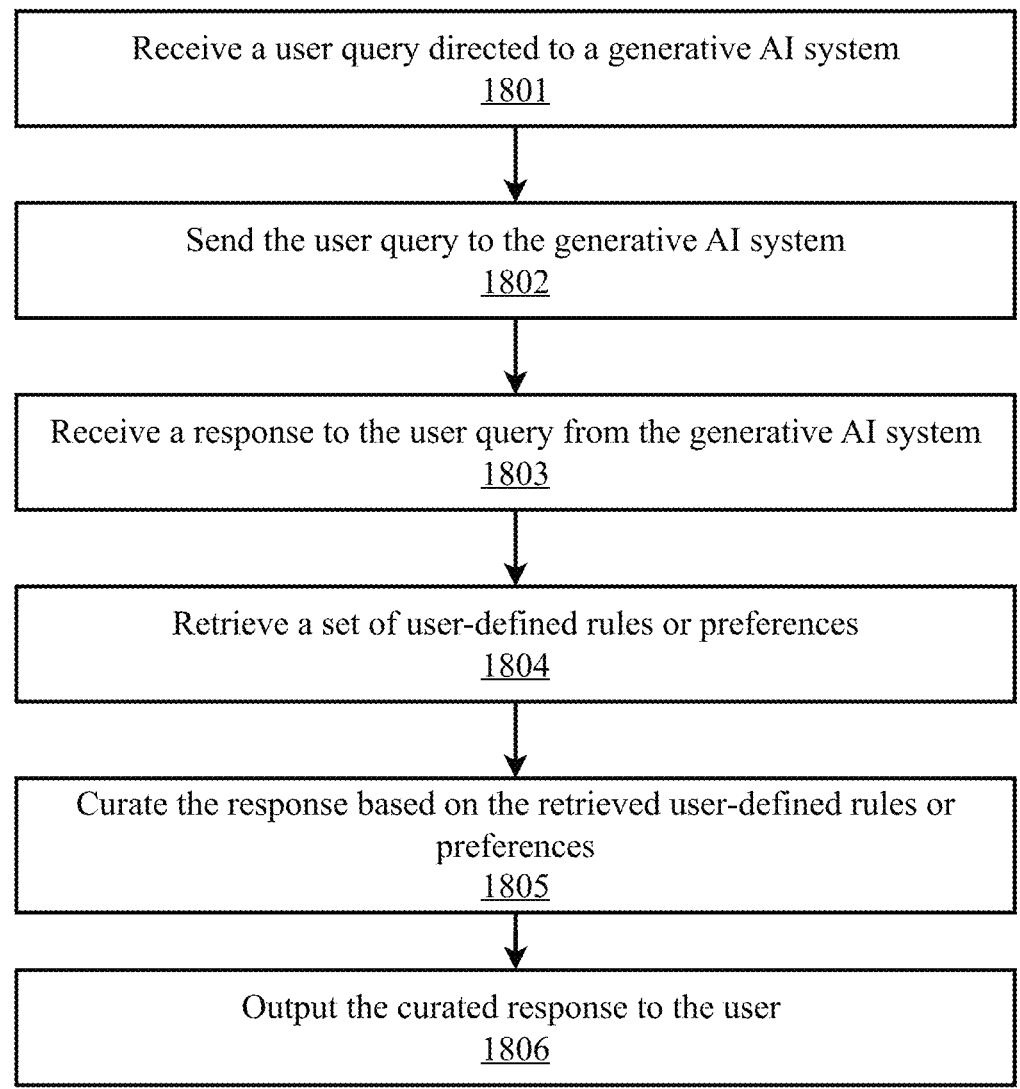
FIG. 18 is a flow diagram illustrating an exemplary method for providing experience curation, according to an aspect of an embodiment.

FIG. 18 is a flow diagram illustrating an exemplary method for providing experience curation, according to an aspect of an embodiment. According to the aspect, the process begins at step 1801 when a distributed generative AI reasoning and action platform receives a user query directed to a generative AI system. The query may comprise a request for information, a summary, a request for a document, or some other action. The user may submit their query to the platform via an experience curation portal such as through a webapp or website accessed via an Internet browser operating on a computer (e.g., personal computer, laptop), or through an associated curation application which can be operated on a mobile computing device (e.g., smart phone, tablet, smart wearable, IoT device, etc.). In some implementations, the received user query may be sent to a data embedding system which can vectorize the query and store it in a vector database where it may be retrieved to be used as contextual data included in a query/prompt sent to a generative AI system.

At step 1802 the query is sent to the generative AI system which processes the query and returns a generated response which is received by the platform at step 1803. At step 1804 the curation system locates and retrieves any available user-defined rules or preferences. In some embodiments, the user-defined rules/preferences may be defined by an entity (e.g., a company). Exemplary rules or preferences can include, but are not limited to, conditional generation preferences, formatting rules, language rules, style rules, geographic rules, environmental rules, and timing rules. With respect to conditional generation rules, the model can be conditioned on specific input data related to the individual, such as preferences, behavior, and characteristics. For example, in text generation, the model could be conditioned on a user's previous messages or writing style to generate more personalized responses. Formatting, style, and language rules are closely related and may be used to curate a response in a specific format (e.g., bullet points, paragraph, single sentence, numbered outline, CSV, etc.), response style (e.g., formal, informal, academic, accessible, abstract, casual, etc.), and the language in which a response is translated, respectively. At step 1805 the curation system can curate the response based on the retrieved user-defined rules or preferences. For example, the system may filter out extraneous data, or personal information. As a last step 1806, the curation system returns the curated response to the user, thereby providing experience curation to a platform user.

FIG. 19 is a flow diagram illustrating an exemplary method for providing experience curation with using rich contextual data, according to an aspect of an embodiment. According to the aspect, the process begins at step 1901 when a distributed generative AI reasoning and action platform receives a user query directed to a generative AI system. The query may comprise a request for information, a summary, a request for a document, or some other action. The user may submit their query to the platform via an experience curation portal such as through a webapp or website accessed via an Internet browser operating on a computer (e.g., personal computer, laptop), or through an associated curation application which can be operated on a mobile computing device (e.g., smart phone, tablet, smart wearable, IoT device, etc.). In some implementations, the received user query may be sent to a data embedding system which can vectorize the query and store it in a vector database where it may be retrieved to be used as contextual data included in a query/prompt sent to an ML, AI, generative AI, planning, or automation/action orchestration system.

A DCG orchestrated model which employs a hierarchical classification and model selection regime for content (either in whole or in part) can enable much more accurate ultimate semantic performance. For example, a query/prompt can be submitted to the generative AI system with additional metadata associated with the context of the prompt itself as well as additional broader information about the user and the user's ongoing behavior and/or activities. At step 1902 the system obtains a plurality of rich context data associated with the user, the query, or both. A subset of the plurality of context data information may be obtained from a vector database, the vector database comprising a plurality of embedded contextual data. Embedded contextual data can comprise (but is not limited to) information obtained from an enterprise knowledge base and embedded queries/prompts. Context data associated with the user may comprise information obtained from or related to one or more of a computing device on which the user is accessing the curation system/platform, the geographic location the user is located, an action the user is performing during interaction with the curation system/platform, and timing data associated with the user, and/or the like. A subset of the plurality of obtained context data may be obtained from one or more marketplaces such as a data marketplace and/or an expert judgment marketplace. In some embodiments, the selection of context data may be based on one or more expert judgment scores assigned to an information source, dataset, model, and/or hyperparameters.

As an example, if a user is asking a generative AI enhanced search engine for "the best pizza" on her cell phone while driving at 55 mph on the road and not near her home (e.g., on vacation) this is massively different from the user being at home, on her couch, connected on her laptop, from her normal IP address, having just ran a series of searches for airline tickets to Italy and Neapolitan Pizza recipes. The additional device, user, recent behavior, etc. content can be used by a classifier alongside a prompt to help focus results on things that are not only relevant (e.g., pizza places near the user that are open now) but likely to be consistent with her broader needs/persona (e.g., if available, the suggestions could be looked at based on other budget, dining, etc. preferences like outdoor seating and meals below $20 per person). The same principle applies to more complicated and complex topics like medicine or finance or law.

At step 1903 the obtained plurality of context data may be processed into vectors by an embedding model and stored in the vector database.

At step 1904 the user query and the vectorized context data is sent to the generative AI system which processes the query and returns a generated response which accounts for the information contained in the vectorized context data and which is received by the platform at step 1905. At step 1906 the curation system locates and retrieves any available user-defined rules or preferences. In some embodiments, the user-defined rules/preferences may be defined by an entity (e.g., a company). Exemplary rules or preferences can include, but are not limited to, conditional generation preferences, formatting rules, language rules, style rules, geographic rules, environmental rules, and timing rules. With respect to conditional generation rules, the model can be conditioned on specific input data related to the individual, such as preferences, behavior, and characteristics. For example, in text generation, the model could be conditioned on a user's previous messages or writing style to generate more personalized responses. Formatting, style, and language rules are closely related and may be used to curate a response in a specific format (e.g., bullet points, paragraph, single sentence, numbered outline, CSV, etc.), response style (e.g., formal, informal, academic, accessible, abstract, casual, etc.), and the language in which a response is translated, respectively. At step 1907 the curation system can curate the response based on the retrieved user-defined rules or preferences. For example, the system may filter out extraneous data, or personal information. As a last step 1908, the curation system returns the curated response to the user, thereby providing experience curation to a platform user.

Figure 20:
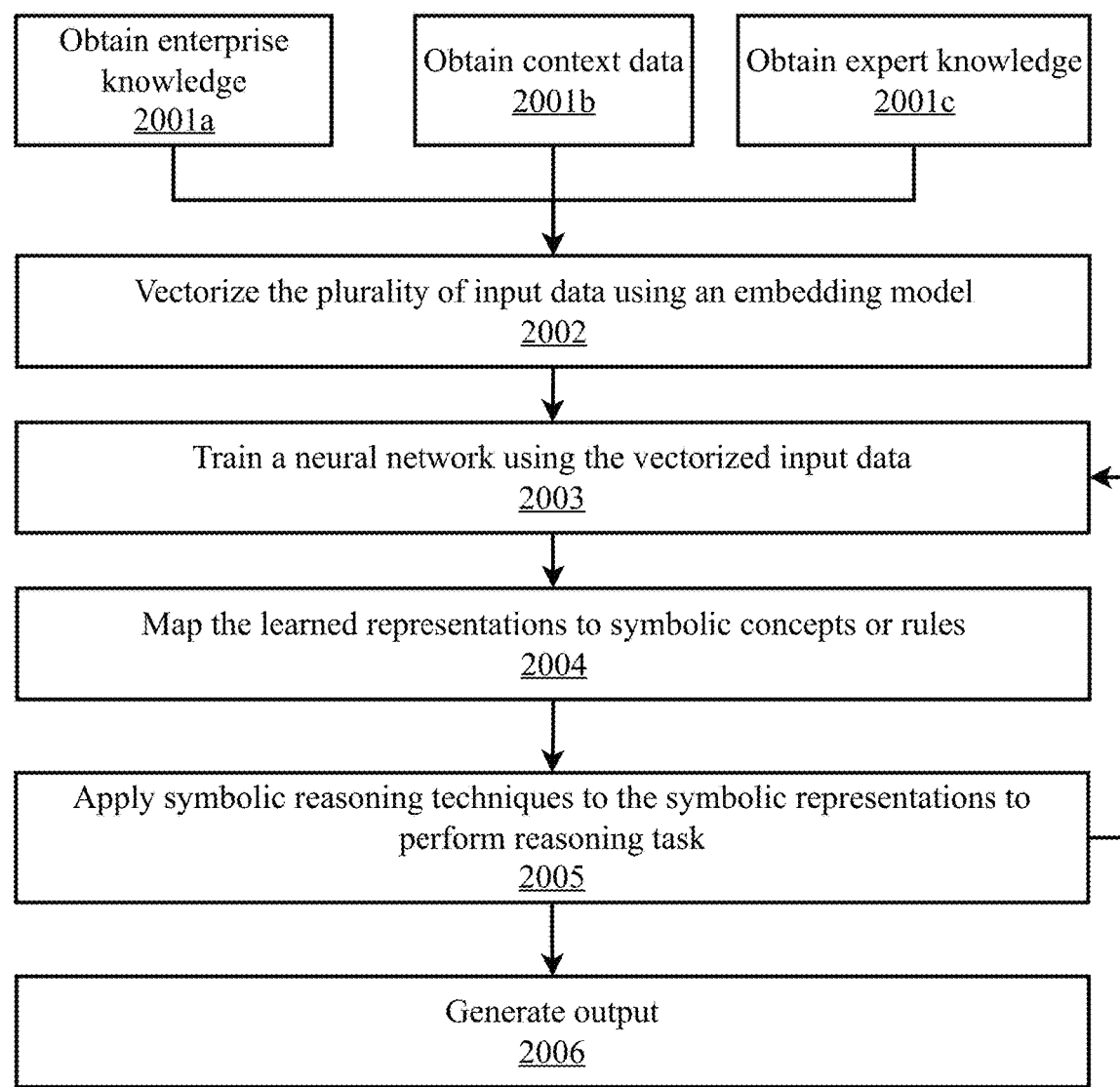
FIG. 20 is a flow diagram illustrating an exemplary method for using a distributed computation graph system for creating structured representations or knowledge graphs from various data sources and setting up a pipeline for continuous processing and monitoring of that data, according to an embodiment.

FIG. 20 is a flow diagram illustrating an exemplary method for providing distributed neuro-symbolic reasoning and action model, according to an aspect of an embodiment. A neuro-symbolic model combines neural network-based approaches with symbolic reasoning to enable a more flexible and powerful reasoning system. In neuro-symbolic reasoning, neural networks are used to learn representations of data, similar to how they are used in deep learning. These learned representations can then be combined with symbolic representations and rules to perform reasoning tasks. This combination allows for the strengths of both approaches to be leveraged: the ability of neural networks to learn complex patterns from data, and the ability of symbolic reasoning to represent and manipulate abstract concepts and rules.

According to the aspect, the process begins at step 2001*a-c* wherein a plurality of input data is obtained from various sources. Examples of input data can include entity knowledge 2001*a*, context data 2001*b*, and expert knowledge 2001*c*. Other types of data may be obtained and may be dependent upon the embodiment and the particular use case. Data may be obtained from third-party services, entity databases/data warehouses/knowledge base and/or the like, and various marketplaces for data, algorithms, RAGs, and/or expert judgment. At step 2002 the obtained plurality of input data is vectorized using an embedding model and stored in a vector database. Vectorizing the data allows it to be used as input for processing by a neural network. At step 2003 platform 120 can train the neural network using the input data to learn patterns and relationships in the data. In some embodiments, this step may involve the use of labeled examples and supervised learning. A recurrent neural network or some other transformer-based model may be used as the basis for the neural network. At step 2004 the system maps the learned representations to symbolic concepts or rules. At this step, the system learns to represent the learned features or representations from the neural network in symbolic form. At step 2005 the system applies reasoning techniques to the symbolic representations to perform reasoning tasks. Examples of reasoning techniques that may be implemented can include, but are not limited to, logic rules or inference engines. This step may involve combining the learned representations with existing knowledge or rules to derive new conclusions. At this point in the process a feedback loop is created wherein feedback from the symbolic reasoning step is incorporated back into the neural network to refine the learned representations. This feedback loop helps to improve the performance of the system over time. In some embodiments, the feedback loop may include functionality for evaluating generated outputs based on quality and/or relevance to the task. In such embodiments, users' positive and/or negative feedback may then be used to adjust the running model's parameters. In this way, user feedback can be used as a form of (positive or negative) reinforcement. In another embodiment, a panel of known experts (either human or AI or both) may be used to assess model outputs and/or performance and apply feedback based on the panel's assessment.

As a last step 2006, the trained, distributed GenAI reasoning and action model can generate output of the reasoning process, which could be a decision, a prediction, or an action based on the input data and the reasoning process. In some embodiment, the input data may further include a query/prompt and metadata comprising various contextual information about the user and/or prompt.

FIG. 35 is a flow diagram illustrating an exemplary method 3500 for providing semantic search capabilities using an AI platform for advanced reasoning, according to an aspect. According to the aspect, the process begins at step 3501 by first automatically creating and updating ontologies through the analysis of data from multiple sources using natural language processing and machine learning techniques. These ontologies, which can include both domain-specific and upper ontologies, provide a structured representation of concepts and their relationships. At step 3502 the system creates and maintains a semantic index based on the information extracted from the ontologies, enabling efficient search and retrieval of relevant information. When a user submits a query at step 3503, the system processes the query by leveraging the semantic index, knowledge graphs, and contextual information to identify the most relevant results. The knowledge graph, which integrates information from ontologies, semantic indices, and external sources, is used to support complex reasoning and inference tasks. Throughout the search process, the system utilizes user context and preferences to guide the search and enable context-aware query interpretation and result personalization. At step 3504 the system returns the query results to the user. The orchestration of these semantic search and reasoning workflows may be performed using a directed computational graph computing system 121, which integrates ontology extraction, indexing, search, knowledge graph, and context processing components. Continuously, the system optimizes its performance and efficiency based on workload characteristics and service-level objectives, employing techniques such as caching, parallelization, compression, and resource allocation.

FIG. 36 is a flow diagram illustrating another exemplary method 3600 for providing semantic search capabilities using an AI platform for advanced reasoning, according to an aspect. According to the aspect, the process begins at step 3601 by collecting data from a wide range of sources, including structured databases, unstructured text documents, and multimedia content. This data is then processed using advanced data extraction and transformation techniques at step 3602, such as optical character recognition (OCR), named entity recognition, and sentiment analysis, to identify key concepts, entities, and relationships. At step 3603 the extracted information is used to construct a rich, multi-layered knowledge graph that represents the domain knowledge in a structured and machine-readable format.

To enable efficient and accurate semantic search, the system employs a hybrid approach that combines traditional information retrieval techniques with deep learning-based methods. The knowledge graph is indexed at step 3604 using a combination of inverted indices, graph traversal algorithms, and vector space models, allowing for fast and scalable search operations. When a user submits a query at step 3605, the system first performs a syntactic matching to identify relevant documents and entities based on keyword similarity at step 3606. As a next step 3607 the results are then refined using semantic matching techniques, which leverage the ontological structure and semantic relationships captured in the knowledge graph to identify conceptually related items.

The system incorporates a sophisticated natural language processing pipeline that enables users to interact with the semantic search engine using natural language queries, conversational interfaces, and voice commands. The pipeline includes components for query understanding, intent recognition, entity linking, and dialogue management, allowing the system to interpret user queries in a context-aware manner and provide intelligent, conversational responses.

At step 3608 the query results are returned and presented to the user. To further enhance the relevance and usability of search results, the semantic search system employs a range of result ranking and presentation techniques. These include personalized ranking based on user profiles and search history, diversification of search results to cover different aspects and viewpoints, and generation of rich snippets and previews to provide users with informative and visually appealing search summaries.

The system incorporates advanced machine learning and data mining techniques to continuously improve the quality and efficiency of the semantic search process. This involves the use of unsupervised learning algorithms, such as clustering and topic modeling, to discover hidden patterns and themes in the data, as well as supervised learning methods, such as relevance feedback and click-through data analysis, to learn from user interactions and preferences.

To ensure robustness, scalability, and performance, the semantic search system may be built on a distributed, cloud-based architecture that leverages containerization, microservices, and serverless computing paradigms. The system employs automated monitoring, logging, and error handling mechanisms to detect and resolve issues in real-time, and incorporates security and privacy controls to protect sensitive user data and intellectual property.

FIG. 37 is a flow diagram illustrating an exemplary method 3700 for implementing a RAPTOR model to support semantic query/search actions, according to an aspect. According to the aspect, the process begins at step 3701 with document processing. A long document may be input into the RAPTOR model which divides the document into smaller, manageable chunks. Each chunk is passed through an LLM to generate abstractive summaries and create semantic embeddings. At step 3702, the RAPTOR model performs an initial clustering of chunks based on the similarity of their embeddings and summarizes each cluster using the LLM to create higher-level representations. This may comprise recursively clustering and summarizing to build a hierarchical tree structure. At step 3703, the platform performs query processing. When a query is made, the platform traverses the hierarchical tree to retrieve the most relevant chunks or summaries and provides detailed or abstracted responses based on the query's specificity and required granularity.

RAPTOR models represent a significant advancement in document retrieval and summarization. By addressing the limitations of RAG models, RAPTOR models provide a more structured, efficient, and context-aware method for handling long documents. The use of recursive clustering and chunk embeddings, combined with LLM summarizations, ensures that information is organized hierarchically and retrieved in a manner that reflects its importance and relevance. This approach not only enhances the accuracy and efficiency of information retrieval but also provides a flexible framework that can adapt to varying levels of detail required by different queries. One additional example which is related for large scale spatial data (e.g., earth observation) addresses a common operation that requires combining big raster and vector data to compute zonal statistics which computes some statistics for each polygon in the vector dataset. Ontology zones (e.g., when dimensionally reduced to some n dimensions like 2 dimensions via tSNE) and other sensory spatiotemporal zonal statistics problems can require analysis of petabytes of raster and vector data for analysis. Ontological data can also be represented as arrays like raster data metadata. We note that the system may elect to compute an intersection index mapping vector polygons to raster data like (or raster data like arrays) to allow the system to scan the intersection index and the raster data to find the join result needed to produce a zonal statistic via the Raptor Zonal Statistic Algorithm (distinct from RAPTOR models) or similar. This allows for a much faster and fully distributed approach to producing final aggregates via a sequenced intersection, selection and intermediate then final aggregate production process. By processing the raster format data and the intersection in parallel, RaptorInputFormat and Raptor-Split define the smallest unit of work for each parallel task to enable faster computation of statistics for each polygon.

This provides an additional "neighborhood" based mechanism for representing ontological to vector to structured data linkages and to support an equivalent "time neighborhood" for temporally divergent terms or ontological concepts which require user requests to be reinterpreted to ensure computer search actions map to the actual user or AI agent intent.

FIG. 38 is a flow diagram illustrating an exemplary method 3800 for integrating multimodal data into semantic search and recommendations, according to an aspect. An exemplary scenario involving a user preparing for a meeting can be used to illustrate the exemplary method. According to the aspect, the process begins at step 3801 with data integration of multimodal data into the platform. Data integration may comprise multimodal data such as text (notes and emails related to the meeting), video (recording of previous meetings), audio (voice notes form brainstorming sessions), positional data (location of the meeting), recent actions (use's recent searches and document edits), and calendar events (scheduled meeting time and related deadlines). At step 3802, the platform performs data processing on the obtained multimodal data. Data processing can include, but is not limited to, transcription (transcribe audio and video content), embedding generation (generate embeddings for text, transcriptions, positional data, and actions), and generating a unified representation (combine these embeddings into a unified context-aware representation.

At step 3803, the multimodal data is integrated with one or more RAPTOR models. For example, the multimodal data can be divided into chunks and to generate summaries, and then a hierarchical tree can be built with these chunks, summarizing and clustering them recursively. At step 3804, the platform performs query processing on an obtained query. This may involve context extraction and/or query expansion wherein context from the user's current activity and future calendar events is extracted and the search query is expanded with relevant context from the hierarchical tree. At step 3805, the platform performs recommendation generation. For example, the system can provide relevance scoring wherein the system scores potential recommendations based on the hierarchical tree and unified embeddings. The system can provide personalized search results and recommendations, such as relevant documents, previous meeting summaries, or upcoming deadlines.

Integrating multimodal data into the RAPTOR system enhances its ability to perform context-aware searches and provide personalized recommendations. By processing and representing various types of data-text, video, audio, positional, recent actions, and future events-RAPTOR can build a comprehensive hierarchical knowledge base. This integration ensures that search results and recommendations are not only semantically relevant but also contextually enriched, leading to a superior user experience in managing and retrieving information.

FIG. 39 is a flow diagram illustrating an exemplary method 3900 for using Datalog concepts in a streaming fixed point semantics search, according to an aspect. According to the aspect, the process begins at step 3901 by obtaining a plurality of multimodality input data. For example the multimodality data may comprise text data (e.g., a user query about the best cameras for wildlife photography), sound data (e.g., the user's voice conveys excitement), and imagery data (e.g., the user uploads photos of birds taken with a low quality camera). At step 3902, the system performs processing and reasoning on the multimodality input. This may comprise feature extraction by extracting keywords from text (e.g., "cameras," "wildlife photography"), detect emotion in voice (e.g., excitement), and identify objects in images (e.g., birds); contextual inference by inferring the user's interest in wildlife photography and urgency based on multimodal input; rule application by applying Datalog-like rules to infer relevant recommendations:

"'datalog
user_interest(User, "wildlife_photography"):—user_query(User, "wildlife photography").
user_emotion(User, excited):—detected_emotion(User, excited).
camera_recommendation(User, Camera):—user_interest (User, "wildlife_photography"), suitable_camera (Camera).
"";

and fixed-point computation by continuously updating inferences as new inputs arrive.

At step 3903, the system performs response curation which may be personalized. For example, the system can recommend cameras known for wildlife photography, highlighting features like high zoom and fast shutter speed. Furthermore, the system can provide recommendations via text, supported by audio commentary and example wildlife photos taken with recommended cameras.

Integrating Datalog-like concepts in a streaming fixed point semantics rules engine with distributed computational graphs (DAGs) enhances the ability to handle complex reasoning on multimodal inputs. This approach provides a comprehensive understanding of user needs, goals, and context, facilitating the identification of highly relevant information and the curation of targeted responses. The combination of Datalog-like logical inference, dynamic fixed point updates, and parallel processing via DAGs ensures a scalable, responsive, and sophisticated system, surpassing traditional search and information retrieval methods.

In some implementations, the method 3900 as performed by a streaming fixed point semantics rules engine can be integrated with specialized fine-tuned adapter layers. This may comprise the use of adapter layers to fine-tune the base model for specific tasks. Adapters are small neural network modules inserted into various layers of the pre-trained model. This can enable task-specific adaptation by fine-tuning only the adapter layers, keeping the base model's parameters unchanged, thus preserving general knowledge while tailoring the model to support specific tasks. The model can dynamically adapt to the user's current activity, enhancing its performance in tasks like text generation, notification prioritization, and image creation.

In some embodiments, the streaming fixed point semantics rules engine can be extended with distributed computational graphs. This approach, combined with specialized fine-tuned adapter layers, enhances our understanding of user needs, goals, and context, leading to the identification of highly relevant information and the curation of targeted responses. This system's dynamic adaptability, scalability, and efficiency surpass traditional search and information retrieval methods, offering a sophisticated, context-aware, and responsive user experience.

To clearly understand a user's goals by integrating multiple sources of input across different media types (text, sound, imagery), the system can employ a combination of advanced AI techniques, including multimodal data fusion, contextual analysis, and dynamic personalization.

With respect to multimodal data fusion the process may perform data collection and preprocessing. For text input, the system can collect text data from user queries, chat interactions, emails, documents, etc., and preprocess the text input using NLP techniques like tokenization, stemming, and lemmatization. For sound input, the system can collect audio data from voice commands, phone calls, or recorded messages and preprocess the audio input by converting speech to text using Automatic Speech Recognition (ASR) and extract emotional tone using sentiment analysis. For imagery input, the system can collect image data from user uploads, camera feeds, or social media and preprocess images using computer vision techniques to identify objects, scenes, and facial expressions.

The system can perform feature extraction as part of the data fusion process. For text features, this may comprise extracting semantic features using embeddings (e.g., BERT, GPT) to capture the contextual meaning of the text. For audio features, the system may extract features like pitch, tone, and rhythm for emotion detection and convert speech to text for further semantic analysis. For image features, the system can use convolutional neural networks (CNNs) to extract features like object detection, scene classification, and facial expression recognition.

The system can perform embedding fusion as part of the data fusion process. To create a unified representation, the system can map different modality features into a common vector space using multimodal embeddings. Techniques like cross-modal transformers can be employed to align text, audio, and image embeddings. The system may combine the multimodal embeddings into a unified representation that captures the holistic context of the user input.

With respect to contextual analysis, the system may leverage user profiles. This may comprise maintaining comprehensive user profiles that include historical data, preferences, interaction history, and contextual information and continuously updating user profiles with new data to keep the context relevant and current. Contextual analysis may further leverage intent recognition mechanisms. For example, the system can use NLP to analyze text and transcribed audio to recognize user intent using intent classification models, or emotion and sentiment analysis techniques to detect emotions from audio and text inputs to understand the user's emotional state and incorporate it into the context. For visual context the system can analyze images to derive context related to the user's environment or interests With respect to dynamic personalization, the system may perform real-time adaptation using dynamic specialization such as using fine-tuned adapter layers to adapt the model to the user's current activity and personalize responses in real-time, and context-aware responses such as generating responses that are tailored to the user's inferred goals and preferences by leveraging the unified multimodal representation.

With respect to advanced reasoning and inference, the system may leverage Datalog integration to perform rule-based inference wherein Datalog-like rules can be employed for logical reasoning and infer new facts and relationships from the multimodal data. Additionally, or alternatively, the system can support streaming fixed point semantics by continuously applying rules to the streaming data until no new inferences can be made, ensuring real-time updates and relevant inferences. This process may utilize DAGs to handle distributed and parallel processing of rules and inferences, improving scalability and efficiency FIG. 40 is a flow diagram illustrating an exemplary method 4000 for integrating KANs, neurosymbolic techniques, and enhanced AI for explainability and user goal understanding, according to an aspect. Combining Kolmogorov-Arnold Networks, neurosymbolic techniques, and enhanced AI approaches can significantly improve the explainability and understanding of user goals, especially when dealing with multimodal inputs (e.g., text, sound, imagery, etc.). This integration can leverage the strengths of each technology to create a robust, explainable AI system. According to the aspect, the process begins at step 4001 by ingesting a plurality of multimodality data into the integrated, enhanced AI system. The system can perform data collection and preprocessing for multimodality input data. For text input, the system can collect and preprocess text data using NLP techniques. For sound input, the system may convert speech to text using ASR, and extract emotional tone using sentiment analysis. For imagery input, the system can use computer vision to analyze images for objects, scenes, and facial expressions. The system can also perform feature extraction and embedding fusion. The system can use embeddings (e.g., BERT, GPT) to capture text semantics. The system can extract audio features and convert to text for semantic analysis of audio features. The system may use CNNs to extract visual features from image data. The system may create a unified representation of the multimodality input. This may comprise mapping features from different modalities into a common vector space for unified representation. In an embodiment, the system integrates with one or more KANs to enhance the representation by learning complex dependencies across multimodal data.

At step 4002, the system performs contextual analysis and user profiling. This may comprise maintaining user profiles with historical data, preferences, and contextual information and continuously updating profiles with new data to keep the context relevant. For intent recognition, the system can leverage NLP for text wherein it recognizes user intent from text using advanced NLP models. Furthermore, the system can analyze emotional tone from audio and video data, and infer context from images (e.g., environment, user activity, etc.).

At step 4003, the system performs advanced reasoning with Datalog and neurosymbolic techniques. For rule-based inference, the system can use Datalog-like rules for logical inferences and integrating multimodal data. For neurosymbolic integration, the system can use symbolic AI to represent logical rules and relationships, and combine neural networks with symbolic reasoning for enhanced explainability and reasoning capabilities.

At step 4004, the system performs model consensus and comparison operations to improve explainability. This may comprise mechanistic interpretability wherein the system uses dictionary learning to identify combinations of neurons that evoke specific concepts and pattern recognition to recognize patterns in neural activations to understand what the model is "thinking." For model consensus, comparative analysis may comprise comparing outputs from multiple models to ensure consistency and accuracy and feature mapping to map features across models to identify commonalities and differences, enhancing understanding.

At step 4005, the system supports explainability via neurosymbolic knowledge curation. The system can curate a knowledge base with explicit rules and relationships. This may comprise annotating neural activations with symbolic explanations to make model decisions transparent. To support model behavior manipulation, the system can utilize feature control wherein techniques are implemented to manipulate neural features and control model behavior. For example, the system can implement guardrails by controlling activation of harmful features, ensuring safe and responsible AI behavior.

FIG. 41 is a flow diagram illustrating an exemplary method 4100 for enhancing user context understanding and proactive augmentation with scene graph generation integrations, according to an aspect. The integration of neurosymbolic techniques, Kolmogorov-Arnold Networks, and scene graph generation, can significantly enhance the understanding of user context based on their location, activities, and recent or forecasted tasks. According to the aspect, the process begins at step 4101 when the system obtains a plurality of multimodal input data and performs data collection and various preprocessing tasks. For text input, the system may collect and preprocesses text data from user queries, chat interactions, emails, and documents, to name a few. For sound input, the system can convert speech to text using ASR and extract emotional tone using sentiment analysis. For imagery input, the system can use computer vision techniques to analyze images and videos for objects, scenes, and facial expressions. The system may perform feature extraction and embedding fusion on the multimodality data. The system can use embeddings (e.g., BERT, GPT) to capture semantic meanings in text data. The system can extract features like pitch, tone, and rhythm to detect emotions in audio data. The system can use CNNs to extract features from image data for object detection and scene classification. The extracted features form different modalities may be mapped into a common vector space using multimodal embeddings.

At step 4102, the system performs dynamic contextual analysis. This may comprise scene graph generation wherein the system uses scene graph generation to detect and analyze objects, their attributes, and relationships in a user's environment, and then constructs symbolic representations of scenes to form the basis for higher-level visual reasoning tasks. Dynamic contextual analysis may also comprise knowledge infusion tasks. For example, the system can infuse common sense knowledge using heterogeneous knowledge graphs such as ConceptNet and Visual Genome to provide background details and related facts about scene components. The system may leverage neurosymbolic integration by combining neural networks' learning capabilities with symbolic AI's logical reasoning to enhance the scene graph's expressiveness and accuracy.

At step 4103, the system performs proactive augmentation of user scenes. The system may utilize user profiles and the information contained therein to forecast user contexts. For example, the system can use past data and current activities to predict future contexts and tasks, and/or employ models that consider temporal relationships and patterns. The system can generate proactive suggestions based on the predicted context, and proactively suggest relevant information, tools, or actions to the user.

At step 4104, the system performs advanced reasoning with Datalog and KANs. For rule-based inference, the system can use Datalog-like rules for logical inferences and integrating multimodal data to understand user needs and goals better. For neurosymbolic reasoning tasks, the system can use symbolic AI to represent logical rules and relationships. Combine this with neural network features to provide explainability. The system can use KANs to handle complex dependencies and enhance reasoning capabilities by integrating symbolic knowledge directly into the neural network architecture.

At step 4105, the system enhances user efficiency, safety, curiosity, and goals. This may comprise generating context-aware responses. The system can tailor responses and suggestions based on the user's current context, preferences, and predicted needs. In some embodiments, the system can provide real-time safety alerts and recommendations based on the user's location and activities, leveraging scene understanding and predictive analysis. With respect to curiosity and learning, the system may suggest educational resources and exploratory content based on the user's interests and current context. For example, the system can use scene graphs and visual reasoning to provide intuitive explanations and interactive learning experiences.

In an example scenario, the user context is determined based on text input (user queries about the best safety equipment for a construction site), sound input (user's voice indicates urgency), and imagery input (user uploads photos of the construction site). The system then performs processing and reasoning by extracting keywords from text, detect urgency in voice, and analyze images for relevant objects (e.g., construction equipment), inferring the user's current activity and location (working on a construction site), and applying Datalog rules for safety recommendations:

```
```datalog
    user__needs__recommendation(User, SafetyEquipment) :- user__location(User, "construction
site"), user__activity(User, "working").
    suitable__safety__equipment(Equipment) :- equipment__feature(Equipment, "helmet"),
equipment__feature(Equipment, "safety__vest").
```
```

The system can then perform proactive augmentation via safety alerts such as recommend safety equipment and provide alerts based on the detected environment and user activity, and contextual learning such as suggest articles or videos on construction safety best practices and equipment usage.

By integrating neurosymbolic techniques, KANs, and advanced AI methods, the platform can create a system that comprehensively understands user contexts and proactively augments user experiences. This approach enhances user efficiency, safety, curiosity, and goal achievement through multimodal data fusion, dynamic contextual analysis, predictive reasoning, and personalized assistance. Such a system offers a superior, explainable, and user-centric AI solution for various real-world applications.

Figure 42:
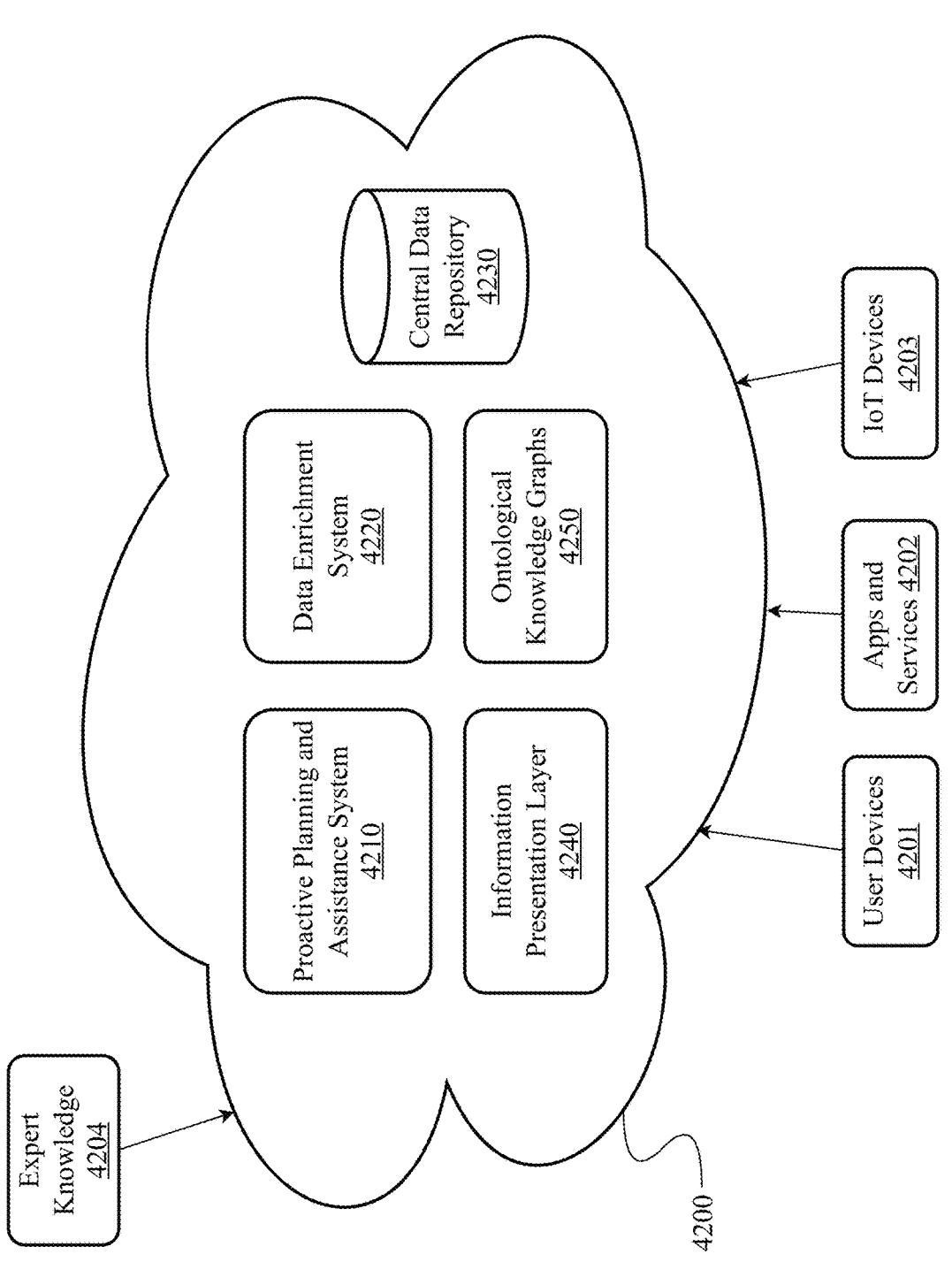
FIG. 42 is a block diagram illustrating an exemplary system architecture for a central coordinating agent for daily activity planning platform, according to an embodiment.

FIG. 42 is a block diagram illustrating an exemplary system architecture for a central coordinating agent for daily activity planning platform 4200, according to an embodiment. Integrating various sensory inputs and leveraging them through a central coordinating agent can transform traditional search tasks into proactive and personalized daily planning assistance. This "daily activity co-pilot" can enhance user efficiency, safety, and overall experience by dynamically adjusting the information presented based on task urgency and user priorities. Platform 4200 may be a specifically configured version of platform 120, 2120, and/or computing system 3200 and may offer similar functionality as described herein. According to the embodiment, the central coordinating agent architecture 4200 comprises a plurality of sensory inputs 4201-4203, a data aggregation and enrichment system 4220, a central data repository 4230, a proactive planning and assistance system 4210, and an information presentation layer 4240.

As shown the plurality of sensory input data may include, but is not limited to, user device 4201, apps and services 4202, and Internet-of-Things (IoT) devices 4203. Platform 4200 can collect data from user devices such as smart phones, tablets, and wearables, including location, activity, and health metrics. Platform 4200 can integrate information from frequently used apps like email, messaging, calendar, and task management tools. Platform 4200 can gather data from IoT devices such as smart home devices, personal robots, and connected vehicles.

According to an embodiment, data aggregation and enrichment system 4220 may aggregate data from all sources into a centralized repository 4230 for real-time processing and analysis. System 4220 may also enrich data with contextual metadata such as timestamps, geolocation, user preferences, and activity history, to name a few. The platform may be further configured to provide user context definition based on various information. For example, the platform can use GPS data and activity recognition to determine the use's current location and activity, extract upcoming events, deadlines, and tasks form the user's calendar and task management apps, and assess available resources such as money, time, and the status of personal robots or other assistive devices.

According to an embodiment, the proactive planning and assistance system 4210 can be configured to provide task prioritization and scheduling. For example, the platform can evaluate the urgency and criticality of tasks based on deadlines, importance, and user-defined priorities. System 4210 may be further configured for dynamic scheduling wherein it adjusts the user's schedule dynamically, taking into account real-time changes in context and new information. System 4210 may also be configured for suggested planning tasks such as contextual recommendation and resources optimization. The platform can provide recommendations based on the user's current context and preferences. For example, if a user has extra time and is near a museum featuring their favorite artist, suggest a visit. It may also suggest the optimal use of available resources. For example, recommend running errands with the assistance of a personal robot when the user's schedule allows.

According to an embodiment, the information presentation layer 4240 may be configured for adaptive information presentation including information fidelity throttling. The platform can present detailed and comprehensive information for tasks that require immediate attention or are highly critical. The platform can offer a summary or high-level information for less urgent tasks, allowing the user to explore further if interested. The layer 4240 can perform user preference learning wherein it continuously learns from user feedback to adjust the level of detail and type of information presented. It may also provide context-aware throttling by adjusting the fidelity of information based on the user's current context, preferences, and historical behavior.

By transforming traditional search tasks into a centralized coordinating agent that leverages sensory input from various sources, platform 4200 can create a powerful daily activity co-pilot. This system dynamically adjusts to user needs, prioritizes tasks, and provides proactive suggestions, enhancing user efficiency, safety, and overall experience. Combining advanced AI techniques, such as MCTS and RL, with a deep understanding of user context, enables a personalized, responsive, and adaptive planning assistant that meets the user's immediate and broader needs.

What follows is an example scenario of a daily activity co-pilot. An exemplary morning routine may comprise: Wake-Up and Health Check: Analyze data from sleep trackers and health monitors to suggest the optimal wake-up time and provide a summary of sleep quality and health metrics. Calendar Review: Present a summary of the day's schedule, highlighting urgent meetings, deadlines, and tasks. Traffic and Commute: Check real-time traffic data and suggest the best time to leave for work, considering any scheduled stops (e.g., picking up coffee or dry cleaning).

An exemplary work hours plan may comprise: Meeting Preparation: Provide detailed information and relevant documents for upcoming meetings. Use NLP to extract key points from emails and messages. Task Reminders: Send reminders for critical tasks and deadlines, adjusting the presentation based on urgency and importance. Resource Allocation: Suggest optimal use of available resources (e.g., personal assistant or robot) to handle routine tasks, allowing the user to focus on high-priority work.

An exemplary leisure and errands plan may comprise: Proactive Suggestions: If the user has extra time, suggest nearby activities that align with their interests (e.g., visiting a museum or going for a walk in a park). Errand Optimization: Use real-time data to suggest the best route and timing for running errands, coordinating with personal robots to assist in tasks like grocery shopping or package pickup.

An exemplary evening wind-down plan may comprise: Review and Plan: Summarize the day's accomplishments and suggest any pending tasks that can be deferred or need attention. Health and Relaxation: Provide recommendations for relaxation activities based on the user's preferences and health metrics (e.g., suggesting a workout or meditation session).

What follows is an example using ANML in a scenario coordinating daily activities with a personal robot:

```
ANML Definitions:
- Morning Routine:
   ```anml
   action prepare_morning_routine(user, robot) {
       precondition: user.wake_up_time( ) & robot.ready( );
       effect: user.ready_for_day( ) & robot.prepare_breakfast( ) &
user.receive_health_summary( );
   }
   ```

- Task Management:
   ```anml
   action manage_tasks(user, calendar, tasks) {
       precondition: user.at_work( ) & calendar.sync( ) & tasks.updated( );
       effect: user.receive_task_reminders( ) & user.complete_tasks( );
   }
   ```

- Errands and Leisure:
   ```anml
   action plan_errands(user, robot, location) {
       precondition: user.free_time( ) & location.nearby_places( );
       effect: user.run_errands( ) & robot.assist_groceries( ) & user.visit_interesting_place( );
   }
   ```
```

Platform 4200 may also provide enhanced integration with expert knowledge 4204 information sources into the central coordinating agent. The process may comprise the use of general-purpose LLMs to distill question answer-pairs from specialized domains and then fine-tuning these LLMs to create domain-specific models. The platform can fine-tune models such as MechGPT for various domains such as construction safety, materials science, and project management. For example, the platform could fine-tune a model for construction safety using data form safety manu-als, regulations, and case studies to assist with real-time safety management on construction sites.

The process of expert knowledge integration may further comprise the creation and use of ontological knowledge graphs (OKGs) 4250. The platform may develop OKGs to visually and structurally represent relationships and con-cepts within specialized domains, and then use OKGs to enhance the explainability and retrieval capabilities of LLMs. As an example considering safety protocols, the platform can create an OKG for construction safety, repre-senting protocols, risk factors, and preventive measures. This can help the central agent provide context-aware safety recommendations. The central agent can leverage RAG strategies to retrieve relevant chunks of information from vast databases during generation tasks. It can generate enhance responses by integrating retrieved knowledge with generated text for accuracy and context relevance. For instance, the platform may use RAG to pull in data from project management tools, safety records, and ERP systems to provide comprehensive task coordination and risk man-agement.

The platform can provide proactive planning and assis-tance with task prioritization and scheduling actions. In some embodiments, the platform may employ Monte Carlo Tree Search and Reinforcement Learning to dynamically prioritize and schedule tasks based on real-time data and user context, while continuously adjusting the schedule as new information becomes available, optimizing for user efficiency and resource utilization. For example, the plat-form can support errand coordination wherein it uses MCTS to explore optimal sequences for running errands, leveraging real-time traffic data, calendar events, and available resources like personal robots.

As an example of using ANML and hierarchical task networks (HTNs) for human-robot interaction, consider personal robot assistance using detailed actions for tasks such as driving, unloading groceries, and cleaning. Provided below is some exemplary ANML defined actions:

```
'''anml
    action drive_car(user, car) {
        precondition: user.inside(car) & car.ready( );
        effect: user.at(destination);
    }
    action load_groceries(robot, car, groceries) {
        precondition: groceries.at(store) & car.at(store) & robot.at(store);
        effect: groceries.in(car);
    }
    action clean_house(user, robot, house) {
        precondition: user.at(house) & robot.at(house);
        effect: house.clean( );
    }
'''
```

Provided below are various tasks decomposed into manage-able subtasks, creating a hierarchy for coordination between the user and robot:

```
'''htn
    task run_errands(user, robot, car, groceries, store, home) {
        subtasks: [
            load_groceries(robot, car, groceries),
            drive_car(user, car),
            unload_groceries(user, robot, car, groceries, home)
        ];
    }
    task daily_routine(user, robot, car, house, groceries, store, home) {
        subtasks: [
            run_errands(user, robot, car, groceries, store, home),
            clean_house(user, robot, house)
        ];
    }
'''
```

Enhancing the platform 4200 with specialized knowledge integration, advanced planning algorithms, and context-aware assistance creates a robust system that serves both generalists and specialists effectively. By leveraging fine-tuned models, ontological knowledge graphs, and retrieval-augmented generation, the platform can provide a dynamic, adaptive, and highly personalized user experience. This approach not only improves efficiency and safety but also enriches the user's daily activities with contextually relevant information and proactive suggestions. For example, con-sider coordinating a movie set with various crew members and equipment. The platform integrates data from project management tools and IoT devices to optimize task sched-uling, resource allocation, and real-time adjustments based on dynamic changes on set. By leveraging neurosymbolic search, reasoning, and context enrichment, this approach offers a superior and more dynamic user experience com-pared to Google's AI search. The system integrates real-time sensory data, expert knowledge, and advanced planning algorithms to provide highly personalized, context-aware, and proactive assistance. This not only enhances user effi-ciency and safety but also fosters deeper engagement and satisfaction across various scenarios, from construction site management to personal robot assistance and collaborative project planning.

FIG. 43 is a flow diagram illustrating an exemplary method 4300 for identifying delays and proposing alterna-tives using a neurosymbolic approach, according to an aspect. The neurosymbolic approach leverages advanced AI techniques to identify delays, find viable alternatives, and manage procurement to keep projects on time and on budget. Here's a detailed step-by-step explanation of how this approach can be applied in the context of a construction project dealing with a delay in the shipment of real wood siding. The process begins at step 4301 when the system performs data integration and contextual understanding. Data sources can include ERP systems (e.g., SAP) which track shipment schedules, inventory levels, supplier infor-mation, and procurement data; project management tools (e.g., Monday.com) which monitor project timelines, task dependencies, and deadlines; and IoT devices which gather real-time data form sensors and devices at the construction site. The system can perform sensory input integration using: location and activity data by using GPS and activity recognition to understand the current state of the construc-tion site; and communication channels which integrate emails, messages, and notifications related to shipment and procurement.

At step 4302, the system performs delay detection. This may comprise real-time monitoring such as shipment track-ing by continuously monitoring shipment status using data form ERP systems and IoT devices, and alert systems which set up alerts for potential delays based on predefined thresholds (e.g., expected delivery date vs. current status). Delay detection may further comprise delay identification wherein the system can perform anomaly detection by using machine learning algorithms to detect anomalies in shipment schedules and flag potential delays, and contextual analysis wherein the system correlates shipment data with project timelines to assess the impact of delays on the construction schedule.

At step 4303, the system proposes viable alternatives to mitigate potential delays. This may comprise knowledge base integration such as incorporating a knowledge base of LEED standards to ensure compliance with sustainability requirements. This may also comprise accessing a comprehensive database of construction materials, including specifications and certifications. The system may identify one or more potential alternatives using neurosymbolic reasoning techniques to match the requirements of the delayed wood siding with potential alternatives that meet LEED standards. Alternative identification may also utilize criteria matching wherein the system evaluates alternatives based on factors such as material properties, environmental impact, availability, and cost. For example, consider a query such as "Identify concrete siding options that match the aesthetic and sustainability criteria of the delayed wood siding." The system may generate as output a list of suitable concrete siding alternatives along with their LEED certifications and supplier information.

At step 4304, the system facilitates proactive procurement and planning. This may involve the use of MCTS and RL to adjust the project schedule dynamically, incorporating the new procurement timeline for the alternative materials, as well as optimized resource allocation to minimize disruptions caused by the material switch. The system can integrate with supplier systems to connect with suppliers through ERP systems to check the availability and lead times of the identified alternatives. The system may implement automated workflows to initiate the procurement process for the chosen alternative materials. As an example, upon identifying a suitable concrete siding option, the system automatically places an order with the supplier, ensuring timely delivery to the construction site.

Figure 44:
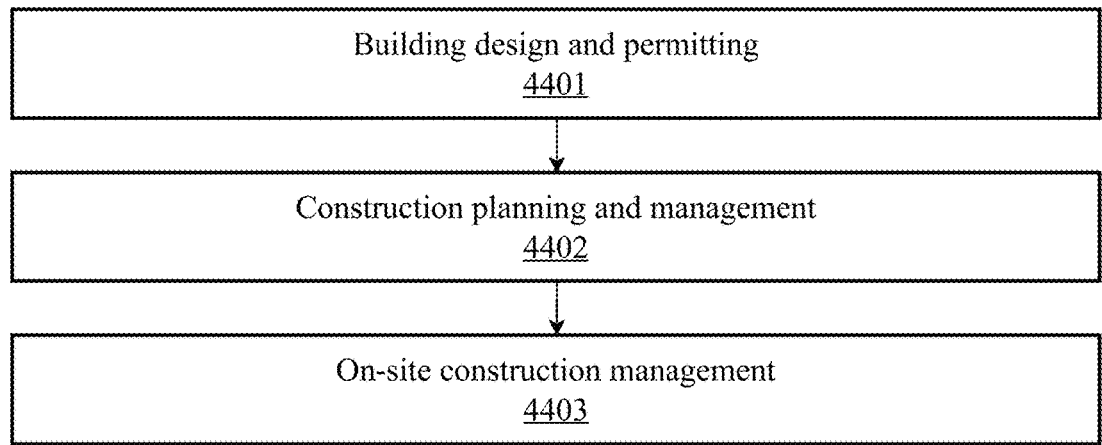
FIG. 44 is a flow diagram illustrating an exemplary method for providing probabilistic cost management in building design and construction, according to an aspect.

FIG. 44 is a flow diagram illustrating an exemplary method 4400 for providing probabilistic cost management in building design and construction, according to an aspect. Integrating advanced AI techniques and probabilistic modeling into the building design and construction process can significantly enhance cost management by anticipating potential supply chain disruptions, weather issues, material availabilities, and prices. Here's how this can be achieved throughout different phases of a project, from design and permitting in AutoCAD to construction with Building Information Modeling (BIM) and on-site management with procurement software. At step 4401, the building design and permitting (AutoCAD) phase may integrate with probabilistic models. This may incorporate historical data and real-time inputs related to supply chain performance, weather patterns, material prices, and availability into AutoCAD, and use probabilistic models to simulate various scenarios that might impact the project. This includes potential delays in material delivery, price fluctuations, and adverse weather conditions. The system may further integrate risk assessment tools into AutoCAD to evaluate the impact of different scenarios on project timelines and costs.

In the design phase, the system may: integrate real-time and historical data on material availability, prices, and supply chain reliability into the design environment; simulate different scenarios such as material shortages, price increases, and weather delays; and provide probabilistic cost estimates for different design options based on simulated scenarios. During the permitting phase, the system may: assess the impact of potential risks on project timelines and costs; and develop mitigation strategies for identified risks, such as sourcing alternative materials or adjusting project schedules.

At step 4402, the construction planning and management phase may integrate with advanced AI and probabilistic models. The system can provide support by: continuously updating BIM models with real-time data on weather, material availability, and supply chain status; using predictive analytics to forecast potential disruptions and their impact on the construction schedule and costs; and adjusting construction schedules dynamically based on probabilistic models and real-time data inputs. For example, during the planning phase, the system can integrate BIM models with data sources providing real-time updates on material availability, weather forecasts, and supply chain status; use AI models to simulate various disruption scenarios and their potential impact on the project; and provide dynamic cost estimates that account for potential disruptions and their probabilities. During the construction phase, the system can monitor real-time data and update BIM models to reflect current conditions and risks; and adjust construction schedules and resource allocations based on updated risk assessments and probabilistic cost estimates.

At step 4403, the system can support on-site construction management tasks by providing real-time decision support such as integration with procurement systems, adaptive planning, and automated procurement. The system may integrate real-time data from procurement software to track material orders, deliveries, and costs, and use adaptive planning techniques to adjust procurement strategies based on real-time data and probabilistic forecasts. In some implementations, the system can use automated procurement processes that respond to real-time changes in material availability and prices. For example, during the procurement phase, the system may: integrate procurement software with BIM and real-time data sources; use probabilistic models to guide procurement decisions, prioritizing materials with stable supply chains and prices; and automate ordering processes to respond dynamically to changes in material availability and cost forecasts. With respect to construction management, the system may: continuously update procurement strategies based on real-time data from the construction site and supply chain; and optimize procurement and resource allocation to minimize costs and delays, adjusting dynamically based on probabilistic models.

By integrating advanced AI techniques, probabilistic modeling, and real-time data integration across all phases of a construction project, from design and permitting in AutoCAD to on-site management with procurement software, the system can significantly enhance cost management and project efficiency. This approach allows for proactive risk assessment, dynamic scheduling, and adaptive procurement, ensuring that potential disruptions are managed effectively and project goals are achieved within budget and on time.

The evolution of search from a simple retrieval of facts to an integral component embedded within workflows represents a significant advancement in how individuals interact with information. This transformation is driven by the integration of advanced AI techniques, probabilistic modeling, and real-time data, enabling seamless enrichment of workflows, including e-commerce transaction identification and management.

Exemplary Computing Environment

Figure 45:
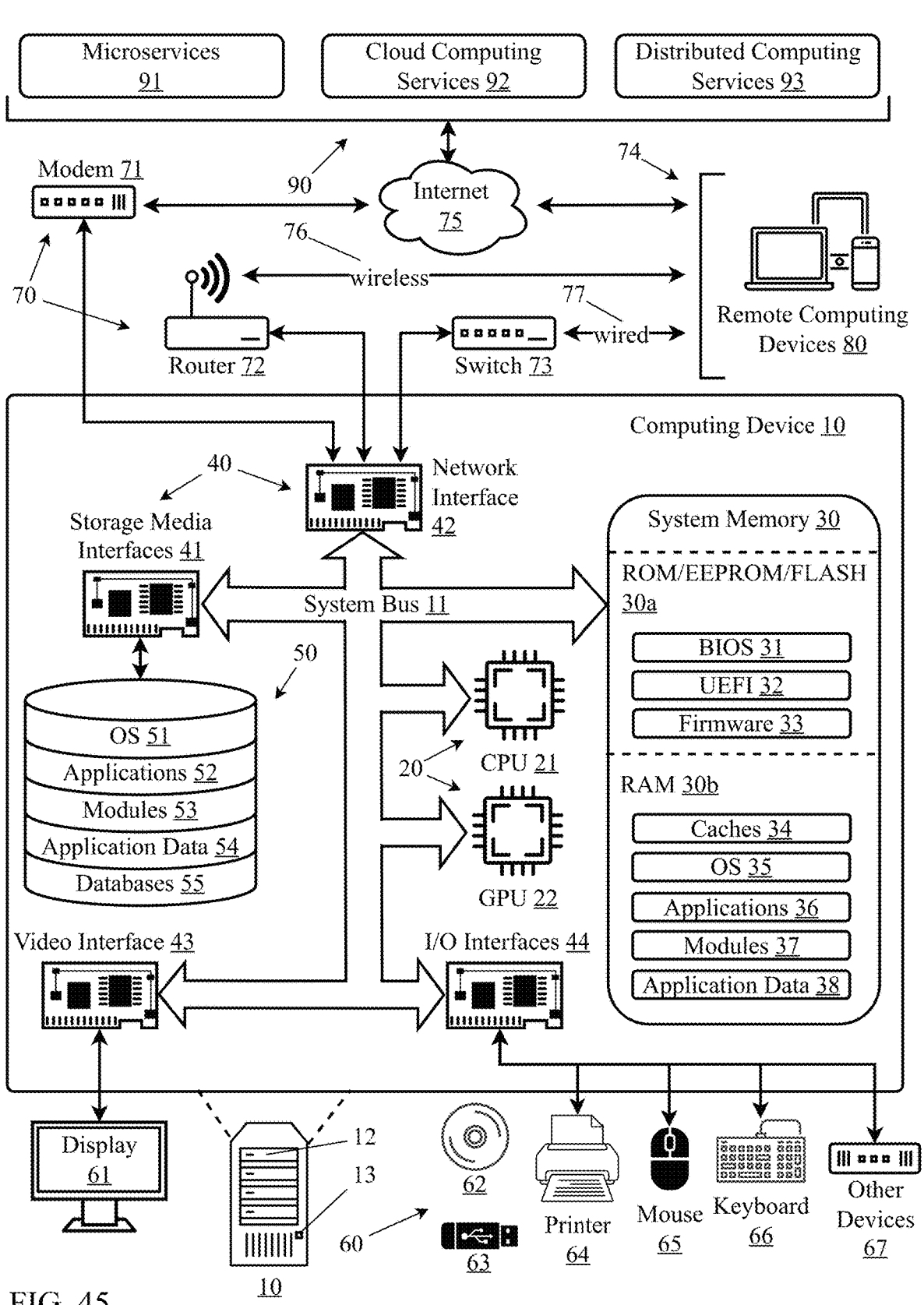
FIG. 45 illustrates an exemplary computing environment on which an embodiment described herein may be implemented.

FIG. 45 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for semantic search employing an advanced reasoning platform, the computing system comprising:

one or more hardware processors configured for:

automatically creating and updating ontologies by analyzing structured and unstructured data from multiple sources using natural language processing and machine learning or artificial intelligence techniques;

reading, creating, and maintaining a vector semantic index of content elements bidirectionally linked to and synchronized with core symbolic concepts and relationships defined in the ontologies;

processing user queries and returning relevant results by leveraging the vector semantic index, knowledge graphs, and contextual information;

storing and managing knowledge corpora that integrates information from the ontologies, the vector semantic index, and external sources;

utilizing user context and preferences to guide semantic search by performing context-aware query interpretation, real-time query expansion, and dynamic weighting to enable personalized results;

orchestrating semantic search workflows and reasoning workflows in a unified processing pipeline by integrating ontology extraction, indexing, search, knowledge graph, and context processing aspects of the semantic search workflows and the reasoning workflows such that intermediate state is shared among said aspects; and optimizing performance and efficiency of the system for semantic search by dynamically tuning system parameters based on workload characteristics and declared service-level objectives.

2. The computing system of claim 1, wherein the ontologies include both domain-specific and upper ontologies which may be optionally evolved and versioned for local and global tracking.

3. The computing system of claim 1, wherein the data analyzed to automatically create and update the ontologies includes temporal and spatial representations to aid the system in representing changes in language or concepts via versioned ontologies which collectively support more accurate and precise information representation, retrieval and reasoning.

4. The computing system of claim 1, wherein the vector semantic index enables efficient vector search and retrieval of information.

5. The computing system of claim 1, wherein the knowledge graph supports curated symbolic representation of information which supports more complex reasoning and inference tasks.

6. The computing system of claim 1, wherein the system is configured to leverage cloud and edge computing resources through a hierarchical and distributed architecture.

7. The computing system of claim 1, wherein the orchestration of semantic search workflows and reasoning workflows is performed using a directed computational graph configured to support declaration of transport, storage and compute tasks across cloud, intermediate, edge, and wearable, mobile, or Internet-of-Things devices.

8. The computing system of claim 1, wherein the system is configured to continuously improve the relevance, accuracy, and performance of contextual semantic search results using machine learning and artificial intelligence techniques via ongoing model and knowledge corpora curation and index improvement.

9. The computing system of claim 8, wherein the machine learning and artificial intelligence techniques include one or more of: one-shot learning, multi-shot learning, federated learning, reinforcement learning, adversarial learning, online learning, and transfer learning.

10. The computing system of claim 1, wherein the system is configured to provide a natural language interface for users to interact with the system for semantic search using natural language queries, dialogues, and commands via voice, video, recording, braille, or writing.

11. The computing system of claim 1, wherein the optimizing performance and efficiency of the system for semantic search implements techniques that include one or more of: caching, concurrency, parallelization, compression, resource allocation, resource locality, response fidelity, model selection, response validation, search depth, search breadth, declared time available, and declared cost limited.

12. The computing system of claim 1, further comprising a multimodal interface configured to allow language, image, video, sound, smell, environmental characteristics, or other resources available to a user interface for users to interact with the system for semantic search and access information or gain recommendations or initiate actions.

13. A computer-implemented method executed on an advanced reasoning platform for semantic search, the computer-implemented method comprising:

automatically creating and updating ontologies by analyzing structured and unstructured data from multiple sources using natural language processing and machine learning or artificial intelligence techniques;

reading, creating, and maintaining a vector semantic index of content elements linked to core symbolic concepts and relationships defined in the ontologies;

processing user queries and returning relevant results by leveraging the vector semantic index, knowledge graphs, and contextual information;

storing and managing knowledge corpora that integrates information from the ontologies, semantic index, and external sources;

utilizing user context and preferences to guide semantic search and enable context-aware query interpretation, real-time query expansion, and dynamic weighting to enable personalized results;

orchestrating semantic search workflows and reasoning workflows in a unified processing pipeline by integrating ontology extraction, indexing, search, knowledge graph, and context processing aspects of the semantic search workflows and the reasoning workflows such that intermediate state is shared among said aspects; and optimizing performance and efficiency of the system for semantic search by dynamically tuning system parameters based on workload characteristics and declared service-level objectives.

14. The computer-implemented method of claim 13, wherein the ontologies include both domain-specific and upper ontologies.

15. The computer-implemented method of claim 13, wherein the data analyzed to automatically create and update the ontologies includes temporal and spatial representations to aid the system in representing changes in language or concepts via versioned ontologies which collectively support more accurate and precise information representation, retrieval and reasoning.

16. The computer-implemented method of claim 13, wherein the semantic index enables efficient semantic search and retrieval of information.

17. The computer-implemented method of claim 13, wherein the knowledge graph supports curated symbolic representation of information which supports more complex reasoning and inference tasks.

18. The computer-implemented method of claim 13, wherein the system is configured to leverage cloud and edge computing resources through a hierarchical and distributed architecture.

19. The computer-implemented method of claim 13, wherein the orchestration of semantic search workflows and reasoning workflows is performed using a directed computational graph configured to support declaration of transport, storage and compute tasks across cloud, intermediate, edge, and wearable, mobile, or Internet-of-Things devices.

20. The computer-implemented method of claim 13, wherein the system is configured to continuously improve the relevance, accuracy, and performance of contextual semantic search results using machine learning and artificial intelligence techniques via ongoing model and knowledge corpora curation and index improvement.

21. The computer-implemented method of claim 20, wherein the machine learning and artificial intelligence techniques include one or more of: one-shot learning, multi-shot learning, federated learning, reinforcement learning, adversarial learning, online learning, and transfer learning.

22. The computer-implemented method of claim 13, wherein the platform is configured to provide a natural language interface for users to interact with the system for semantic search using natural language queries, dialogues, and commands via voice, video, recording, braille, or writing.

23. The computer-implemented method of claim 13, wherein the optimizing performance and efficiency of the system for semantic search implements techniques that include one or more of: caching, concurrency, parallelization, compression, resource allocation, resource locality, response fidelity, model selection, response validation, search depth, search breadth, declared time available, and declared cost limited.

24. The computer-implemented method of claim 13, further comprising a multimodal interface configured to allow language, image, video, sound, smell, environmental characteristics, or other resources available to a user interface for users to interact with the system for semantic search and access information or gain recommendations or initiate actions.

25. A system for semantic search employing an advanced reasoning platform, comprising one or more computers with executable instructions that, when executed, cause the system to:

automatically create and update ontologies by analyzing structured and unstructured data from multiple sources using natural language processing and machine learning or artificial intelligence techniques;

read, create, and maintain a vector semantic index of content elements bidirectionally linked to and synchronized with core symbolic concepts and relationships defined in the ontologies;

process user queries and returning relevant results by leveraging the vector semantic index, knowledge graphs, and contextual information;

store and manage knowledge corpora that integrates information from ontologies, the vector semantic index, and external sources;

utilize user context and preferences to guide semantic search by performing context-aware query interpretation, real-time query expansion, and dynamic weighting to enable personalized results;

orchestrate semantic search workflows and reasoning workflows in a unified processing pipeline by integrating ontology extraction, indexing, search, knowledge graph, and context processing aspects of the semantic search workflows and the reasoning workflows such that intermediate state is shared among said aspects; and optimize performance and efficiency of the system for semantic search by dynamically tuning system parameters based on workload characteristics and declared service-level objectives.

26. The system of claim 25, wherein the ontologies include both domain-specific and upper ontologies.

27. The system of claim 25, wherein the data analyzed to automatically read, create and update the ontologies includes temporal and spatial representations to aid the system in representing changes in language or concepts via versioned ontologies which collectively support more accurate and precise information representation, retrieval and reasoning.

28. The system of claim 25, wherein the semantic index enables efficient semantic search and retrieval of information.

29. The system of claim 25, wherein the knowledge graph supports curated symbolic representation of information which supports more complex reasoning and inference tasks.

30. The system of claim 25, wherein the system is configured to leverage cloud and edge computing resources through a hierarchical and distributed architecture.

31. The system of claim 25, wherein the orchestration of semantic search workflows and reasoning workflows is performed using a directed computational graph configured to support declaration of transport, storage and compute tasks across cloud, intermediate, edge, and wearable, mobile, or Internet-of-Things devices.

32. The system of claim 25, wherein the system is configured to continuously improve the relevance, accuracy, and performance of contextual semantic search results using machine learning and artificial intelligence techniques via ongoing model and knowledge corpora curation and index improvement.

33. The system of claim 32, wherein the machine learning and artificial intelligence techniques include one or more of: one-shot learning, multi-shot learning, federated learning, reinforcement learning, adversarial learning, online learning, and transfer learning.

34. The system of claim 25, wherein the system is configured to provide a natural language interface for users to interact with the system for semantic search using natural language queries, dialogues, and commands via voice, video, recording, braille, or writing.

35. The system of claim 25, wherein the optimizing performance and efficiency of the system for semantic search implements techniques that include one or more of: caching, concurrency, parallelization, compression, resource allocation, resource locality, response fidelity, model selection, response validation, search depth, search breadth, declared time available, and declared cost limited.

36. The system of claim 25, further comprising a multi-modal interface configured to allow language, image, video, sound, smell, environmental characteristics, or other resources available to a user interface for users to interact with the system for semantic search and access information or gain recommendations or initiate actions.

37. Non-transitory, computer-readable storage media having computer-executable instructions embodied thereon that, when executed by one or more processors of a computing system employing an advanced reasoning platform for semantic search, cause the computing system to:

read, create, and maintain a vector semantic index of content elements bidirectionally linked to and synchronized with core symbolic concepts and relationships defined in the ontologies;

process user queries and returning relevant results by leveraging the vector semantic index, knowledge graphs, and contextual information;

store and manage knowledge corpora that integrates information from the ontologies, the vector semantic index, and external sources;

utilize user context and preferences to guide semantic search by performing context-aware query interpretation, real-time query expansion, and dynamic weighting to enable personalized results;

orchestrate semantic search workflows and reasoning workflows in a unified processing pipeline by integrating ontology extraction, indexing, search, knowledge graph, and context processing aspects of the semantic search workflows and the reasoning workflows such that intermediate state is shared among said aspects; and optimize performance and efficiency of the system for semantic search by dynamically tuning system parameters based on workload characteristics and declared service-level objectives.

38. The non-transitory, computer-readable storage media of claim 37, wherein the ontologies include both domain-specific and upper ontologies.

39. The non-transitory, computer-readable storage media of claim 37, wherein the data analyzed to automatically create and update the ontologies includes temporal and spatial representations to aid the system in representing changes in language or concepts via versioned ontologies which collectively support more accurate and precise information representation, retrieval and reasoning.

40. The non-transitory, computer-readable storage media of claim 37, wherein the vector semantic index enables efficient semantic search and retrieval of information.

41. The non-transitory, computer-readable storage media of claim 37, wherein the knowledge graph supports curated symbolic representation of information which supports more complex reasoning and inference tasks.

42. The non-transitory, computer-readable storage media of claim 37, wherein the system is configured to leverage cloud and edge computing resources through a hierarchical and distributed architecture.

43. The non-transitory, computer-readable storage media of claim 37, wherein the system is configured to continuously improve the relevance, accuracy, and performance of contextual semantic search results using machine learning and artificial intelligence techniques via ongoing model and knowledge corpora curation and index improvement.

44. The non-transitory, computer-readable storage media of claim 37, wherein the system continuously improves the relevance, accuracy, and performance of semantic search results using machine learning techniques via ongoing model and knowledge corpora curation and index improvement.

45. The non-transitory, computer-readable storage media of claim 44, wherein the machine learning and artificial intelligence techniques include one or more of: one-shot learning, multi-shot learning, federated learning, reinforcement learning, adversarial learning, online learning, and transfer learning.

46. The non-transitory, computer-readable storage media of claim 37, wherein the system is configured to provide a natural language interface for users to interact with the system for semantic search using natural language queries, dialogues, and commands via voice, video, recording, braille, or writing.

47. The non-transitory, computer-readable storage media of claim 37, wherein the optimizing performance and efficiency of the system for semantic search implements techniques that include one or more of: caching, concurrency, parallelization, compression, resource allocation, resource locality, response fidelity, model selection, response validation, search depth, search breadth, declared time available, and declared cost limited.

48. The non-transitory, computer-readable storage media of claim 37, further comprising a multimodal interface configured to allow language, image, video, sound, smell, environmental characteristics, or other resources available to a user interface for users to interact with the system for semantic search and access information or gain recommendations or initiate actions.

* * * * *